(12) United States Patent
Duncan et al.

(10) Patent No.: US 11,070,019 B2
(45) Date of Patent: Jul. 20, 2021

(54) SYSTEM FOR PROCESSING AN END OF A CABLE

(71) Applicant: The Boeing Company, Chicago, IL (US)

(72) Inventors: Grace L. Duncan, Seattle, WA (US); Bradley J. Mitchell, Snohomish, WA (US); Damien O. Martin, Everett, WA (US); Dinh X. Tran, Mukilteo, WA (US); Eerik J. Helmick, Seattle, WA (US); Aphea Ann Thornton, Issaquah, WA (US); Nick S. Evans, Lynnwood, WA (US); David S. Wright, Snohomish, WA (US); Lars E. Blacken, Bothell, WA (US); Keith M. Cutler, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 254 days.

(21) Appl. No.: 16/195,619

(22) Filed: Nov. 19, 2018

(65) Prior Publication Data
US 2020/0161824 A1  May 21, 2020

(51) Int. Cl.
*H01R 43/00* (2006.01)
*H01R 43/28* (2006.01)
(Continued)

(52) U.S. Cl.
CPC ......... *H01R 43/28* (2013.01); *H01B 13/0003* (2013.01); *H01B 13/22* (2013.01);
(Continued)

(58) Field of Classification Search
CPC ........ H02G 1/00; H02G 1/14; H02G 15/1806; H02G 15/182; H01B 13/0036;
(Continued)

(56) References Cited

U.S. PATENT DOCUMENTS

| | | |
|---|---|---|
| 4,512,506 A | 4/1985 | Fischer |
| 4,685,636 A | 8/1987 | Eaton |

(Continued)

FOREIGN PATENT DOCUMENTS

| | | |
|---|---|---|
| CN | 203679474 U | 7/2014 |
| EP | 0236970 A1 | 9/1987 |

OTHER PUBLICATIONS

Extended European Search Report dated Aug. 12, 2020 in European Patent Application No. 19209577.6.

(Continued)

*Primary Examiner* — Paul D Kim
(74) *Attorney, Agent, or Firm* — Ostrager Chong Flaherty & Broitman P.C.

(57) ABSTRACT

An automated system for processing an end of a cable. The system includes: a cable delivery system; a cable processing module; a pallet supported by the cable delivery system; a drive wheel rotatably coupled to the pallet; a motor operatively coupled for driving rotation of the drive wheel; and an idler wheel rotatably coupled to the pallet and forming a nip with the drive wheel. The cable processing module includes cable processing equipment and a computer system. The computer system is configured to: (a) cause the drive wheel to rotate in a cable pushing direction to cause a specified length of cable to be inserted into the cable processing equipment; (b) activate the cable processing equipment to operate on the cable end; and (c) cause the drive wheel to rotate in a cable pulling direction to cause the length of cable to be removed from the cable processing equipment.

20 Claims, 46 Drawing Sheets

(51) Int. Cl.
*H01B 13/00* (2006.01)
*H01B 13/22* (2006.01)
*H02G 1/12* (2006.01)
*H01R 4/72* (2006.01)

(52) U.S. Cl.
CPC ........... *H02G 1/128* (2013.01); *H02G 1/1297* (2013.01); *H01R 4/72* (2013.01)

(58) Field of Classification Search
CPC .. H01B 13/062; H01R 43/0263; H01R 43/28; H01R 9/0512; B25J 15/00; B25J 11/005
See application file for complete search history.

(56) References Cited

U.S. PATENT DOCUMENTS

| | | | |
|---|---|---|---|
| 5,125,154 A | 6/1992 | Cross | |
| 5,152,395 A | 10/1992 | Cross | |
| 5,749,756 A * | 5/1998 | Vockroth | H01R 4/203 |
| | | | 174/84 C |
| 6,035,517 A | 3/2000 | Moore et al. | |
| 6,857,550 B2 | 2/2005 | Wright et al. | |
| 7,513,357 B2 | 4/2009 | Abbestam et al. | |
| 8,430,229 B2 | 4/2013 | Abbestam | |
| 8,739,964 B2 | 6/2014 | Ek | |
| 8,794,432 B2 | 8/2014 | Ek | |
| 9,612,210 B2 | 4/2017 | Ray et al. | |
| 9,966,742 B2 | 5/2018 | Evans et al. | |
| 2009/0277685 A1* | 11/2009 | Aue | H02G 15/105 |
| | | | 174/84 R |
| 2009/0280668 A1* | 11/2009 | Rodrigues | H01R 9/0524 |
| | | | 439/271 |
| 2011/0266274 A1 | 11/2011 | Ebata et al. | |
| 2012/0160897 A1 | 6/2012 | Enyedy | |
| 2016/0122592 A1 | 5/2016 | Das et al. | |
| 2017/0182580 A1 | 6/2017 | Hsu et al. | |
| 2017/0258572 A1* | 9/2017 | Gordon | A61B 17/1782 |
| 2018/0062340 A1* | 3/2018 | Pechter | H01R 43/05 |
| 2018/0309272 A1 | 10/2018 | Helmick | |
| 2020/0160504 A1* | 5/2020 | Duncan | H01B 13/0036 |
| 2020/0161780 A1* | 5/2020 | Duncan | H02G 1/14 |
| 2020/0161810 A1* | 5/2020 | Duncan | H01R 43/28 |
| 2020/0161824 A1* | 5/2020 | Duncan | H02G 1/1297 |
| 2020/0161843 A1* | 5/2020 | Duncan | H02G 1/1297 |

OTHER PUBLICATIONS

Frisimos, "Extract from the video Frisimos first cable assembly robots", Jul. 18, 2017.
Extended European Search Report dated Jun. 3, 2020 in European Patent Application No. 19209589.1.

* cited by examiner

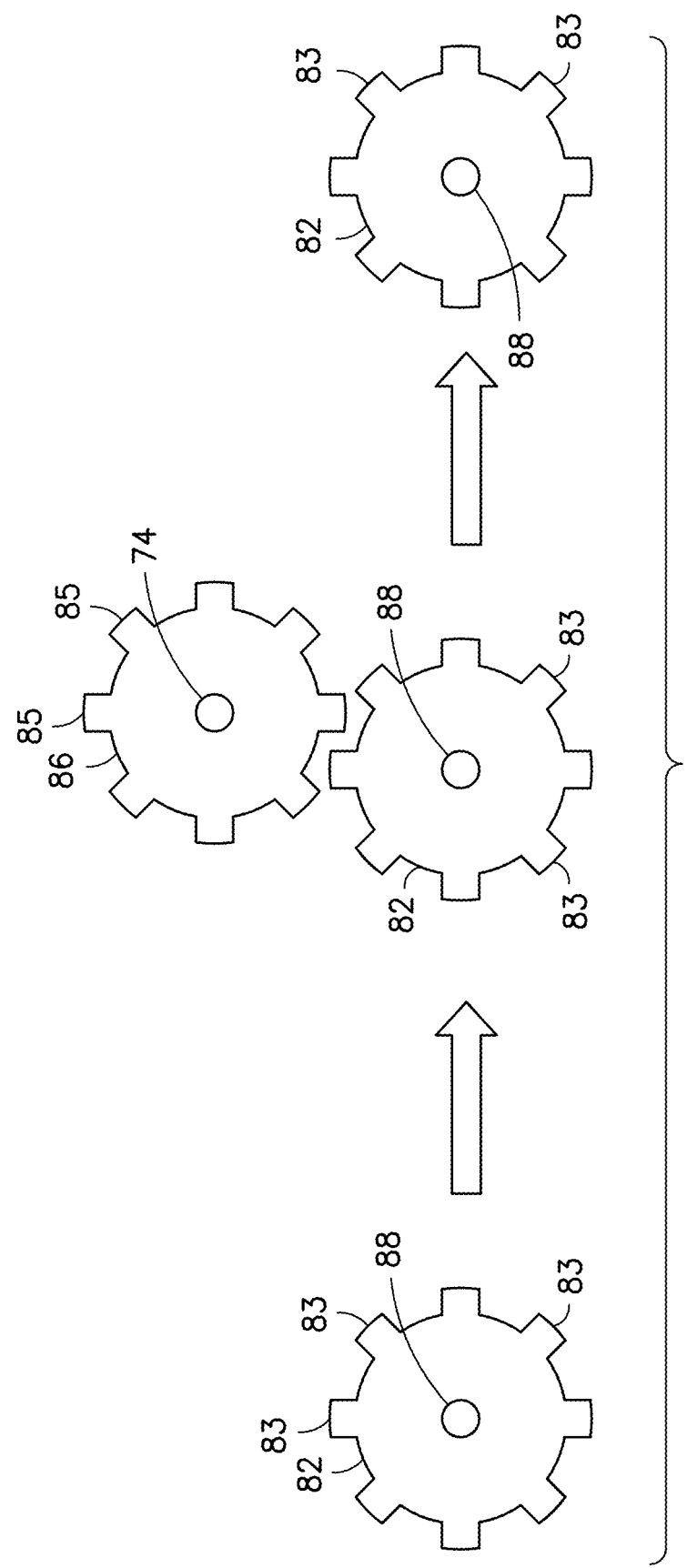

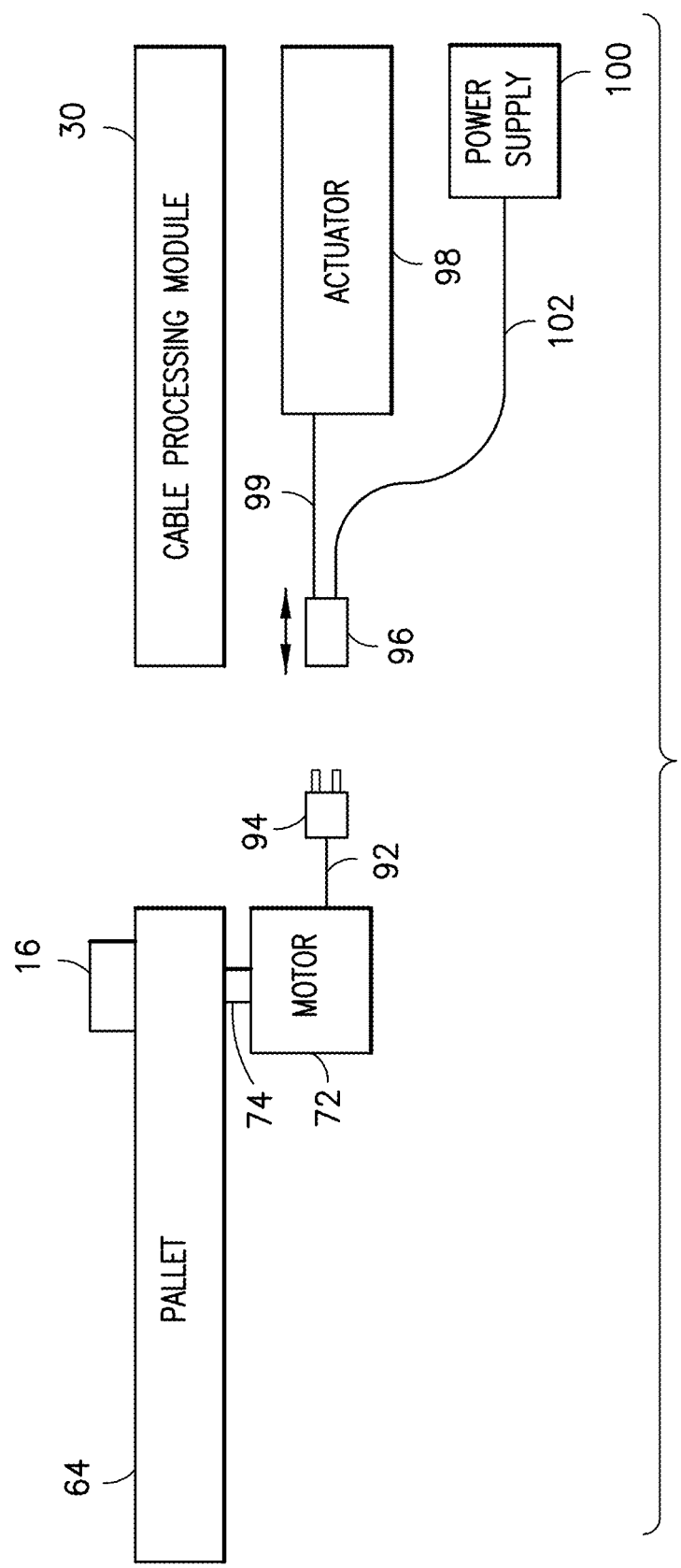

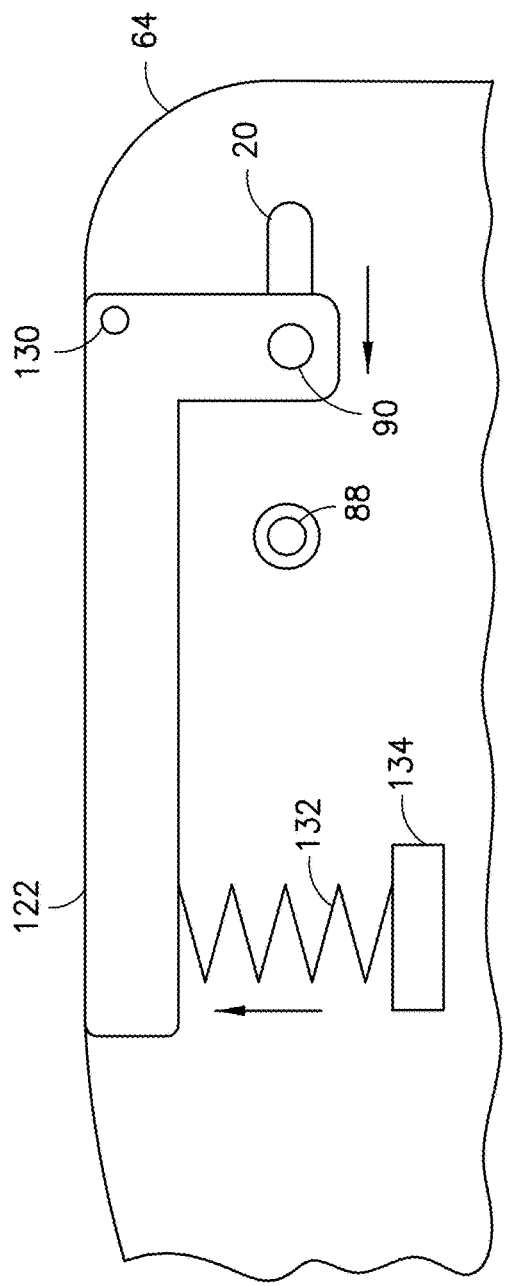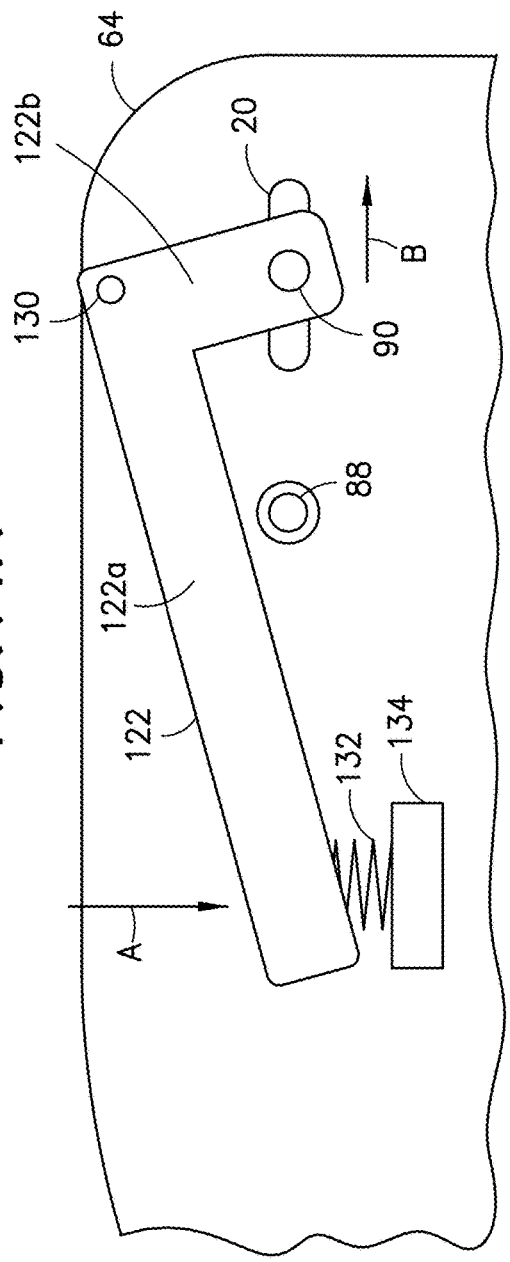

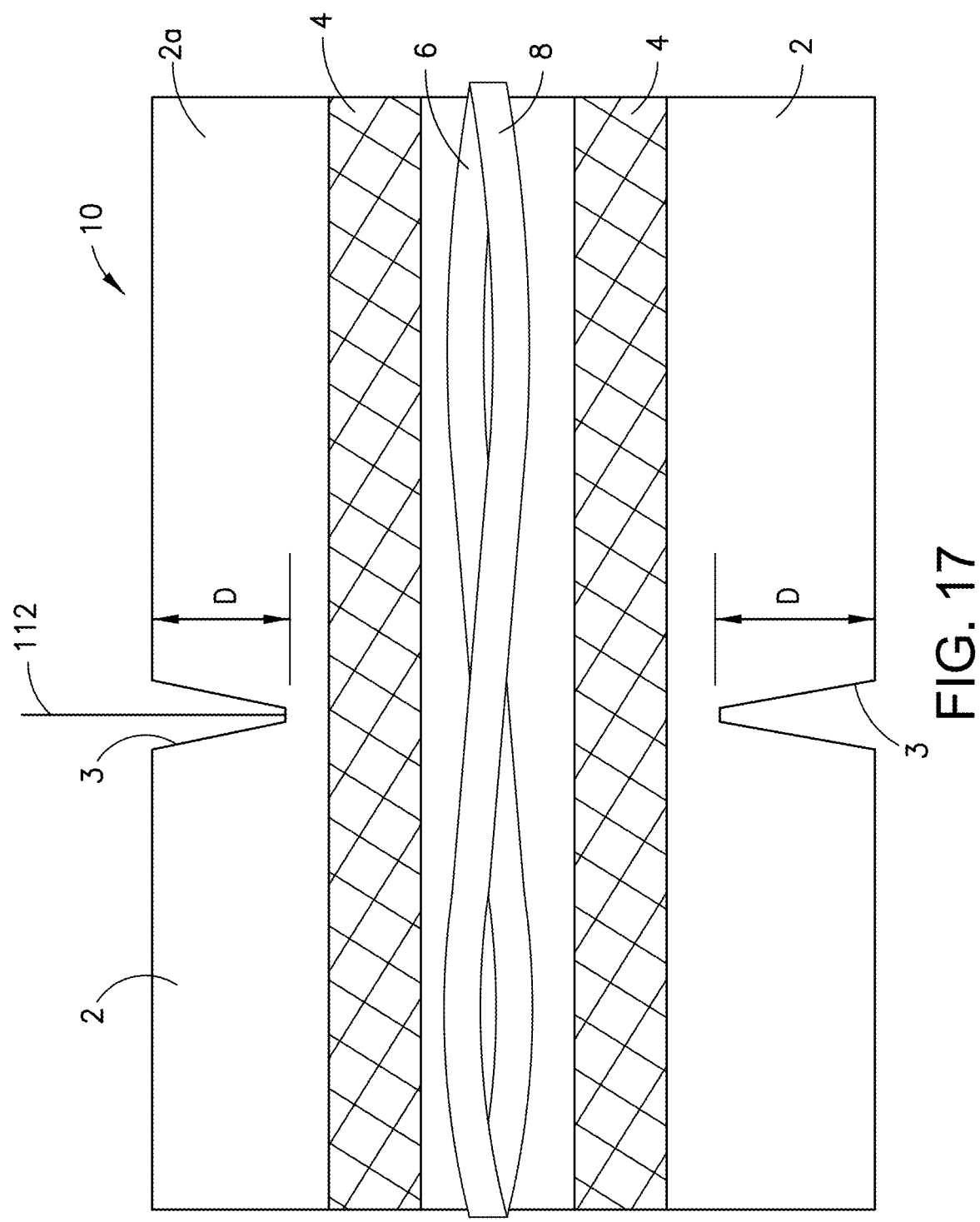

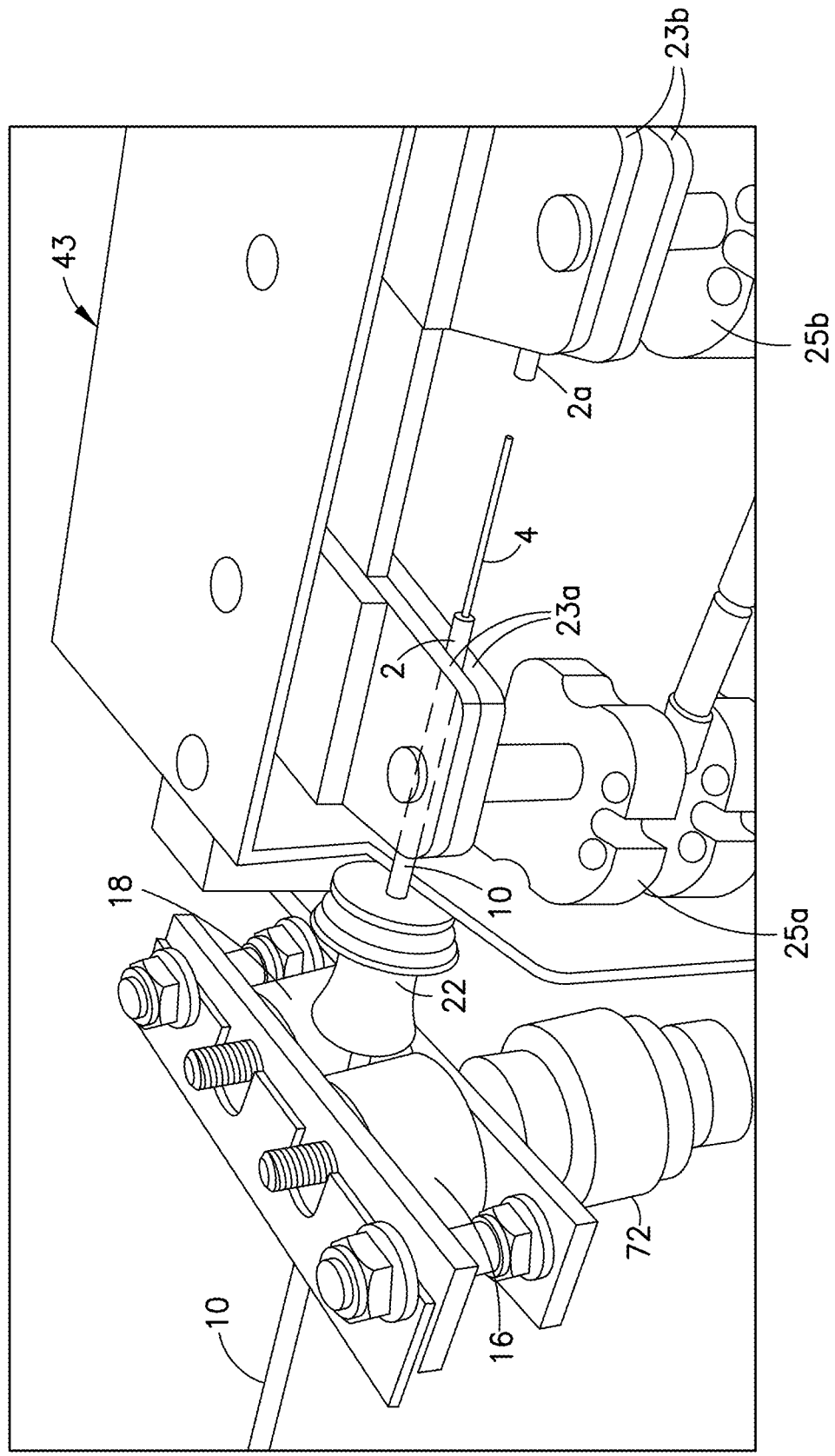

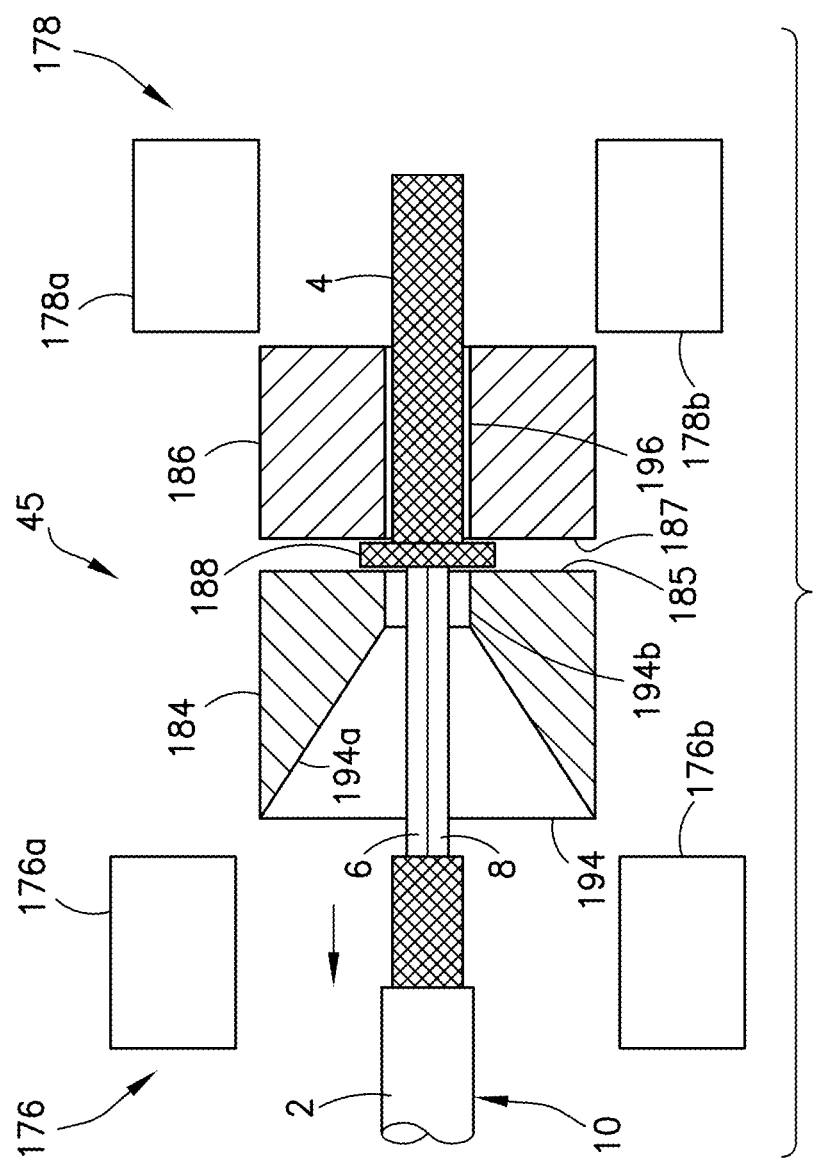

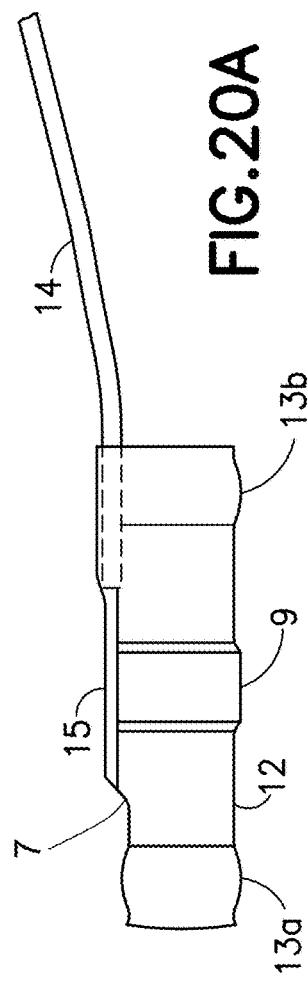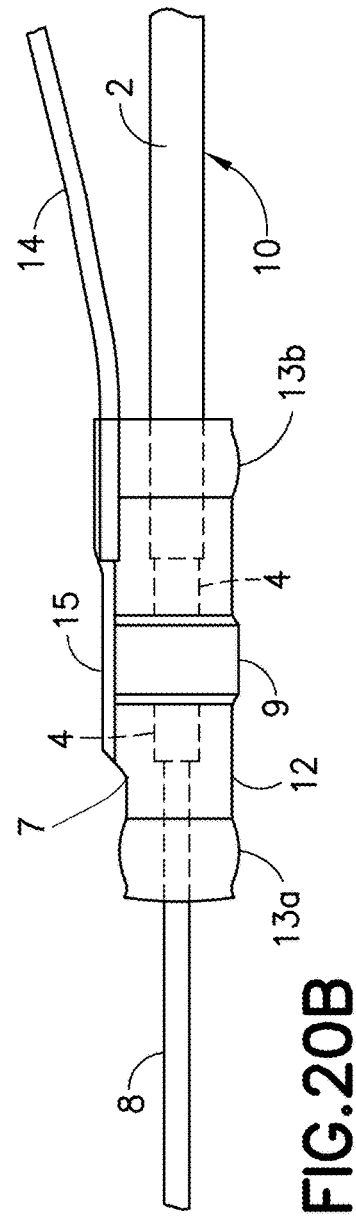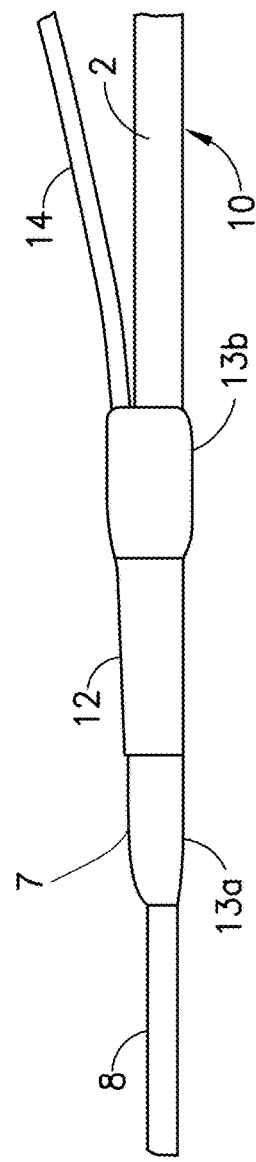

SYSTEM FOR PROCESSING AN END OF A CABLE

BACKGROUND

This disclosure generally relates to systems, methods and apparatus for processing shielded cable. In particular, this disclosure relates to systems, methods and apparatus for installing sleeves on the ends of shielded cables.

Shielded cables incorporate shielding in an attempt to prevent electromagnetic interference. For example, the conductors may be surrounded by braided shielding made of metal. Because the shielding is made of metal, it may also serve as a path to ground. Usually a shielded cable incorporates a grounding wire that contacts the shield in an unjacketed portion of the shielded cable. Typically the grounding wire is attached to the unjacketed portion using a solder sleeve.

Currently, the process of preparing a shielded cable and installing a solder sleeve onto one end of the cable is a mostly manual and labor-intensive process. Manual feeding into benchtop equipment requires operator skill to maintain alignment of the cable and to feed a correct length of cable into the equipment; increases cycle time; and poses risk to quality. Operators that manually feed cables into benchtop equipment for processing risk misalignment of the cable upon insertion, which can result in quality issues.

SUMMARY

The subject matter disclosed in some detail below is directed to technology to automate at least some, if not all of the processing of shielded cables. The overall system is in the form of a production line. In accordance with a fully automated solution, the production line includes a cable delivery system and a multiplicity of workstations accessible to the cable delivery system. Each workstation is equipped with a respective cable processing module (including hardware and software) that performs a respective specific operation in a sequence of operations designed to produce a shielded cable having a solder sleeve installed on one end of the cable. Each shielded cable to be processed is carried on a respective pallet that is conveyed along a conveyor track in the form of a belt or a chain. Cables pulse down the conveyor track and are inserted into a series of cable processing modules in sequence, each cable processing module including cable processing equipment for performing successive operations of a solder sleeve installation process. By utilizing automation, the cycle time to produce installed solder sleeves is reduced, labor costs are decreased, and repeatable quality is ensured.

In particular, the subject matter disclosed in some detail below is directed to apparatus for automatically feeding the end of a cable into cable processing equipment at the respective workstations. That cable processing equipment may be one of a multiplicity of modules at separate workstations in a fully automated production line or may be benchtop cable processing equipment (e.g., equipment mounted on a workbench and accessible to a human operator).

In accordance with some embodiments, the apparatus includes a pair of cable-displacing wheels (e.g., a drive wheel and an idler wheel) designed to push and pull cables through a funnel which centers the cable for insertion into the cable processing equipment. In accordance with one proposed implementation, the pair of cable-displacing wheels each have outer peripheral contact surfaces made of compliant material which contact each other to form a nip. The presence of compliant material on both sides of the nip enables wires or cables of varying diameters and cross-sectional profiles to be placed between the cable-displacing wheels. This apparatus is intended to be universal, i.e., to be able to be used on any equipment (including benchtop equipment) that processes wires and/or cables. Additionally, a user is able to define the amount (length) of cable that is fed into the cable processing equipment, depending on the particular type of cable to be processed and its related requirements.

As used herein, the term "tip of a cable" means a portion of a cable exposed by cutting the cable in a cross-sectional plane. As used herein, the term "end of a cable" means a section of cable having a tip and a length of cable extending from the tip. For example, removal of a length of the jacket of a cable that extends to the cable tip creates an end of the cable in which the shielding is exposed.

As used herein, the term "sleeve" means a tube made of shrinkable material, such as a solder sleeve made of thermoplastic material (which shrinks) and a solder ring (which melts) or a dead end sleeve made of thermoplastic material and having no solder ring. Installation of a solder sleeve involves shrinking of the thermoplastic material and melting of the solder ring; installation of a dead end sleeve involves shrinking of the thermoplastic material. As used herein, "melting a solder sleeve" includes shrinking the thermoplastic material with melting of a solder ring, while "shrinking a sleeve" includes shrinking the thermoplastic material with (e.g., solder sleeve) or without (e.g., dead end sleeve) melting of a solder ring.

Although various embodiments of systems, methods and apparatus for processing shielded cable will be described in some detail below, one or more of those embodiments may be characterized by one or more of the following aspects.

One aspect of the subject matter disclosed in detail below is a system for processing an end of a cable, the system comprising: a cable delivery system; and a multiplicity of cable processing modules situated at respective locations accessible to the cable delivery system, wherein the multiplicity of cable processing modules comprise: a jacket slug pulling module configured to automatically remove a portion of a jacket from an end of a shielded cable; and a shield trimming module situated downstream from the jacket slug pulling module and configured to automatically trim an exposed portion of a shield of the shielded cable in an area where the portion of the jacket was removed. The multiplicity of cable processing modules may further comprise a sleeve installation module situated downstream from the shield trimming module and configured to automatically place and then shrink a sleeve on a portion of the shielded cable that includes an untrimmed exposed portion of the shield. The multiplicity of cable processing modules may further comprise a laser scoring module situated upstream from the jacket slug pulling module and configured to automatically score the jacket of the shielded cable to define the portion of the jacket removed by the jacket slug pulling module.

In accordance with some embodiments of the system described in the immediately preceding paragraph, the system further comprises: a pallet supported by the cable delivery system; a drive wheel rotatably coupled to the pallet; a motor operatively coupled for driving rotation of the drive wheel; and an idler wheel rotatably coupled to the pallet and forming a nip with the drive wheel, wherein at least one of the multiplicity of cable processing modules comprises a computer system configured to perform the following operations: activate the motor to drive rotation of the drive wheel in a cable pushing direction to cause the end of the cable to be inserted into the cable processing module; activate the cable processing module to perform an operation on the end of the cable; and activate the motor to drive rotation of the drive wheel in a cable pulling direction to cause the end of the cable to be removed from the cable processing module. This system may further comprise a rotation encoder configured to output pulses representing the incremental angular rotations of an output shaft of the motor, wherein the at least one cable processing module further comprises: a funnel affixed at a location facing the drive wheel and idler wheel; and a photoelectric sensor positioned and configured to issue a cable tip position signal indicating that interruption of transmitted light in a scanning plane in front of the funnel has started. In this embodiment, the computer system is further configured to start a count of pulses output by the rotation encoder in response to the cable tip position signal and then de-activate the motor in response to the count reaching a specified value corresponding to a specific target length of cable inserted in the cable processing module.

Another aspect of the subject matter disclosed in detail below is a system for processing an end of a cable, the system comprising: a cable delivery system; a plurality of cable processing modules situated at respective workstations accessible to the cable delivery system; a pair of wheels operable to push a cable into one of the cable processing modules when a cable is in a nip between the wheels; an apparatus for holding the wheels; and a motor operatively coupled for driving rotation of the wheels. Each cable processing module of the plurality of cable processing modules comprises: respective cable processing equipment configured to perform a respective operation on an end of a cable; and a computer system configured to perform the following operations when a cable arrives at each of the workstations in sequence: activate the motor to drive rotation of the wheels in a cable pushing direction to cause the end of the cable to be inserted into the cable processing equipment of the cable processing module which the apparatus configured to hold the wheels is adjacent to; activate the cable processing equipment in which the end of the cable is inserted to perform the respective operation on the end of the cable; and activate the motor to drive rotation of the wheels in a cable pulling direction to cause the end of the cable to be removed from the cable processing equipment.

In accordance with one embodiment of the system described in the immediately preceding paragraph, the plurality of cable processing modules comprise the following cable processing modules arranged along the cable delivery system in the following sequence: first cable processing equipment configured to automatically form a circumferential laser score line in a jacket of a cable; second cable processing equipment configured to automatically pull a portion of the jacket off of the end of the cable the portion of the jacket slug pulled off having a tip formed by the laser score line, thereby exposing a portion of a shield of the cable; third cable processing equipment configured to automatically trim a portion of the exposed portion of the shield of the cable; and fourth cable processing equipment configured to automatically install a solder sleeve on a portion of the cable, wherein the solder sleeve surrounds a portion of the exposed portion of the shield remaining after trimming.

A further aspect of the subject matter disclosed in detail below is a system for processing an end of a cable, the system comprising: a cable delivery system; a cable processing module situated at a workstation accessible to the cable delivery system; a pallet supported by the cable delivery system; a drive wheel rotatably coupled to the pallet; a motor operatively coupled for driving rotation of the drive wheel; and an idler wheel rotatably coupled to the pallet and forming a nip with the drive wheel. The cable processing module comprises: cable processing equipment configured to perform an operation on an end of a cable; and a computer system configured to perform the following operations: activate the motor to drive rotation of the drive wheel in a cable pushing direction to cause the end of the cable to be inserted into the cable processing equipment; activate the cable processing equipment to perform the operation on the end of the cable; and activate the motor to drive rotation of the drive wheel in a cable pulling direction to cause the end of the cable to be removed from the cable processing equipment.

In accordance with one embodiment of the system described in the immediately preceding paragraph, the system further comprises a rotation encoder configured to output pulses representing the incremental angular rotations of an output shaft of the motor; the cable processing module further comprises: a funnel affixed to the cable processing equipment in a location facing the drive wheel and idler wheel; and a photoelectric sensor positioned and configured to issue a cable tip position signal indicating that interruption of transmitted light in a scanning plane in front of the funnel has started; and the computer system is further configured to start a count of pulses output by the rotation encoder in response to the cable tip position signal and then de-activate the motor in response to the count reaching a specified value corresponding to a specific target length of cable inserted in the cable processing equipment.

A further aspect of the subject matter disclosed in detail below is a method for processing an end of a cable, the method comprising: placing a coil of cable on a pallet that supports drive and idler wheels that form a nip; placing the pallet on a conveying system; placing a cable end between the drive and idler wheels; rotating the drive and idler wheels to move a cable tip of the cable to a preset cable tip position in front of the drive and idler wheels; conveying the pallet to a position adjacent a cable processing module at a workstation, which cable processing module comprises cable processing equipment configured to perform an operation on an end of a cable and a funnel placed in front of the cable processing equipment; driving rotation of the drive wheel in a cable pushing direction to cause the end of the cable to be inserted into the cable processing equipment via the funnel; activating the cable processing equipment to perform the operation on the end of the cable; and driving rotation of the drive wheel in a cable pulling direction to cause the end of the cable to be removed from the cable processing equipment after the operation has been performed. The operation performed by the cable processing equipment is selected from one of the following: cable tip positioning, laser scoring, jacket slug pulling, shield trimming and solder sleeve installation.

Other aspects of systems, methods and apparatus for processing shielded cable are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

In addition, the depiction of shielded cabling in the drawings has been simplified by assuming that the cable being viewed in the drawing has a circular outer profile of constant diameter along its length, although some shielded cabling having a jacket that conforms to the undulations in the electrical wires has an outer profile that varies along its length.

FIG. 7A is a diagram representing respective positions of a drive wheel shaft gear relative to the stationary motor shaft gear (both depicted in FIG. 7) before, during and after meshing.

FIG. 8 is a diagram representing a side view of apparatus including a pallet-mounted motor that drives rotation of a pallet-mounted drive wheel in accordance with a further embodiment.

FIGS. 11A and 11B are diagrams representing respective states of an apparatus for spring loading an idler wheel into contact with a drive wheel in accordance with one embodiment. The depicted states are: (1) the idler wheel is in contact with the drive wheel (FIG. 11A); and (2) the idler is separated from the drive wheel by a gap in which a cable may be placed (FIG. 11B).

FIG. 17 is a diagram representing a sectional view of a laser-scored portion of a shielded cable.

FIGS. 18A through 18D are diagrams representing respective views of a system for removing a portion of a jacket from the end of a cable at four stages in an automated jacket slug pulling operation: (a) when a portion of the cable has been inserted between a pair of open clamps (FIG. 18A); (b) when the clamps have been closed and clamp the cable (FIG. 18B); (c) after the second clamp has been moved to pull a jacket slug off of the end of the cable (FIG. 18C); and (d) after the first clamp has been opened and the cable has been removed (FIG. 18D).

FIGS. 19A through 19G are diagrams representing respective partially sectional views of an apparatus for trimming a portion of a shield from the end of a cable at seven stages in an automated shield trimming operation.

FIG. 20A is a diagram representing a side view of the solder sleeve having a pre-installed ground wire.

FIG. 20B is a diagram representing a side view of the solder sleeve depicted in FIG. 20A when overlying a portion of the cable that includes exposed shielding.

FIG. 20C is a diagram representing a side view of the solder sleeve depicted in FIG. 20A when installed by melting on the portion of the cable that includes exposed shielding.

Reference will hereinafter be made to the drawings in which similar elements in different drawings bear the same reference numerals.

DETAILED DESCRIPTION

Illustrative embodiments of systems, methods and apparatus for processing shielded cables are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

For the purpose of illustration, various embodiments of an apparatus for automatically feeding the end of a cable into cable processing equipment at a workstation will now be described. That cable processing equipment may be one of a multiplicity of modules at separate workstations in a fully automated production line or may be benchtop cable processing equipment (e.g., equipment mounted on a workbench and accessible to a human operator).

Figure 1:
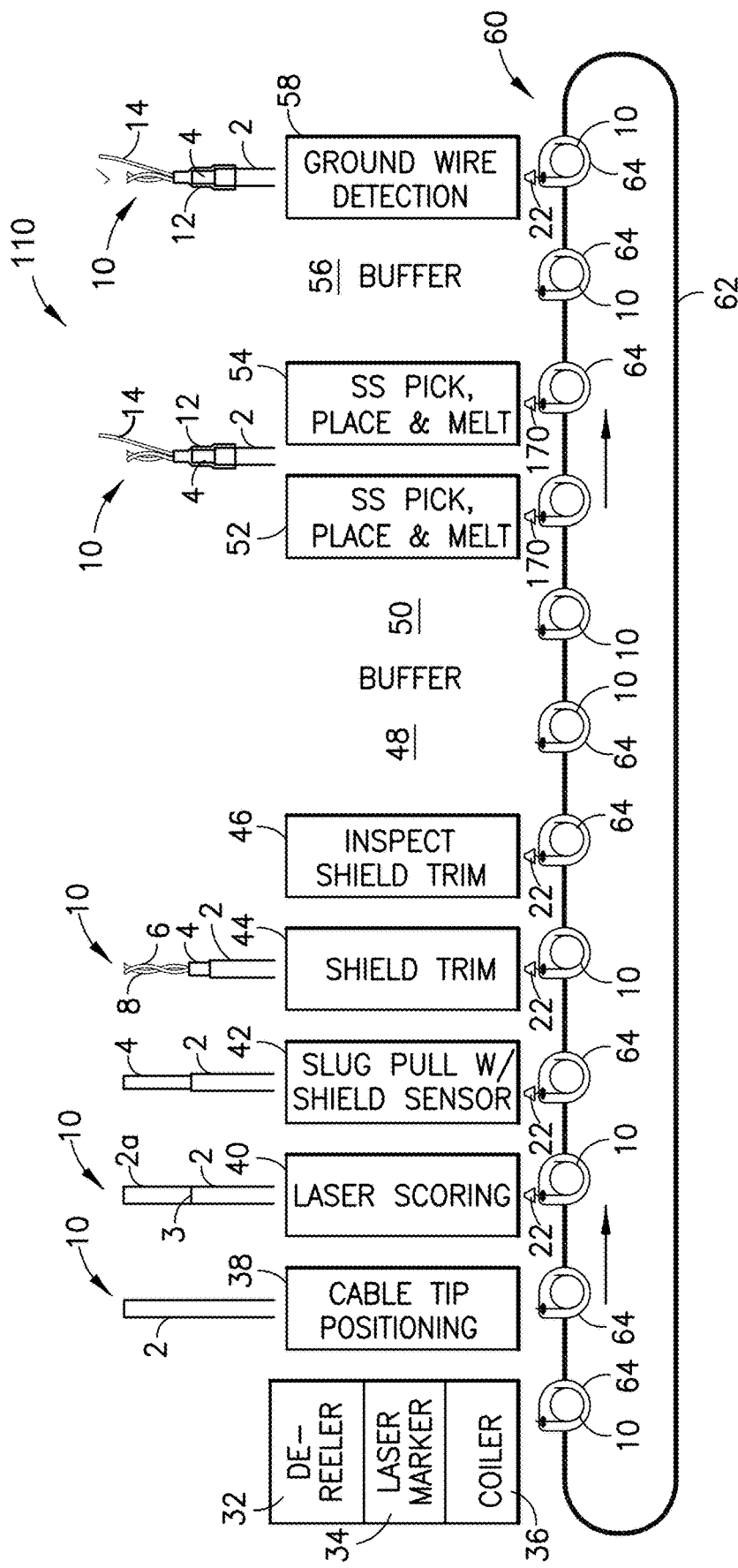
FIG. 1 is a diagram representing and identifying components of an automated system for performing respective operations on an end of a cable at a plurality of cable processing modules in accordance with one embodiment.

FIG. 1 is a diagram representing and identifying components of a system 110 for performing respective operations on an end of a cable 10. The system 110 includes a cable delivery system 60. For example, the cable delivery system 60 may take the form of a conveyor system with locating modules (not shown in FIG. 1). Locating modules are components for positioning pallets in preparation for performance of an automated operation. In accordance with the embodiment depicted in FIG. 1, the cable delivery system 60 includes a conveyor track 62 in the form of an endless belt or chain. The entire conveyor track 62 is continuously moving. In alternative embodiments, the cable delivery system 60 is not endless, in which case pallets 64 arriving at the end of a linear conveyor track may be transported to the starting point by other means. In accordance with alternative embodiments, the cable delivery system 60 may be a gantry robot or a robotic arm.

The system 110 depicted in FIG. 1 further includes a multiplicity of automated workstations situated adjacent to and spaced at intervals along the conveyor track 62. Each workstation is equipped with hardware that performs a respective specific operation in a sequence of operations designed to produce a shielded cable 10 having a solder sleeve 12 installed on one end of the cable 10. The locating modules (not shown in FIG. 1) of the system 110 are used to lift each pallet 64 off of the conveyor track 62 when an operation has to be performed at a workstation on the coil carried by that pallet 64 and later place the pallet 64 back on the conveyor track 62 after the operation has been completed so that the pallet 64 can move onto the next workstation.

Each pallet 64 carries a respective coil of cable 10. Pallets 64 move intermittently along the conveyor track 62 in the forward direction indicated by the arrows in FIG. 1, advancing from one automated workstation to the next and then stopping. (This aspect of the cable delivery system 60 will be referred to hereinafter as "pulsing".) A respective bar code reader (not shown in the drawings) is mounted on the side of the conveyor track 62 opposite to each workstation. Each pallet 64 has a bar code printed on a forward side portion thereof. When the bar code reader detects the arrival of a pallet 64, each workstation has a respective controller (e.g., a computer programmed to execute computer numeric control (CNC) commands) that activates the cable processing module of that workstation to begin an automated cable processing operation.

Each shielded cable 10 to be processed is carried on a respective pallet 64 that is conveyed along the conveyor track 62. The pallets 64 pulse down the conveyor track 62 and the end of each shielded cable is inserted into a series of cable processing modules in sequence, each cable processing module including cable processing equipment for performing successive operations of a solder sleeve installation process. In accordance with the embodiment depicted in FIG. 1, the cable processing modules include the following: a de-reeler module 32, a laser marker 34, a coiler module 36, a cable tip positioning module 38, a laser scoring module 40, a jacket slug pulling module 42, a shield trimming module 44, a shield trim inspection module 46, two solder sleeve installation modules 52 and 54 (also referred to herein as "solder sleeve pick, place and melt modules"), and a ground wire detection module 58. In accordance with the proposed implementation depicted in FIG. 1, there are three open positions where cable processing does not occur. These open positions are referred to herein as buffers 48, 50 and 56. The purpose of these buffers will be explained later.

As indicated in FIG. 1 by triangle symbols, some of the workstations include funnels 22 (shown in more detail in FIGS. 18A-18D) which center the inserted end of the cable 10 in the cable processing equipment at the respective workstation. Other workstations, such as the workstation where the cable tip positioning module 38 is located, do not have a funnel. The workstations where the two solder sleeve installation modules 52 and 54 are located have open-top or split funnels 170 (shown in more detail in FIGS. 21 and 22), which also guide the end of the cable 10, but differ in structure from the funnels 22 in that the cable may be lifted vertically out of the open or split funnel 170 upon completion of the solder sleeve melting operation.

Each of the automated cable processing operations identified in FIG. 1 will now be briefly described in some detail. The respective cable processing modules will be described in the order in which the respective cable processing operations are performed on one cable.

The starting material is a continuous length of multi-conductor shielded cable of a particular type wound on a reel. The de-reeler module 32 de-reels the continuous length of cable and then cuts the cable to a length, which length of cable will be referred to hereinafter as "cable 10". Preferably a multi-spool de-reeler is used so that multiple cable types can be selected for processing off of a single machine. For each length of cable 10, the laser marker 34 laser marks the outer jacket 2 of the cable 10 with pertinent information (bundle number, wire number, gauge).

The coiler module 36 receives each length of cable 10 from the de-reeler module 32 and laser marker 34 and coils the cable 10. This creates a repeatable configuration for the cable that is easy to transport and maintain as it goes through the system. The coiler module 36 coils cables 10 and applies a sticker label. This label contains information about the cable (airplane effectivity, bundle, dash, wire identification, etc.), as well as a bar code. In accordance with one proposed implementation, the coiler module 36 ensures that one end of the coiled cable 10 has 7 inches of "free" cable.

The coil of cable 10 is taken off of the coiler and placed on a pallet 64. The pallet 64 is then transferred from the coiler module 36 to the cable tip positioning module 38. This may be done manually by an operator or automatically by a robotic end effector (or some other apparatus).

The cable tip positioning module 38 serves to initially position the tip of the cable 10 at a preset cable tip position prior to the cable 10 continuing through the system 110. It is the first "stop" along the conveyor track 62, and is where the cable 10 is first placed onto the system. The preset cable tip position is selected to prevent the cable end from being too long as it travels along the conveyor track (hitting other objects within the system, being crushed or otherwise damaged, etc.). After the cable tip positioning module 38 has positioned the cable tip 10*b* at the preset cable tip position, the pallet 64 leaves the cable tip positioning module 38.

In accordance with the embodiment depicted in FIG. 1, after the cable tip positioning module 38 has positioned the cable tip 10*b*, the pallet 64 moves to the laser scoring module 40. The workstation where the laser scoring module 40 is located also includes a funnel 22 for guiding a cable 10 into the cable processing equipment of the laser scoring module 40. The laser scoring module 40 lightly scores the jacket 2 of the cable 10 along a score line 3 which extends circumferentially in a plane that intersects an annular region of the jacket 2. The presence of the laser score line 3 prepares the applicable segment of jacket 2 (hereinafter "the jacket slug 2*a*") to be removed.

After the laser scoring module 40 has scored the jacket 2 of the cable 10, the pallet 64 moves to the jacket slug pulling module 42. The workstation where the jacket slug pulling module 42 is located also includes a funnel 22 for guiding a cable 10 into the cable processing equipment of the jacket slug pulling module 42. The jacket slug pulling module 42 removes the jacket slug 2*a* to reveal the shield 4 in the unjacketed portion of the cable 10. An electrical continuity shield sensor (not separately depicted in FIG. 1) may be integrated with the jacket slug pulling module 42 to detect that the jacket slug 2*a* was removed prior to retracting the cable 10 from the jacket slug pulling module 42.

In accordance with some embodiments, the above-described cable positioning system may be used to position the tip of the cable at multiple positions within any given processing module. Such feature allows multi-step processing within a single module. The tip of the cable, for example, could be positioned at multiple positions within the laser scoring module 40 to allow the laser to score the cable in multiple locations. For very long strip lengths (four inches for example) the cable could be laser scored every inch. The jacket slug pulling module 42 would then pull of each one-inch slug one at a time (again using multi-step insertion). Thus the jacket puller only needs to overcome pull-off friction forces for one inch of jacket instead of four inches of jacket.

After the jacket slug pulling module 42 has pulled off the jacket slug 2*a* of the cable 10, the pallet 64 moves to the shield trimming module 44. The workstation where the shield trimming module 44 is located also includes a funnel 22 for guiding a cable 10 into the cable processing equipment of the shield trimming module 44. The shield trimming module 44 trims off a portion of the exposed portion of the shield 4 to reveal respective portions of the wires 6 and 8 of the cable 10. In accordance with one proposed implementation, the shield trimming module 44 trims the shield 4 of the cable 10 about 0.25" from the edge of the jacket 2.

After the shield trimming module 44 has trimmed the shield 4 of the cable 10, the pallet 64 moves to the shield trim inspection module 46. The workstation where the shield trim inspection module 46 is located also includes a funnel 22 for guiding a cable 10 into the cable processing equipment of the shield trim inspection module 46. The shield trim inspection module 46 performs a quality check of the trimmed shield using a vision inspection system. The quality check ensures that the shield 4 meets the specifications for the particular type of cable 10 (e.g., shield strands are not too long or too short, not damaged, etc.) prior to installing a solder sleeve 12.

After the shield trim inspection module 46 has inspected the trimmed shield 4 of the cable 10, the pallet 64 moves to one of two solder sleeve installation modules 52 and 54. The workstations where the solder sleeve installation modules 52 and 54 are located also include an open funnel 170 (described later with reference to FIGS. 21 and 22) for guiding a cable 10 into the cable processing equipment of the solder sleeve installation modules 52 and 54. The solder sleeve installation modules 52 and 54 are configured to install a solder sleeve 12 with a ground wire 14 onto the cable 10 using automated picking, placing and melting operations. Each solder sleeve installation modules preferably includes a sensor system that actively measures the diameter of the cable with solder sleeve and monitors the shrinking diameter of the solder sleeve during the melting process using dimensional analysis. The sensor system activates or deactivates the heating element based on the dimensional analysis of the solder sleeve; this may also control the transportation of the cables through the device.

Solder sleeves are limited in how quickly they are able to fully melt without burning due to their design and materials. The type of heat source used (hot air, infrared) has no significant impact on the melt time. This creates a bottleneck on the moving line, due to the fact that all processes prior to the solder sleeve melting operation take much less time to complete, and limits the lowest achievable cycle time of the overall line.

In accordance with one proposed implementation, two cables 10 may have solder sleeves installed concurrently using the two solder sleeve installation modules 52 and 54.

After the solder sleeve 12 has been installed on the cable 10 by one of the solder sleeve installation modules 52 and 54, the pallet 64 moves to ground wire detection module 58. The workstation where the ground wire detection module 58 is located also includes a funnel 22 for guiding a cable 10 into the cable processing equipment of the ground wire detection module 58. The ground wire detection module 58 detects the ground wire 14 of the solder sleeve 12. This may be done through physical sensing or an electrical continuity test, all of which are commercially available off the shelf.

As seen in FIG. 1, the cable delivery system 60 includes multiple pallets 64 that travel on the conveyor track 62, each pallet 64 carrying a respective coil of cable 10. In accordance with some embodiments, the apparatus on the pallet 64 includes a pair of cable-displacing wheels (e.g., a motor-driven drive wheel and a spring-loaded idler wheel that is movable between positions that are respectively in contact with and not in contact with the motor-driven drive wheel) designed to push and pull cables through a cable-guiding funnel which centers the cable for insertion into the cable processing equipment. The ability of the drive and idler wheels to move apart enables wires or cables of varying diameters and cross-sectional profiles to be placed between the drive and idler wheels. This apparatus is intended to be universal, i.e., to be able to be used on any equipment (including benchtop equipment) that processes wires and/or cables. Additionally, a user would be able to define the amount (length) of cable that is fed into the equipment, depending on the cable that is to be processed and its related requirements.

Figure 2A:
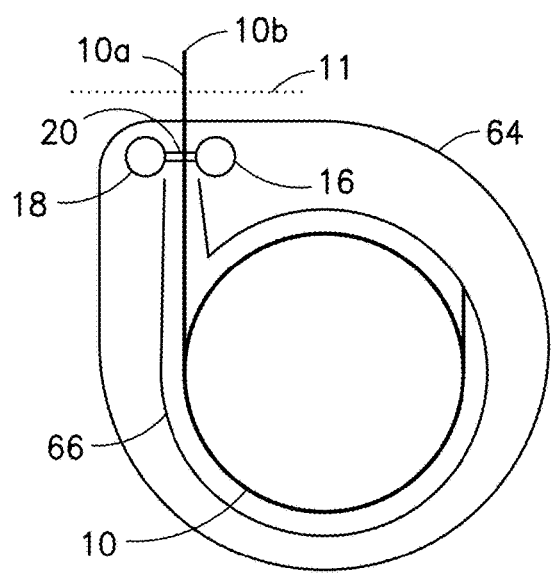
FIGS. 2A and 2B are diagrams representing top views of a cable-carrying, drive wheel-equipped pallet in accordance with one embodiment in two states: when the drive wheel is separated from an idler wheel (FIG. 2A) and when the drive wheel is in contact with the idler wheel (FIG. 2B).
Figure 2B:
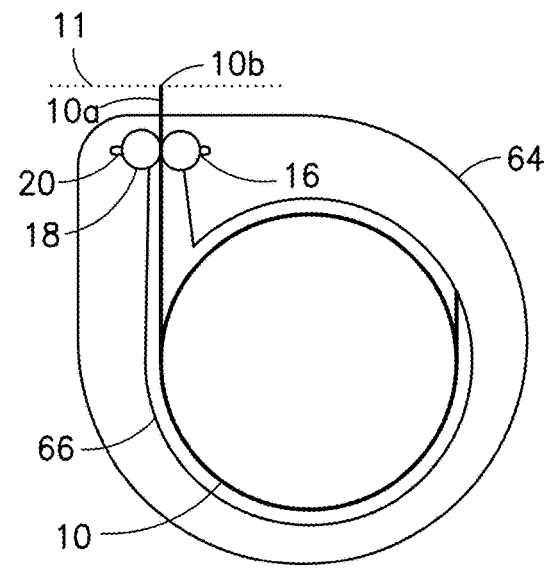

Some features of a pallet 64 in accordance with one embodiment will now be described with reference to FIGS. 2A and 2B; other features of the pallet 64 not shown in FIGS. 2A and 2B will be described later with reference to other drawings. As seen in FIGS. 2A and 2B, each pallet 64 has a drive wheel 16 and an idler wheel 18 which are rotatably coupled to the pallet 64. The drive wheel 16 and idler wheel 18 are preferably padded with a compliant material capable of conforming to different cross-sectional profiles (e.g., a single conductor cable versus a twisted-pair cable). An encoder may be attached to one or both of the wheels in order to more accurately track how far the cable 10 has been moved by the wheels. The encoder tracks the "distance travelled" of a drive roller by multiplying the number of rotations by the circumference of the drive roller 16.

The pallet 64 also includes a corral 66 in the form of a curved wall that is contoured to guide the cable end 10a toward the drive wheel 16 and idler wheel 18. The drive wheel 16 and idler wheel 18 cooperate to move the cable end 10a into and out of an adjacent cable processing module 30. FIGS. 2A and 2B show the pallet 64 in two states: when the drive wheel 16 is separated from the idler wheel 18 (FIG. 2A) and when the drive wheel 16 is in contact with the idler wheel 18 (FIG. 2B).

As seen in FIG. 2A, the free end 10a of the cable 10 is placed between the drive wheel 16 and idler wheel 18 so that the cable tip 10b is at a position in front of the nip, while the cable 10 is intersected by a vertical scanning plane 11 (indicated by a dashed line in FIGS. 2A and 2B) located at a known position. This known position is a known distance from a preset cable tip position. Although FIG. 2A shows the cable tip 10b located beyond the vertical scanning plane 11, the starting position of the cable tip 10b may be either beyond or short of the vertical scanning plane 10.

The force holding the idler wheel 18 apart from drive wheel 16 is then discontinued, following which the idler wheel 18 is urged by springs (not shown in FIGS. 2A and 2B) into contact with the drive wheel 16, thereby forming a nip that squeezes the cable 10. As will be described in further detail below, the drive wheel 16 and idler wheel 18 are configured so that sufficient frictional forces are produced that enable the cable 10 to be either pushed or pulled through the nip depending on the directions of wheel rotation. Upon detection of the presence of the cable tip 102b at a position beyond the vertical scanning plane 11, the drive wheel 16 and idler wheel 18 are rotated in a cable pulling direction to cause the cable end 10a to retract and the cable tip 10b to move toward the vertical scanning plane 11. Conversely, if the cable tip 102b were at a position short of the vertical scanning plane 11 (hereinafter "scanning plane 11"), the drive wheel 16 and idler wheel 18 would be rotated in a cable pushing direction to cause the cable end 10a to extend and the cable tip 10b to move toward the scanning plane 11. The remainder of the description of FIGS. 2A and 2B will discuss the case wherein the cable end 10b is initially placed in a position such that the cable tip 102b is beyond (not short of) the scanning plane 11

The movement of the cable tip 10b is monitored by detecting when the cable tip 10b reaches the scanning plane 11. This is accomplished by a photoelectric sensor (not shown in FIGS. 2A and 2B, but see photoelectric sensor 28 in FIGS. 3A and 3B) mounted to the pallet 64 and configured to function as a light gate. In accordance with some embodiments, the photoelectric sensor 28 is configured to act as a light gate that detects when there is no portion of the cable 10 blocking a light beam propagating in the scanning plane 11 from one side of the light gate to the other side. FIG. 2B shows the state wherein the cable tip 10b is aligned with the scanning plane 11 following retraction of the cable end 10a. In response to the photoelectric sensor 28 detecting a transition between a state of light being interrupted (e.g., blocked) in the scanning plane 11 and a state of light not being interrupted, the photoelectric sensor 28 issues a cable tip position signal indicating the transition between interruption and no interruption of transmitted light at the scanning plane. In response to issuance of the cable tip position signal, the computer of the cable positioning module activates a motor (not shown in FIGS. 2A and 2B, but see motor 72 in FIGS. 3A and 3B) to rotate the drive wheel 16 an amount and in a direction such that at the end of the rotation, the cable 10 does not extend beyond a preset cable tip position. This preset cable tip position is a known distance from the scanning plane 11. The preset cable tip position may be selected to ensure that the cable tip 10b may travel along the conveyor track 62 with sufficient clearance to avoid damage from stationary objects.

Figure 2C:
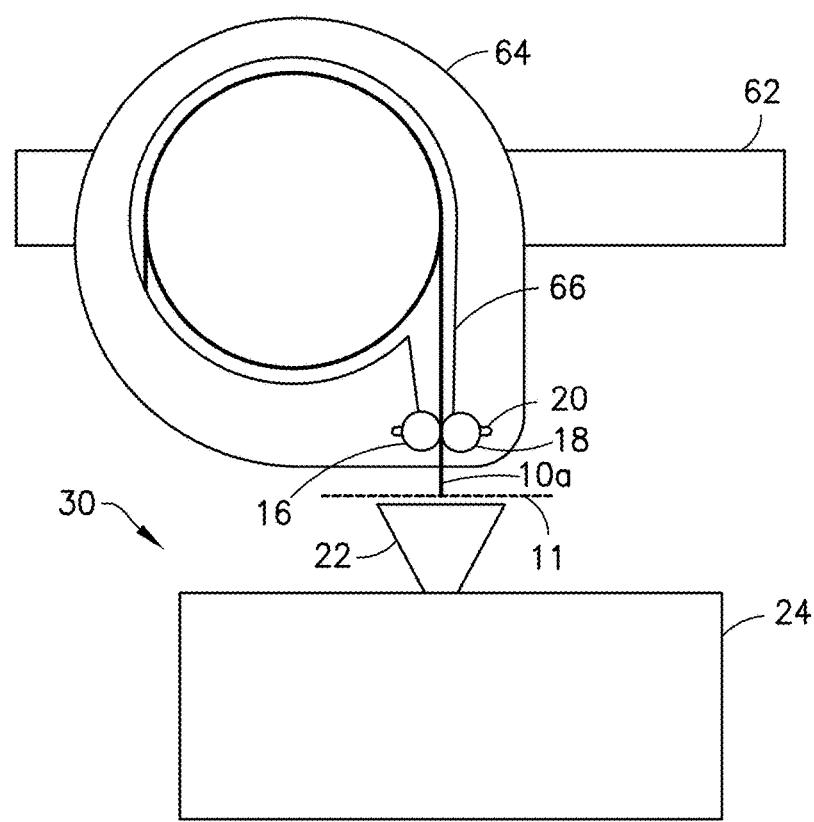
FIG. 2C is a diagram representing a top view of the pallet depicted in FIG. 2B in a position adjacent a cable processing module where a tip of the cable is positioned in front of a funnel.
Figure 14A:
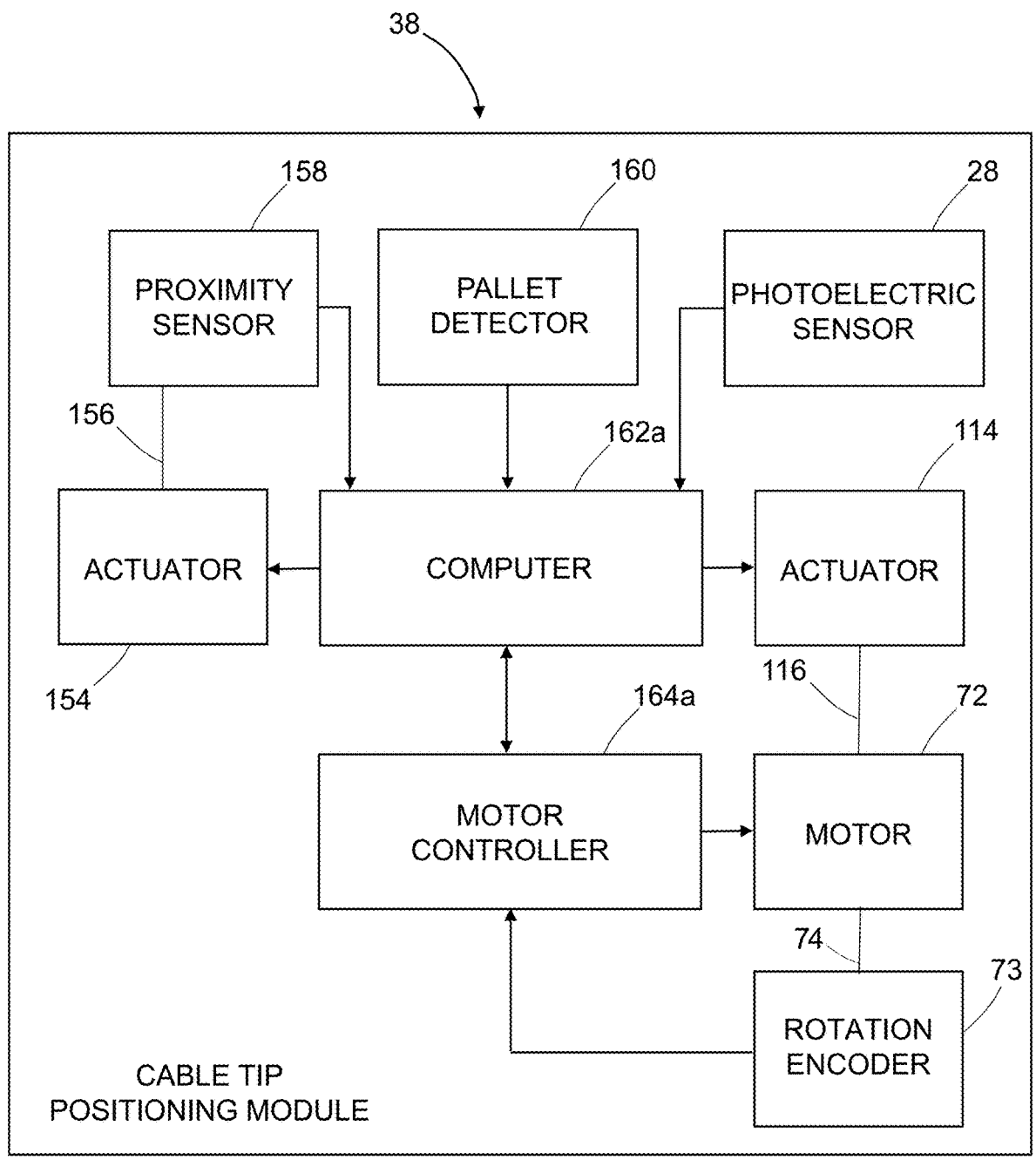
FIG. 14A is a block diagram identifying components of a cable tip positioning module in accordance with one embodiment.

The cable tip positioning module 38 includes a computer system (not shown in FIG. 2C, but see computer 162a and motor controller 164a in FIG. 14A). The cable tip positioning signal from the photoelectric sensor 28 is received by the computer 162a. The computer 162a is configured to de-activate the motor 72 that drives rotation of the drive wheel 16 (thereby ceasing driving rotation of the drive wheel 16 in the cable pulling direction) after a predetermined angular rotation of the drive wheel 16 subsequent to issuance of the cable tip position signal. In other words, there is a time delay during which the drive wheel 16 and idler wheel continue to move the cable end 10a, causing the cable tip 10b to move from the current position depicted in FIG. 2B (in this instance, corresponding to the position of the scanning plane 11) to a preset cable tip position a short distance (e.g., 0.5 inch) from the scanning plane 11. More specifically, the computer 162a is configured to start a count of pulses output by a rotation encoder (mounted on the drive wheel shaft 88 or the motor output shaft, for example) in response to issuance of the cable tip position signal and then de-activate the motor 72 in response to the count reaching a specified value representing the distance separating the preset cable tip position from the scanning plane 11.

In accordance with an alternative embodiment, the preset cable tip position and the position of the scanning plane may be one and the same, provided that the movement of the cable 10 can be stopped precisely at the instant in time when the sensor 28 issues the cable tip position signal.

The above-described cable tip positioning process ensures that the cable tip 10b is in a repeatable position and does not extend beyond the preset cable tip position prior to continuing down the conveyor track 62. At this juncture, the conveyor track 62 pulses forward, causing the pallet to move to the next workstation.

FIG. 2C is a diagram representing a top view of the pallet 64 in a position adjacent a cable processing module 30. The apparatus includes a drive wheel 16 and an idler wheel 18 configured to drive the cable 10 forwards or backwards between the wheels and a funnel 22 capable of capturing the cable end 10a. While the wheels control the motion of the cable 10, the funnel 22 serves to center the cable 10 for insertion into the cable processing equipment. This function will be used to insert and position the cable 10 into different modules for processing as the cable 10 is transported through the system.

More specifically, the cable tip 10b is positioned in front of a funnel 22 that is configured to center a cable end 10a as it is fed into the cable processing equipment 24 of a cable processing module 30. Each cable processing module 30 is equipped with a funnel 22 (or open-top funnel 170 shown in FIG. 21) and a photoelectric sensor (not shown in FIG. 2C, but see photoelectric sensor 28 in FIG. 14A) for detecting the presence of the cable tip 10b in a scanning plane 11 (indicated by a dashed line in FIG. 2C). It is important that the interior surface of the funnel 22 be smooth and devoid of any rough or sharp edges that may abrade, tear, or otherwise damage the cable 10. Preferably the funnel 22 is made of a thermoplastic material with a low coefficient of friction to prevent the funnel 22 from slowing the cable 22 down as it is moved by the drive wheel 16 and idler wheel 18 (preventing slippage). The funnel 22 may be configured in different ways. In lieu of a basic hole on the exit side of the funnel 22 (small diameter side), the funnel 22 may have a flexible piece of material featuring an X-shaped cut centered within the funnel 22. This helps to provide a repeatable, centered position for the cable 10 as it is either pushed forward or pulled back. It also permits the cable-guiding funnel to accurately center cables with varying diameters and cross sectional profiles. Other cable-guiding funnels may also be split and/or feature an open top (described later with reference to FIGS. 21 and 22).

Figure 3A:
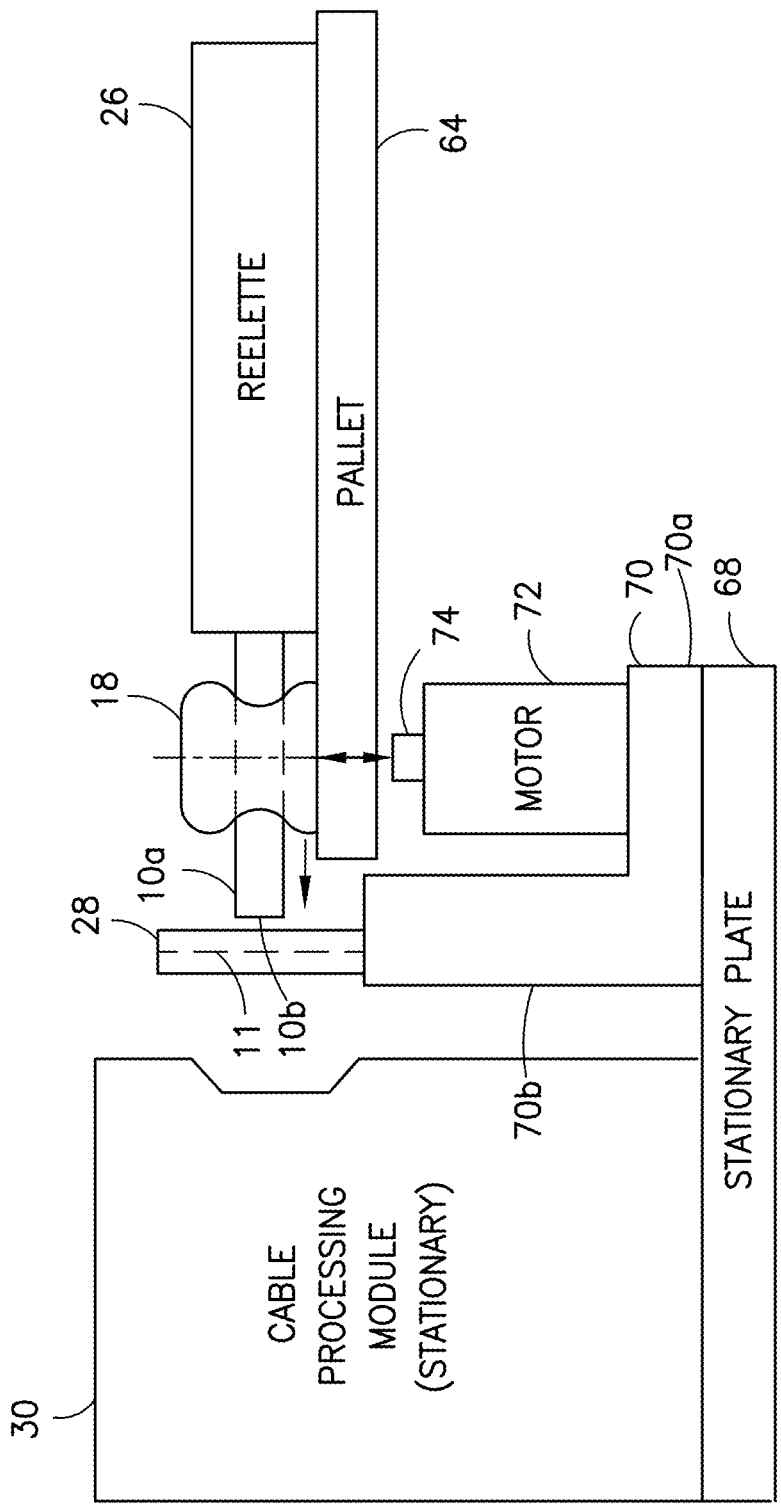
FIG. 3A is a diagram representing a side view of a pallet in a position adjacent a cable processing module, which pallet is equipped with a reelette for holding a coil of cable and a drive wheel for feeding an end of the cable into cable processing equipment in accordance with a further embodiment.
Figure 3B:
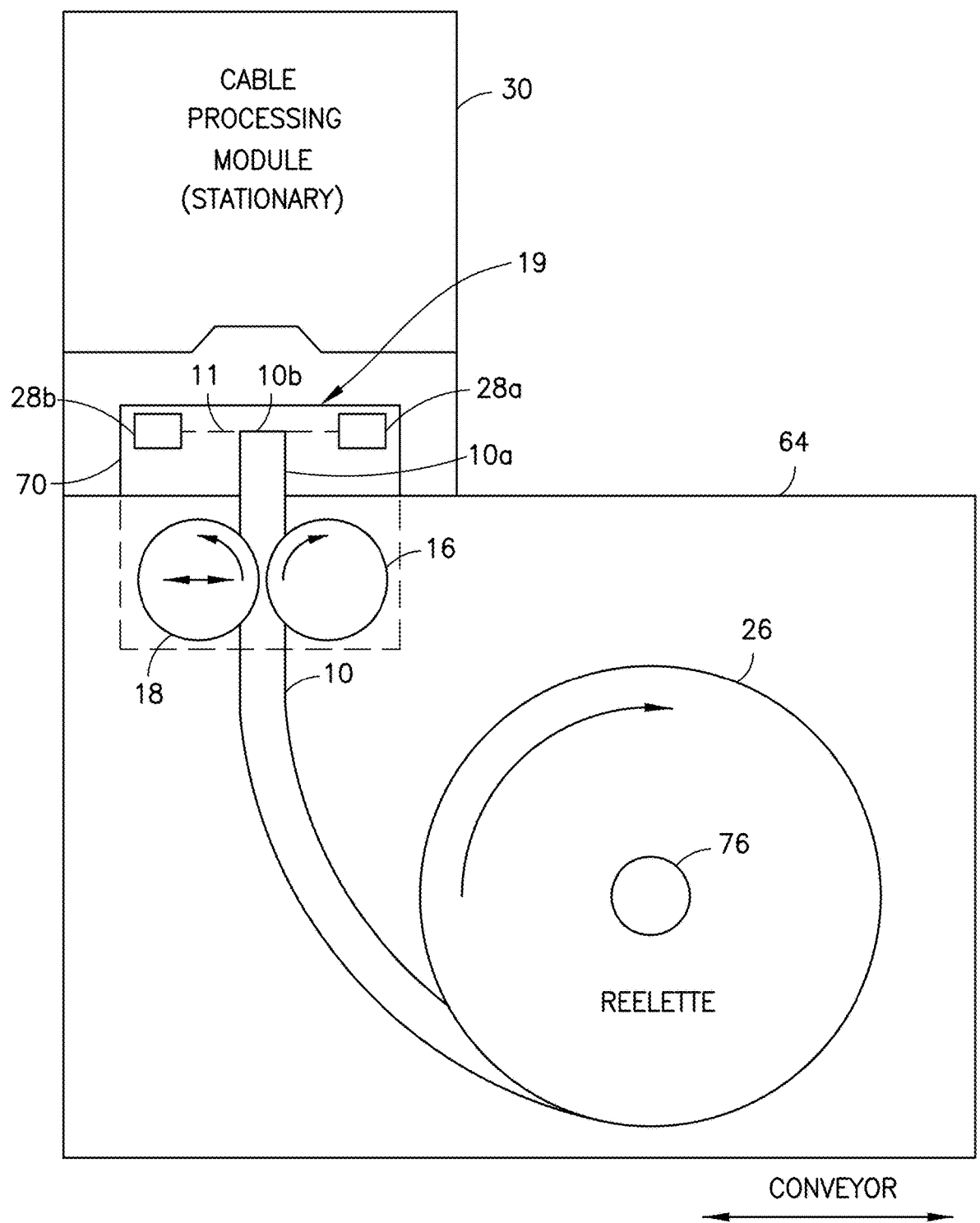
FIG. 3B is a diagram representing a top view of the apparatus depicted in FIG. 3A.

In accordance with some embodiments, each workstation includes a stationary motor (not shown in FIG. 2C, but see motor 72 in FIGS. 3A and 3B). In accordance with one proposed implementation, the motor 72 is an electric stepper motor. The motor shaft speed will control how fast the drive wheel rotates (the speed at which the end of the cable 10 is moved), as well as which directions the wheels rotate in. The motor 72 is configured to rotate either clockwise or counterclockwise.

In response to detection of the arrival of the pallet 64 at the cable processing module 30 by a pallet detector (not shown in FIG. 2C, but see pallet detector 160 in FIG. 14B), the motor 72 is operatively coupled to the drive wheel 16. Subsequently the motor 72 is activated to drive the drive wheel 16 to rotate in the cable pushing direction. The shaft of the motor 72 is optionally equipped with a rotary encoder 73 (see FIG. 14B) for determining the angular rotation of the drive wheel 16. During rotation of the drive wheel 16 in the cable pushing direction, the rotary encoder 73 tracks the rotation of the motor shaft to generate digital position information representing the length of cable 10 which has been fed past the scanning plane 11.

When a pallet 64 stops at the cable processing module 30, the drive wheel 16 and idler wheel 18 are driven to rotate in a cable pushing direction to cause the cable tip 10b to pass the photoelectric sensor 28, through the funnel 4, and into the cable processing equipment 24. Once the photoelectric sensor 28 is triggered, the rotation encoder 73 will begin to record the position of the cable tip 10b. This provides a way to track the inserted length of the cable 10 in real time, and subsequently cause the motor 72 to stop once the correct length of cable 10 has been fed into the cable processing equipment 24. The drive wheel 16 and idler wheel 18 continue to rotate in the cable pushing direction until a specified length of cable 10 has been inserted into the cable processing equipment 24 via the funnel 22. In some cases, the cable 10 may be inserted in stages to achieve the insertion of a specified length of length.

FIG. 3A is a diagram representing a side view of a pallet 64 in a position adjacent a cable processing module 30, which pallet 64 is equipped with a reelette 26 for holding a coil of cable 10 and a drive wheel 16 (not visible in FIG. 3A) for feeding an end of the cable 10 into the cable processing module 30 in accordance with a further embodiment. FIG. 3B shows a top view of the pallet 64 in a position adjacent the cable processing module 30.

As seen in FIG. 3A, the cable processing module 30 is mounted on a stationary plate 68. A stanchion 70 is affixed to the stationary plate 68 in a position in front of the cable processing module 30. A motor 72 is mounted to a base 70a of the stanchion 70. The motor 72 has an output shaft 74 which drives rotation of the drive wheel 16 (not visible behind the idler wheel 18 in FIG. 3A). In addition, a photoelectric sensor 28 is mounted to an upright portion 70b of the stanchion 70. The photoelectric sensor 28 is placed at an elevation such that the photoelectric sensor 28 is able to detect the cable tip 10b when it passes through a scanning plane 11 (indicated by a dashed line in FIGS. 3A and 3B) during cable pushing.

In accordance with the embodiment depicted in FIG. 3A, each coil of cable 10 is individually wound onto its own reelette 26, which reelette 26 is supported by and rotatably coupled to the pallet 64. The corral 66 (see in FIGS. 2A-2C) is not shown in FIG. 3A so that the reelette 26 is visible. The reelette 26 has an opening (not shown in FIG. 3A) on its outer periphery through which a portion of the cable 10 (including cable end 10a) passes. FIG. 3A shows a state in which the cable end 10a is disposed between rotating drive wheel 16 and idler wheel 18 (drive wheel 16 is located directly behind the idler wheel 18 and not visible in FIG. 3A), while the cable tip 10b is moving in a direction (indicated by an arrow in FIG. 3A) toward the cable processing module 30.

FIG. 3B shows a top view of the pallet 64 when the cable tip 10b is positioned at a scanning plane 11 of the photoelectric sensor 28. The double-headed straight arrow superimposed on the idler wheel 18 indicates that the idler wheel 18 is laterally movable away from and toward the drive wheel 18. Meanwhile the curved arrows superimposed on the drive wheel 16 and idler wheel 18 are intended to indicate that the drive wheel 16 and idler wheel 18 are rotating in a cable pushing direction. At the instant of time depicted in FIG. 3B, the cable tip 10b is positioned at the scanning plane 11 and is moving toward the cable processing module 30.

Figure 14B:
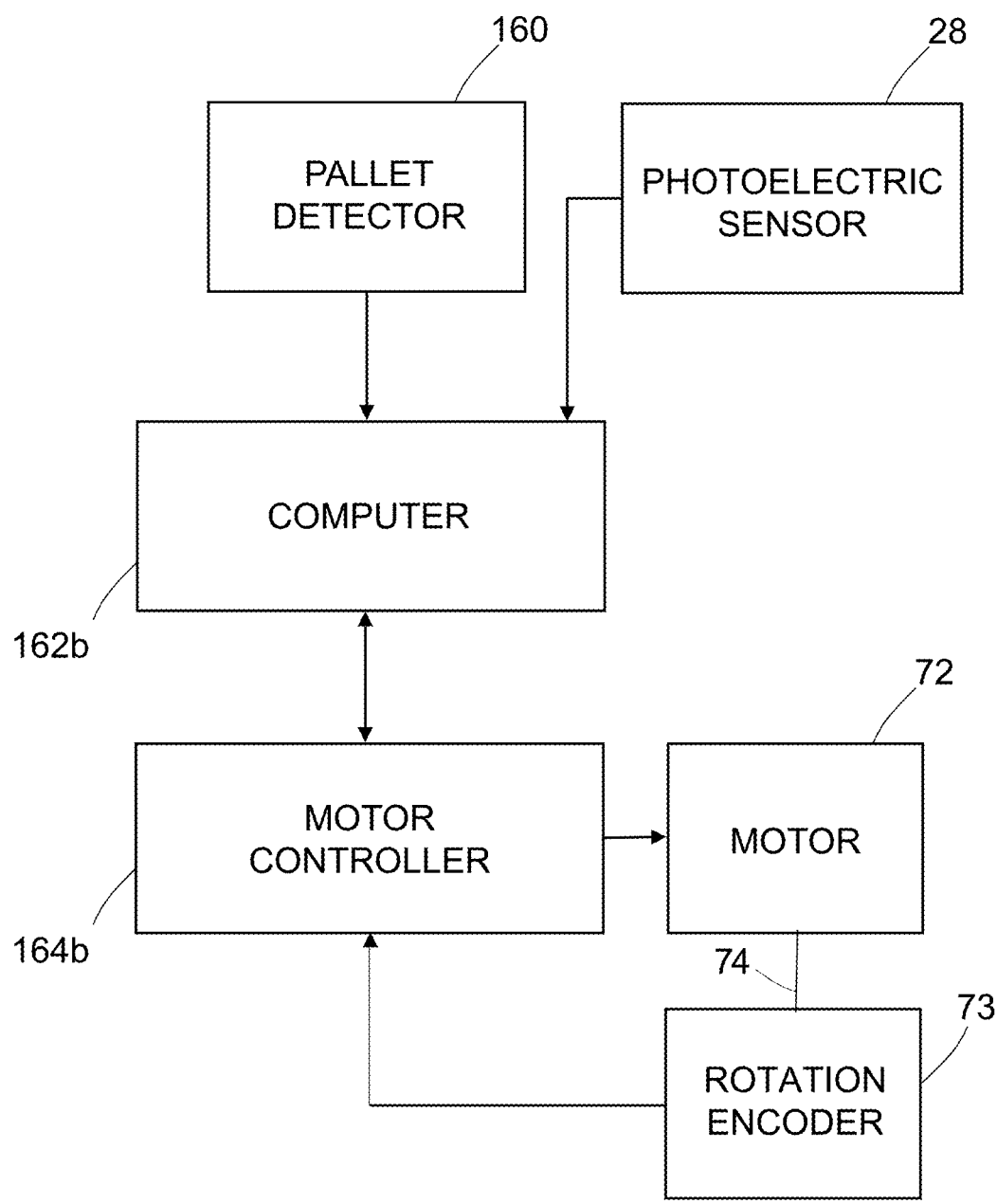
FIG. 14B is a block diagram identifying components of a cable processing workstation in accordance with one embodiment.

The cable processing module 30 includes a computer (not shown in FIGS. 3A and 3B, but see computer 162b in FIG. 14B). The computer 162b of each cable processing module 30 is configured to perform the following operations: activate the motor 72 to drive rotation of the drive wheel 16 in a cable pushing direction to cause a specified length of cable 10 to be inserted into the cable processing equipment 24; activate the cable processing equipment 24 to perform an operation on the inserted cable end 10a; and activate the motor 72 to drive rotation of the drive wheel 16 in a cable pulling direction to cause the specified length of cable 10 to be removed from the cable processing equipment 24.

As seen in FIG. 14B, each workstation further comprises a rotation encoder 73 configured to output pulses representing the incremental angular rotations of an output shaft of the motor 72. The photoelectric sensor 28 is positioned and configured to issue a cable tip position signal indicating that interruption of transmitted light in the scanning plane 11 has started. In other words, the cable tip position signal is issued in response to the photoelectric sensor 28 detecting that a state of light not being blocked in the scanning plane 11 has transitioned to a state of light being blocked. The computer 162b is further configured to start a count of pulses output by the rotation encoder 73 in response to the cable tip position signal and then de-activate the motor 72 in response to the count reaching a specified value corresponding to a specific target length of cable 10 having been inserted in the cable processing equipment 24.

The photoelectric sensor 28 that detects the position of the cable tip 10b in each cable processing module 30 may be of the same type as the photoelectric sensor 28 incorporated in the cable tip positioning module 38. For example, digital laser sensors of various types are suitable. Many adaptable options are available off the shelf, such as proximity sensors and vision sensors.

In accordance with some embodiments, the photoelectric sensor 28 used to detect cable tip position is of a type that is also capable of measuring the diameter of the cable 10 to ensure that false positives are not caused by fingers or other objects larger than the typical cable diameter. The diameter measurement may also be used to confirm that the cable 10 is of the type expected by the computer 162b of the cable processing module 30.

In accordance with one proposed implementation, the photoelectric sensor 28 is a laser sensor of the "position recognition" type. In a laser scanner of this type, a scanning laser beam is emitted from a scanning light beam transmitter 28a, which scanning light beam scans in the scanning plane 11 and is then received by the light-detecting sensor 28b. In accordance with one embodiment, the light-detecting sensor 28b includes a linear array of light-detecting elements (e.g., a column of pixels in a charge coupled device). The area where the scanning laser beam is interrupted is identified clearly on the light-detecting sensor 28b. This type of laser sensor may be used for in-line cable tip position detection or cable outer diameter measurement.

The computer 162b of the cable processing module 30 is further configured to perform the following operations: compute a length of an interruption in light received by the light-detecting sensor 28b from the scanning light beam transmitter 28a; compare the computed length of the interruption to reference data representing a diameter of the type of cable 10 to be processed; and issue an alert signal when a difference of the computed length of the interruption and the reference data exceeds a specified threshold.

Figure 4:
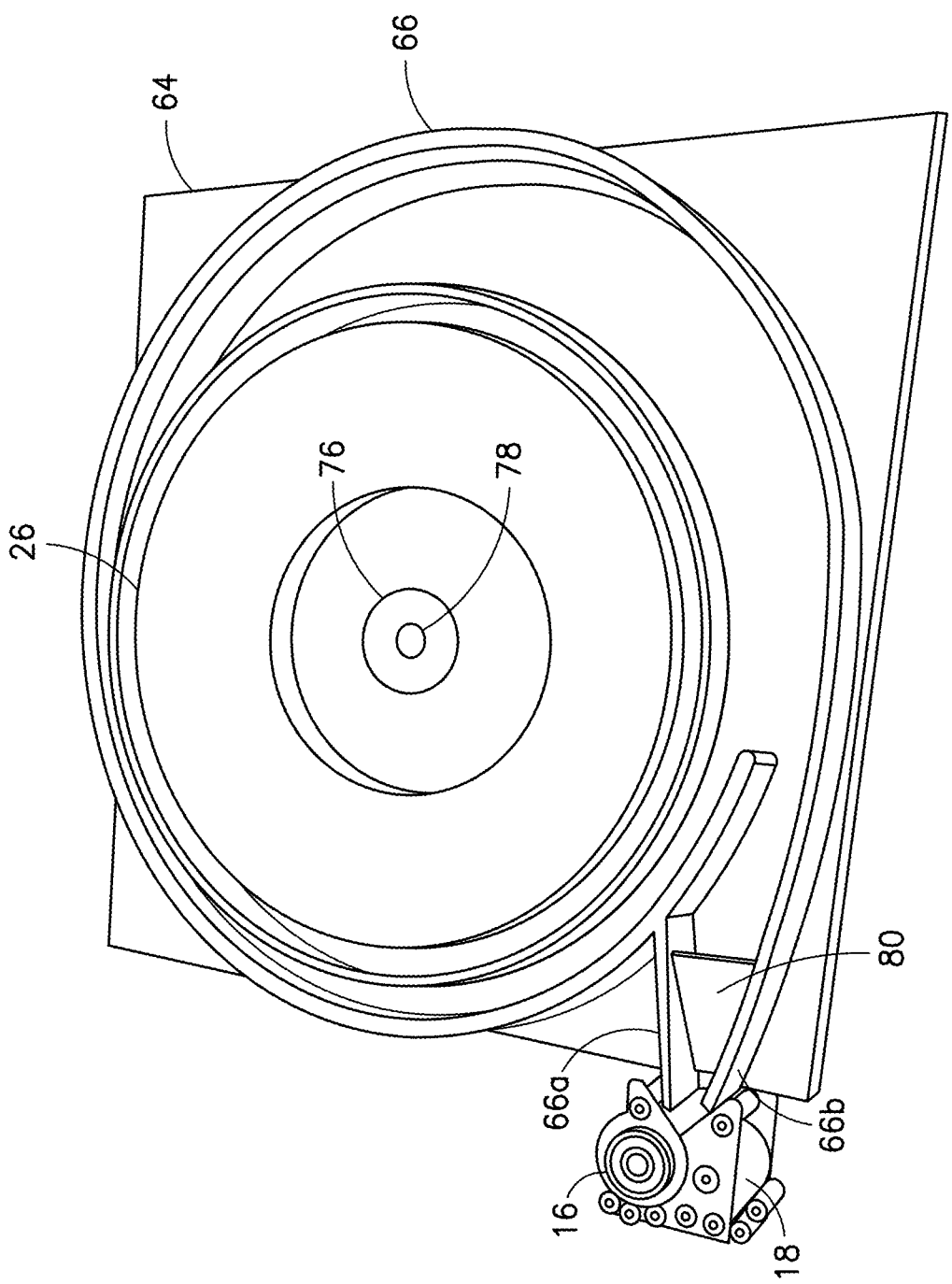
FIG. 4 is a diagram representing a view of an apparatus configured in accordance with one embodiment for carrying and positioning an end of a cable.

FIG. 4 is a diagram representing a view of a cable-feeding apparatus that includes a pallet 64 equipped with in a drive wheel 16 and an idler wheel 18 that is fixed relative to the drive wheel 16. The reelette 26 has a center hub 76 which is rotatable when coupled to a reelette shaft 78. Rotation of the reelette 26 causes the cable end 10b to move toward the nip between the drive wheel 16 and idler wheel 18. The corral 66 includes converging guide walls 66a and 66b which guide the cable end 10a laterally toward the nip between the drive wheel 16 and idler wheel 18. In addition, a slanted deflection plate 80 overhangs the space between converging guide walls 66a and 66b and deflects the cable end 10a vertically downward and toward the nip.

Figure 5:
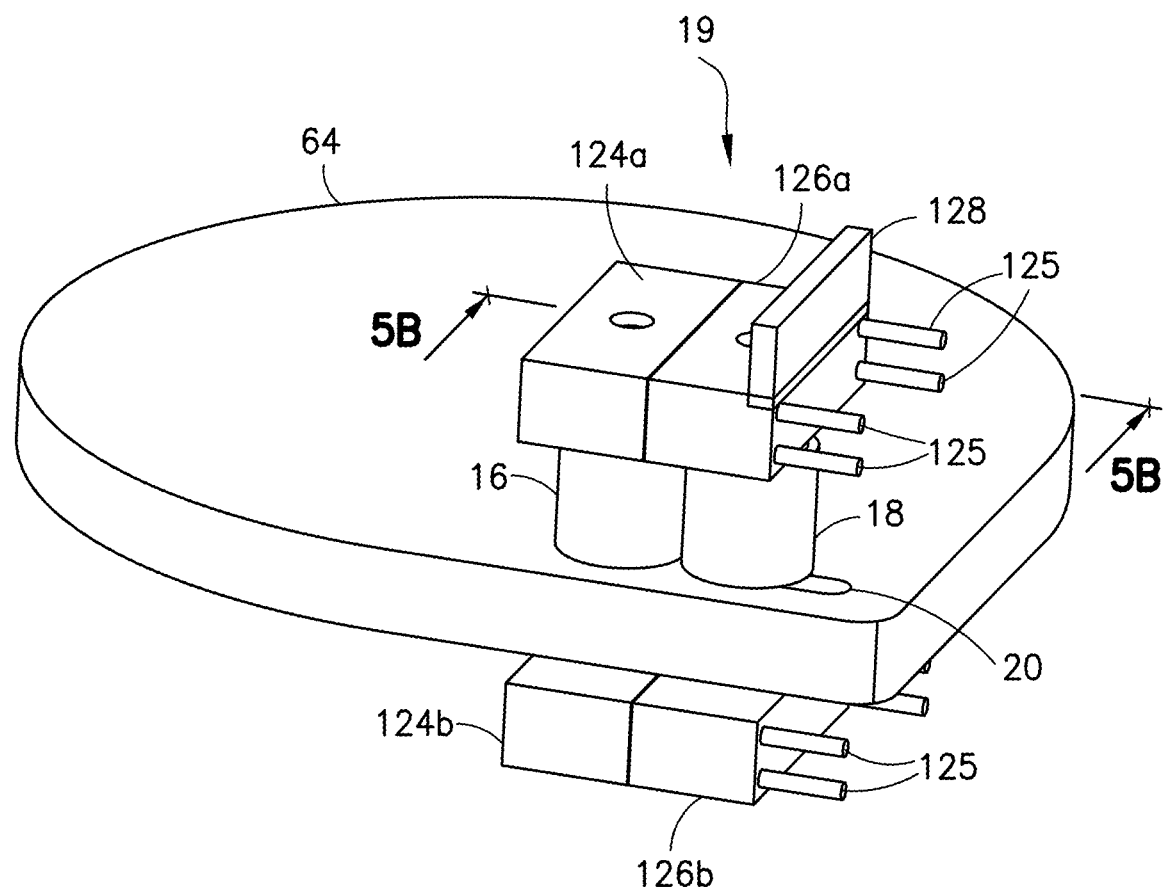
FIG. 5 is a diagram representing a view of a cable-feeding apparatus in accordance with one embodiment.
Figure 5A:
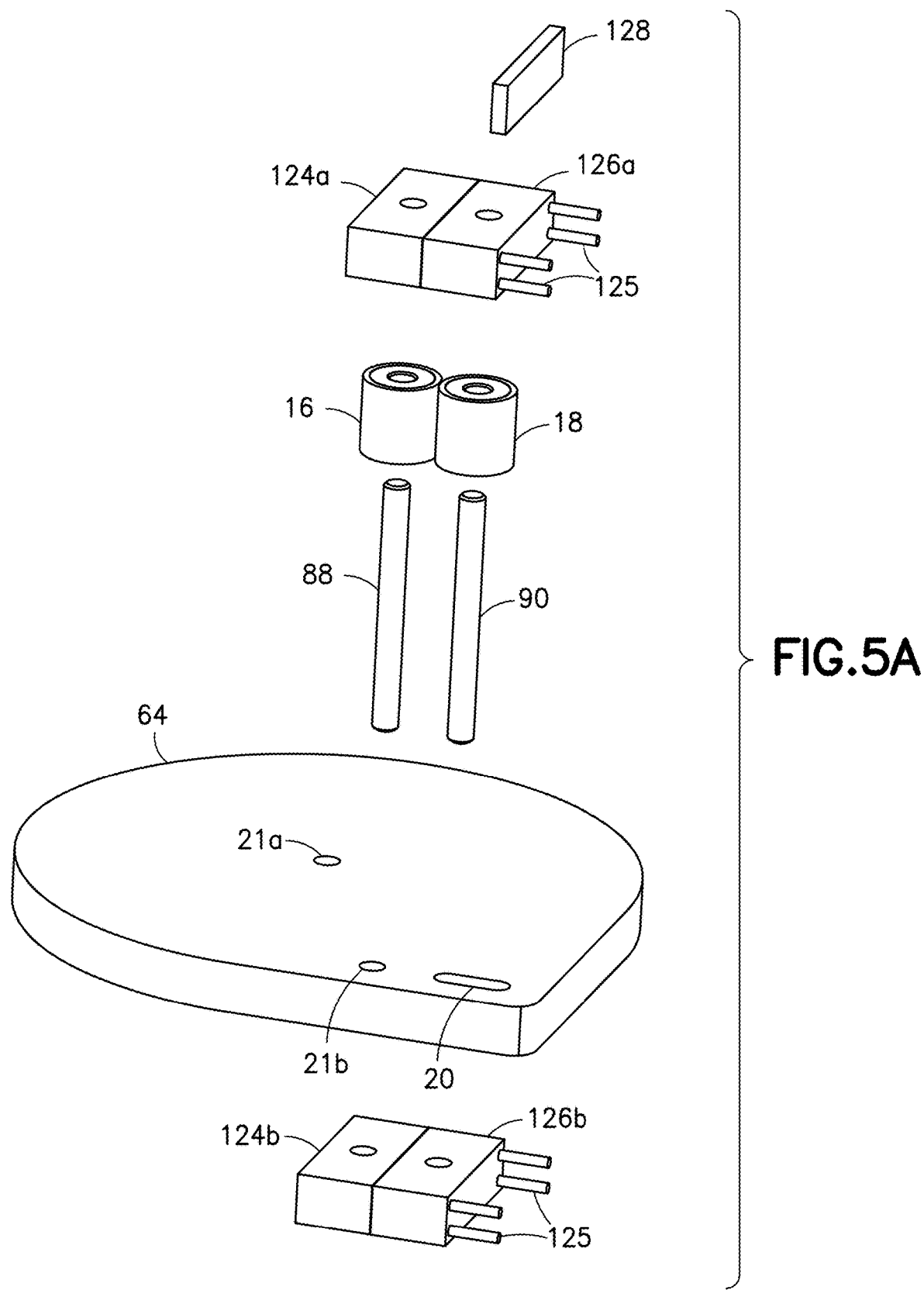
FIG. 5A is a diagram representing an exploded view of the components of the apparatus depicted in FIG. 5.
Figure 5B:
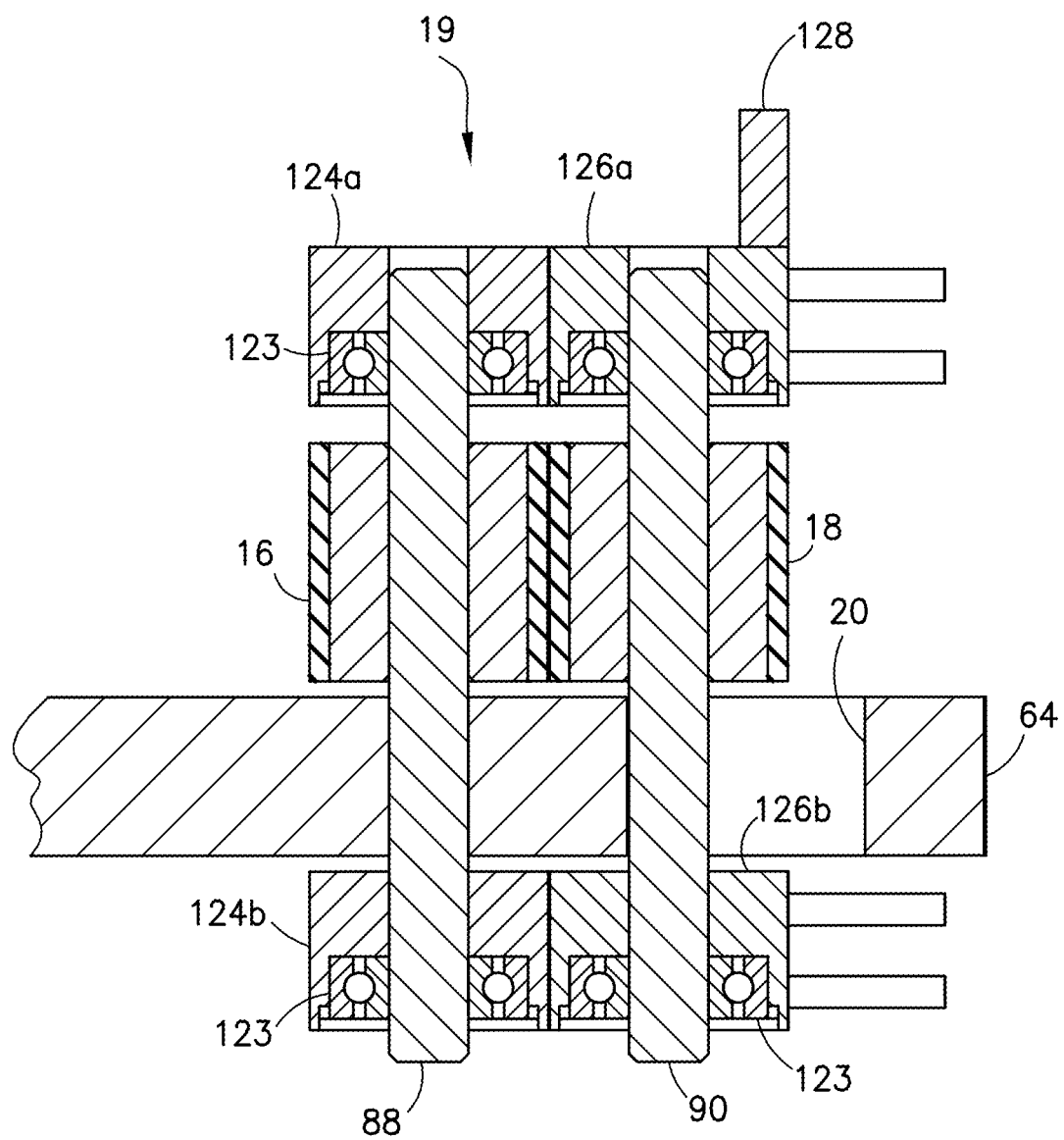
FIG. 5B is a diagram representing a sectional view of the apparatus depicted in FIG. 5, the location of the section line being indicated by line 5B-5B in FIG. 5.
Figure 5C:
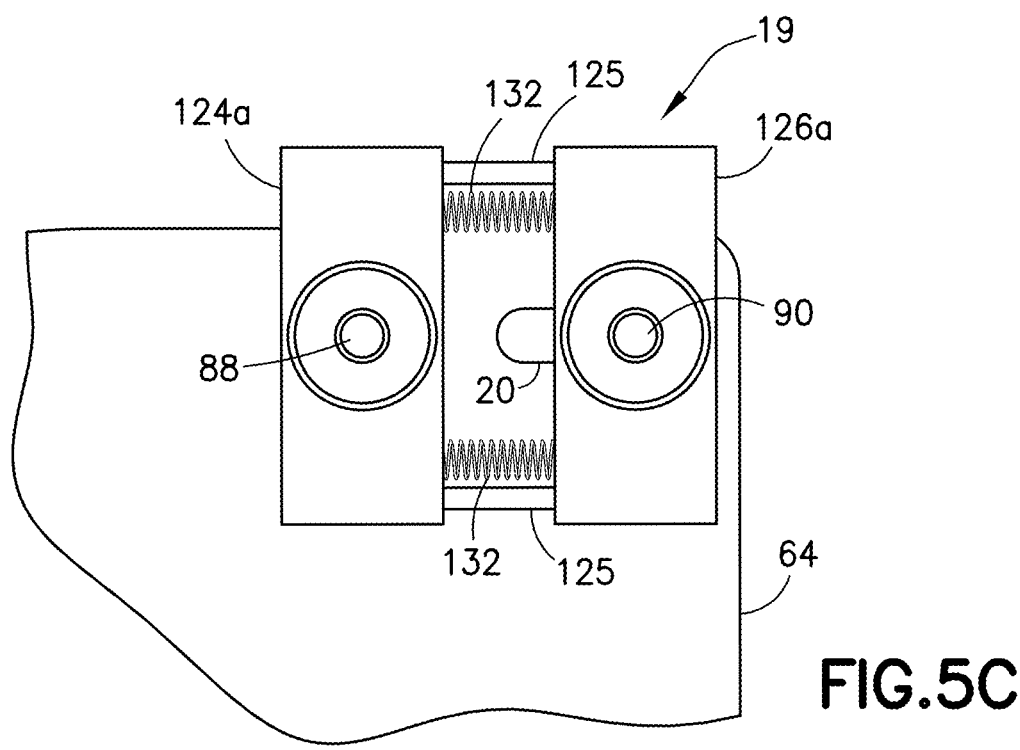
FIGS. 5C and 5D are diagrams respectively representing top and side views of the drive wheel subassembly depicted in FIG. 5.
Figure 5D:
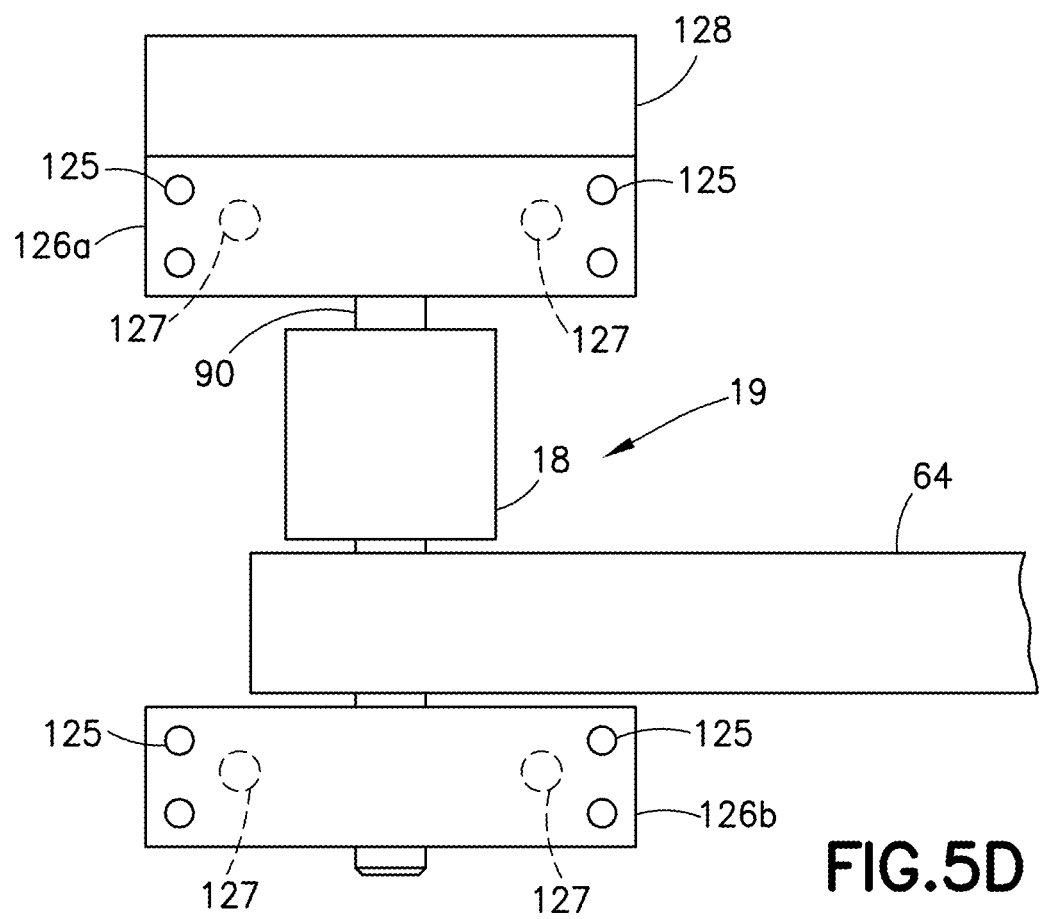
Figure 5E:
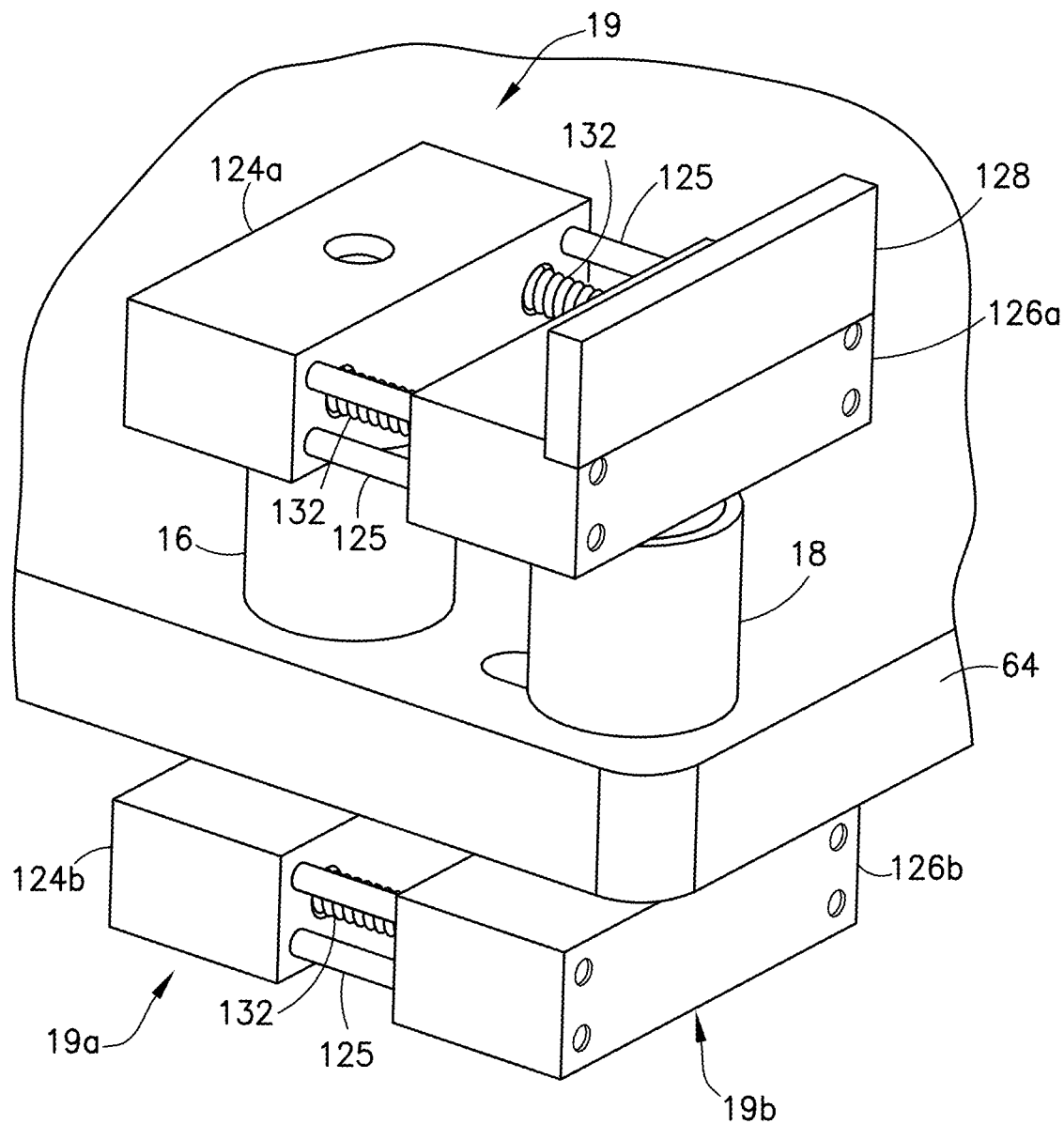
FIG. 5E is a diagram representing a three-dimensional view of the drive wheel subassembly mounted to a pallet 64 as depicted in FIG. 5.

FIG. 5 is a diagram representing a view of some components of a cable-feeding apparatus in accordance with one embodiment. The apparatus includes a pallet 64 equipped with a cable positioning mechanism 19. FIG. 5A is a diagram representing an exploded view of the components of the apparatus depicted in FIG. 5. FIG. 5B is a sectional view of the apparatus, the location of the section line being indicated by line 5B-5B in FIG. 5. FIGS. 5C and 5D show top and side views of the cable positioning mechanism 19. FIG. 5E is a diagram representing a three-dimensional view of the cable positioning mechanism 19.

As seen in FIG. 5A, the pallet 64 has an opening 21a through which a reelette shaft (not shown in FIG. 5A, but see reelette shaft 78 in FIG. 12C) is passed when the apparatus is assembled as depicted in FIG. 5. The pallet also has an opening 21b through which a drive wheel shaft 88 is passed and a slot 20 through which an idler wheel shaft 90 is passed when the apparatus is assembled. The drive wheel shaft 88 and idler wheel shaft 90 are components of the cable positioning mechanism 19. The cable positioning mechanism 19 includes a drive wheel subassembly 19a which is affixed to the pallet 64 and an idler wheel subassembly 19b which is translatable laterally. The drive wheel subassembly 19a includes drive wheel shaft 88 to which drive wheel 16 is affixed and drive wheel shaft upper and lower housings 124a and 124b. The upper and lower ends of the drive wheel shaft 88 are rotatably coupled to drive wheel shaft upper housing 124a and to drive wheel shaft lower housing 124b respectively by means of some bearings 123 (as shown in FIG. 5B). Similarly, the idler wheel subassembly 19b includes idler wheel shaft 90 to which idler wheel 18 is affixed and idler wheel shaft upper and lower housings 126a and 126b. The upper and lower ends of the idler wheel shaft 90 are rotatably coupled to idler wheel shaft upper housing 126a and to idler wheel shaft lower housing 126b respectively by means of other bearings 123.

The idler wheel shaft upper and lower housings 126a and 126b are slidably mounted on respective sets of four mutually parallel alignment dowels 125 which extend in cantilever beam fashion from the drive wheel shaft upper and lower housings 124a and 124b respectively. This arrangement enables the idler wheel subassembly 19b to slide on the alignment dowels 125 toward or away from the drive wheel subassembly 19a. During translation of the idler wheel subassembly 19b in one direction, the idler wheel shaft 90 translates inside the slot 20 in the same direction. Suitable means (not shown in the drawings) may be provided on the alignment dowels 125 to stop the idler wheel subassembly 19b from falling off of the alignment dowels. Alternatively, one end of the slot 20 may be positioned to stop further movement of the idler wheel shaft 90.

As best seen in FIG. 5, a handle 128 is affixed to the idler wheel shaft upper housing 126a to enable a human operator to manually move the idler wheel 18 out of the way (away from the drive wheel 16). The cable 10 may then be placed in the gap between the separated drive wheel 16 and idler wheel 18, following which the idler wheel 18 is released and urged toward the drive wheel 16 by a set of springs 132. As seen in FIGS. 5C and 5E, the idler wheel shaft upper housing 126a is urged toward the drive wheel shaft upper housing 124a by a first pair of springs 132. At the same time the idler wheel shaft lower housing 126b is urged toward the drive wheel shaft lower housing 124b by a second pair of springs 125 (only one of the second pair of springs is visible in FIG. 5E). In accordance with one embodiment, the idler wheel subassembly 19b may be moved toward the drive wheel subassembly 19a until the idler wheel 18 contacts the drive wheel 16. In this state of contact, the drive wheel may be operated in the manner previously described with reference to FIGS. 2A and 2B.

As seen in FIG. 5D, each of the idler wheel shaft upper and lower housings 126a and 126b has a respective pair of bores 127. Each bore is configured to receive one end of a respective spring 132. In addition, the drive wheel shaft upper and lower housings 124a and 124b has a respective pair of bores (not visible in FIG. 5D) which are configured to receive the other end of a respective spring 132.

In accordance with some embodiments, a respective motor 72 is installed at each workstation. Upon the arrival of a pallet 64 carrying a coil of cable 10 at the workstation, the stationary motor 72 is operatively coupled to the drive wheel 16 on the pallet 64. This coupling may be achieved in any one of a variety of ways.

In accordance with one exemplary embodiment, the motor 72 is raised from a position where the motor 72 is not operatively coupled to the drive wheel 16 to a position where the motor 72 is operatively coupled to the drive wheel 16. The motor 72 may be moved in this manner by means of a linear actuator, such as a pneumatic actuator or an electric actuator (e.g., including a servomotor and a lead screw), or some other method to perform the lift motion. In the following discussion, whenever a linear actuator is used to produce translational movement of a component, it should be appreciated that either a pneumatic actuator or an electric actuator may be used.

Figure 6:
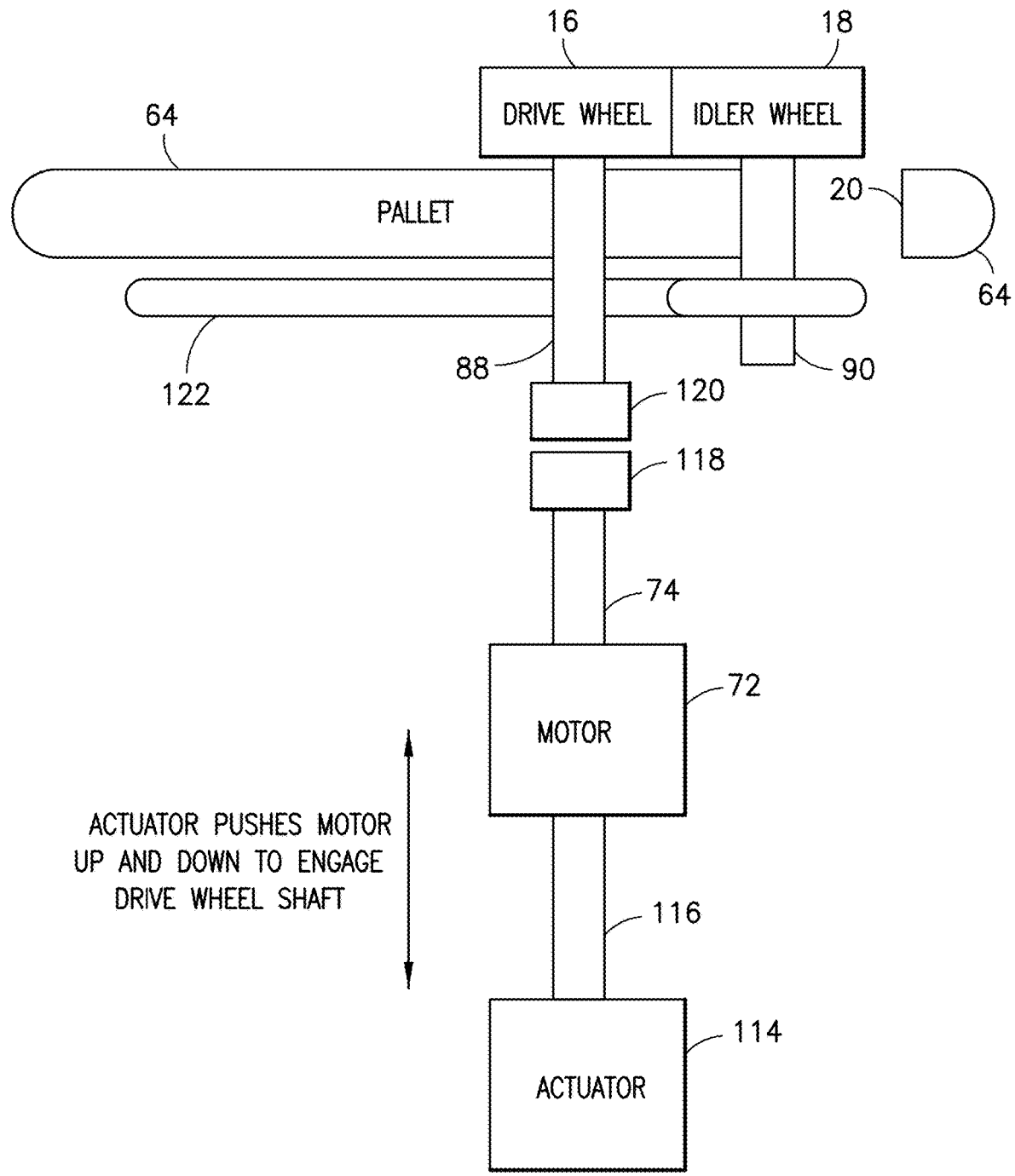
FIG. 6 is a diagram representing a side view of apparatus including a motor that may be operatively coupled to a drive wheel shaft in accordance with one embodiment.

FIG. 6 is a diagram representing a side view of apparatus including a motor 72 that may be operatively coupled to a drive wheel shaft 88 in accordance with one embodiment. The motor 72 has an output shaft 74 with an interlock mechanism 118 affixed to the distal end of the output shaft 118. Similarly, an interlock mechanism 120 is affixed to the lower end of the drive wheel shaft 88. The motor 72 is mounted to the end of a piston rod 116 of a linear actuator 114. When the linear actuator 114 is activated, the piston rod 116 extends. Extension of the piston rod 116 moves the motor 72 from a position where the interlock mechanism 118 is not interlocked with the interlock mechanism 120 (depicted in FIG. 6) and a position where the interlock mechanism 118 is interlocked with the interlock mechanism 120 (not depicted in FIG. 6). The interlock mechanisms 118 and 120 may be respective ring gears configured with teeth that mesh when the piston rod 116 is fully extended. When the interlock mechanisms 118 and 120 are interlocked, the motor 72 may be activated to drive rotation of the drive wheel 16 in either a cable pushing or cable pulling direction.

The embodiment depicted in FIG. 6 further includes an idler wheel displacement lever 122 that is rotatably coupled to the pallet 64 by a pivot pin (not shown in FIG. 6, but see pivot pin 130 shown in FIGS. 11A and 11B). The idler wheel displacement lever 122 may be manually rotated about the pivot pin 130 to separate the idler wheel 18 from the drive wheel 16 so that a cable 10 may be placed therebetween. Such separation has been previously described and is seen in FIGS. 2A and 5E. The operation of the idler wheel displacement lever 122 will be described in more detail later with reference to FIGS. 11A and 11B.

Figure 7:
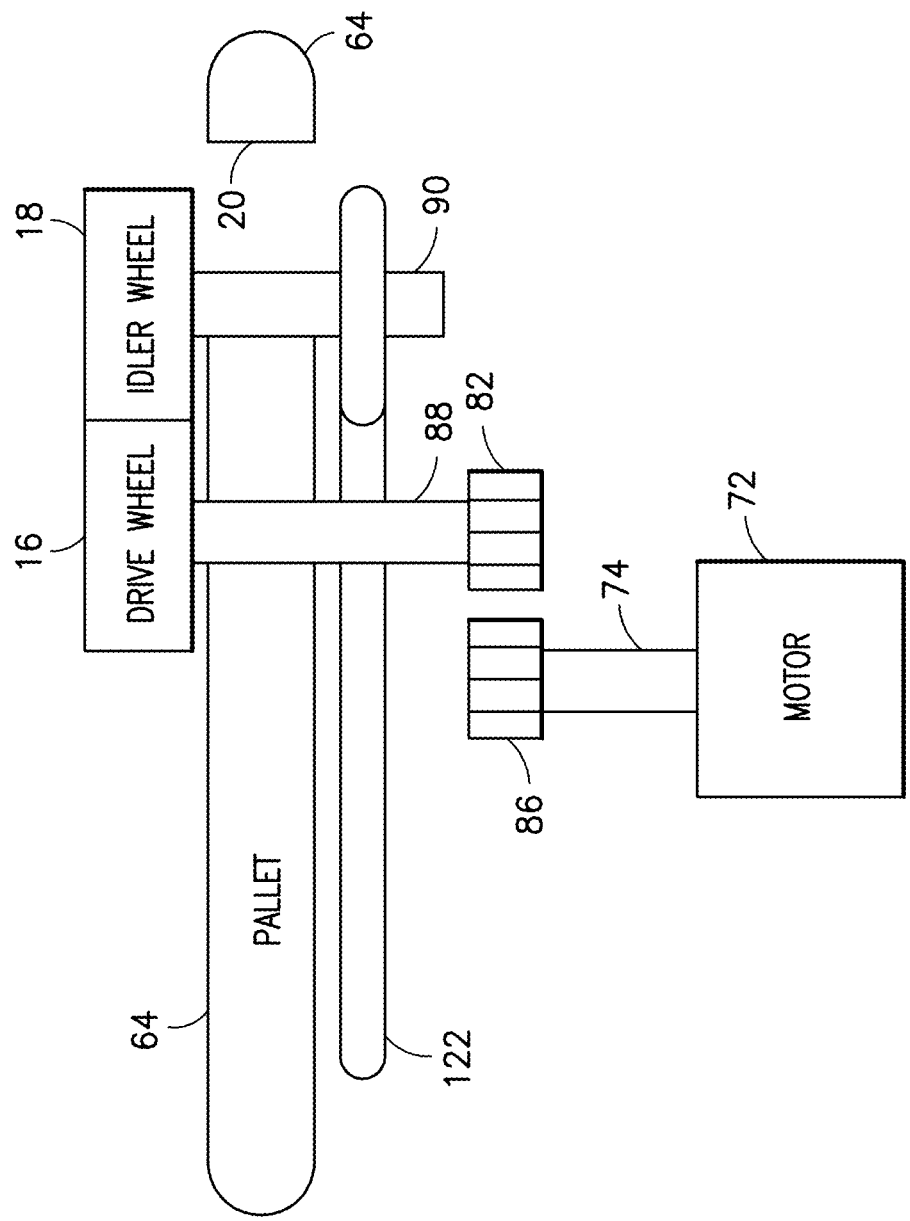
FIG. 7 is a diagram representing a side view of apparatus including a stationary motor that may be operatively coupled to a drive wheel shaft in accordance with another embodiment.

In accordance with alternative embodiments, the motor 72 installed at the workstation is stationary and becomes operatively coupled to the drive wheel 16 as the pallet 64 moves into position in front of the cable processing module. FIG. 7 is a diagram representing a side view of apparatus including a stationary motor 72 that may be operatively coupled to a drive wheel shaft 88. In this case, a motor shaft gear 86 is affixed to a distal end of the output shaft 74 of the motor 72. Similarly, a drive wheel shaft gear 82 is affixed to the lower end of the drive wheel shaft 88. The motor shaft gear 86 and of the drive wheel shaft gear 82 are at the same elevation. As the pallet 64 arrives at the target position in front of the workstation, the drive wheel shaft gear 82 moves from a position not in engagement with the motor wheel 86 (as shown in FIG. 7) to a position where the drive wheel shaft gear 82 is fully engaged with the motor wheel 86 (not shown in FIG. 7). When the teeth of the motor shaft gear 86 and of the drive wheel shaft gear 82 are meshed, the motor 72 may be activated to drive rotation of the drive wheel 16 in either a cable pushing or cable pulling direction. Once the pallet 64 is ready to continue down the conveyor track 62, the motor output shaft 74 ceases rotation, following which the pallet 64 begins to moves. As the pallet 64 begins moving toward the next workstation, the drive wheel shaft gear 82 is able to roll over the motor shaft gear 86 and becomes disengaged.

FIG. 7A is a diagram representing respective positions of the drive wheel shaft gear 82 relative to the stationary motor shaft gear 86 before, during and after meshing. In FIG. 7A, the drive wheel shaft gear 82 is shown in three different positions. Movement of the drive wheel shaft gear 82 from the leftmost position in FIG. 7A (not in engagement with the motor shaft gear 86) to the middle position (in engagement with the motor shaft gear 86), as the cable delivery system 60 is pulsed, is indicated by the leftmost arrow. Movement of the drive wheel shaft gear 82 from the middle position in FIG. 7A (in engagement with the motor shaft gear 86) to the rightmost position (not in engagement with the motor shaft gear 86), as the cable delivery system 60 is pulsed again, is indicated by the rightmost arrow. As the pallet 64 moves toward the next workstation, the translating drive wheel shaft gear 82 rolls over the motor shaft gear 86. The friction between the drive wheel 16, the idler wheel 18 and the portion of the cable 10 in the nip between the drive wheel 16 and idler wheel 18 should be sufficient to prevent the drive wheel shaft gear 82 from rotating freely following disengagement from the motor shaft gear 86.

Alternatively, rather than having stationary motors, the motors 72 could be mounted to the pallets 64. Since the motors 72 are electric, this requires the presence of a power supply for the motor 72 at each workstation, as well as a method of electrically coupling the power supply with the electric motor. FIG. 8 is a diagram representing a side view of an apparatus including a motor 72 operatively coupled to a drive wheel 16, both of the motor 72 and drive wheel 16 being coupled to a pallet 64. FIG. 8 shows the pallet positioned in front of a workstation that includes a cable processing module 30 and a power supply 100. The work station further includes a linear actuator 98 and an electrical receptacle 96 which is mounted on the distal end of a piston rod 99 of the linear actuator 98. Although the electrical receptacle 96 is electrically connected to the leads of the power supply 100 by an electrical cable 102, the electrical receptacle 96 is translatable back and forth in the directions indicated by the double-headed arrow in FIG. 8.

The apparatus depicted in FIG. 8 further includes an electrical plug 94 which is electrically connected to the motor's electrical leads by an electrical cable 92. The means for structurally supporting the electrical plug 94 at a fixed location relative to the motor 72 are not shown in FIG. 8. For example, the electrical plug 94 may be seated on a rigid plate that is affixed to the housing of the motor 72. The electrical plug 94 and the electrical receptacle 96 are configured to mate with each other.

Upon arrival of the pallet 64 at the target position in front of the cable processing module 30, the linear actuator 98 may be activated by the computer 162 (see FIG. 14B) of the cable processing module 30 to cause the piston rod 99 to extend, thereby moving the electrical receptacle 96 into engagement with the electrical plug and making an electrical connection for supplying electric power to the motor 72. In an alternative embodiment, the electrical plug 94 may be affixed to the piston rod 99, while the electrical receptacle 96 is fixedly coupled to the motor 72.

In accordance with the above-described embodiments, the drive wheel 16 is driven to rotate by the motor 72, while the idler wheel 18 is unpowered. The drive wheel 16 and idler wheel 18 are preferably designed to provide enough friction to push a cable 10 in the nip therebetween without excessive slipping. Wheels may be configured/designed as shown in FIG. 9.

Figure 9:
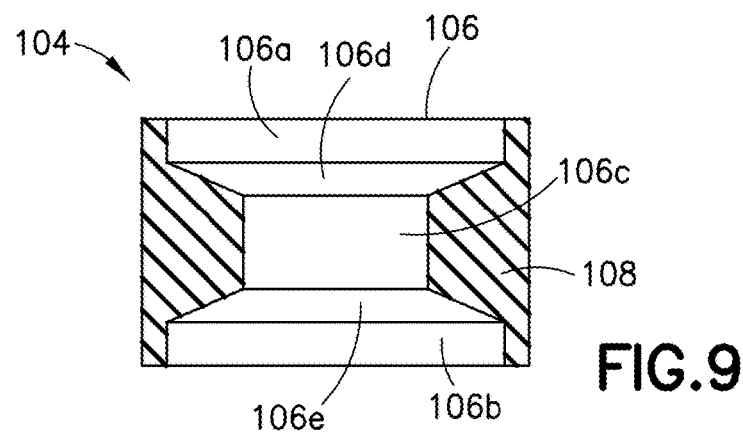
FIG. 9 is a diagram representing a partially sectional view of a wheel in accordance with one embodiment. (Each of the pallet-mounted drive and idler wheels depicted in FIGS. 4-8 may consist of a wheel of the type depicted in FIG. 9.)

FIG. 9 is a diagram representing a partially sectional view of a wheel 104 in accordance with one embodiment. (Each of the pallet-mounted drive wheel 16 and idler wheel 18 may consist of a wheel 104 of the type depicted in FIG. 9.) The wheel 104 includes a wheel hub 106 made of metal and having a "groove" cross-sectional profile formed by circular cylindrical and circular conical surfaces. More specifically, the outer periphery of the wheel hub 106 is formed by two circular cylindrical surfaces 106a and 106b respectively connected to a central circular cylindrical surface 106c by respective truncated circular conical surfaces 106d and 106e. The wheel 104 further includes a compliant rim 108 made of a compliant material such as rubber tire. The compliant rim 108 surrounds and covers the outer periphery of the wheel base 106, including filling the groove formed by the central circular cylindrical surface 106c and the truncated circular conical surfaces 106d and 106e. The material of the compliant rim 108 is sufficiently compliant that cables of different diameters are able to pass between the drive wheel 16 and idler wheel 18. The underlying groove helps to keep the cable 10 (not shown in FIG. 9) centered within the height of the drive wheel 16 and idler wheel 18.

As previously disclosed with reference to FIGS. 5A-5E, if the drive wheel 16 and idler wheel 18 are spring-loaded together, the idler wheel 18 will rotate as the drive wheel 16 rotates. Instead of using tension springs to urge the idler wheel 18 into contact with the drive wheel 16 (as shown in FIGS. 5A-5E), compression springs may be used to push the idler wheel 18 into contact with the drive wheel 16. For example, a spring could be placed between the idler wheel subassembly and a surface on the underside of the pallet 64. On the top side of the pallet 64, a small nub/handle would be present on the idler wheel subassembly. This handle could be used by the operator to push the idler wheel 18 apart from the drive wheel 16 in order to place a cable 10 between the two wheels.

In accordance with an alternative embodiment that employs one or more springs, the idler wheel 18 may be separated from the drive wheel 16 pushing on one end of the idler wheel displacement lever 122 depicted in FIGS. 6 and 7. A bottom view of a spring-loaded idler wheel displacement lever 122 is presented in FIGS. 11A and 11B. In accordance with one proposed implementation, the idler wheel displacement lever 122 includes a long arm 122a and a short arm 122b which forms a right angle with the long arm 122a. (A right angle is not critical to the functionality of the idler wheel displacement lever 122.) A compression spring 132 has one end affixed to a spring support 134 and the other end affixed to an end portion of the long arm 122a. The spring support may be integrally formed with or attached to the pallet 64.

FIG. 11A shows a first angular position of the idler wheel displacement lever 122 that corresponds to a first state wherein the idler wheel 18 is in contact with the drive wheel 16. The compression spring 132 urges the idler wheel displacement lever 122 to the first angular position seen. As seen in FIGS. 11A and 11B, the idler wheel displacement lever 122 is rotatably coupled to the pallet 64 by means of a pivot pin 130 disposed near the right-angled corner of the idler wheel displacement lever 122. The idler wheel shaft 90, which is affixed near the end of the short arm 122b, is translatable in the slot 20 as previously described. Because the idler wheel shaft 90 is affixed to the idler wheel displacement lever 122, in this embodiment the idler wheel 18 is rotatably coupled to the idler wheel shaft by means of bearings.

FIG. 11B shows a second angular position of the idler wheel displacement lever 122 that corresponds to a state wherein the idler wheel 18 is separated from the drive wheel 16 by a gap in which a cable 10 may be placed. The idler wheel displacement lever 122 rotates from the angular position seen in FIG. 11A to the angular position seen in FIG. 11B in response to application of a force (represented by arrow A in FIG. 11B) that compresses the compression spring 132. This rotation by the idler wheel displacement lever 122 causes the idler wheel 18 to slide in the slot 20 in a direction indicated by arrow B in FIG. 11B), which movement separates the idler wheel 18 from the drive wheel 16.

In accordance with one embodiment, the cable tip positioning module 38 is provided with a linear actuator of one of the types previously described herein. As previously noted, the cable tip positioning module 38 incorporates a computer that controls operation of the motor 72 during cable tip positioning. Upon detection of the arrival of a pallet 64, the computer receives a pallet present signal from the pallet detector 160 and responds by activating a linear actuator (not shown in FIGS. 11A and 11B) to push against the end of the long arm 122a of the idler wheel displacement lever 122. The resulting force (represented by arrow A in FIG. 11B) compresses the compression spring 132, causing to separate the idler wheel 18 from the drive wheel 16. A human operator then places a cable 10 in the gap between the two wheels. The cable end 10a should be dropped such that it triggers the photoelectric sensor 28 schematically depicted in FIG. 3B, which would then send a cable present signal to the computer incorporated in the cable processing module 30. The computer is further configured to retract the linear, allowing the idler wheel 18 to be urged toward the drive wheel 18 by the compression spring. The cable 10 is thus squeezed between the drive wheel 16 and idler wheel 18 with sufficient frictional forces that rotation of the wheels moves the cable 10 through the nip.

In the above-described scenario, a second photoelectric sensor (situated under the pallet 64) may be employed to detect when the idler wheel displacement lever 122 has returned to the angular position depicted in FIG. 11A. Once the second photoelectric sensor detects that the idler wheel 18 is in contact with the drive wheel 16, the computer of the cable tip positioning module 38 is configured to activate the motor 72 to drive rotation of the drive wheel 16 in the cable pulling direction. As previously described, the passage of cable tip 10b through the scanning plane 11 (see FIG. 3B) is then detected by the photoelectric sensor 28, which triggers the computer to de-activate the motor 72 when the cable tip 10b has arrived at the preset cable tip position.

In accordance with an alternative embodiment, the idler wheel 18 is not laterally translatable relative to the drive wheel 16. Instead both the drive wheel 16 and idler wheel 18 are rotatably coupled to the pallet 64 at respective fixed positions such that the drive wheel 16 and idler wheel 18 are always in contact with each other. In this case, the idler wheel 18 need not be spring-loaded.

Figure 10:
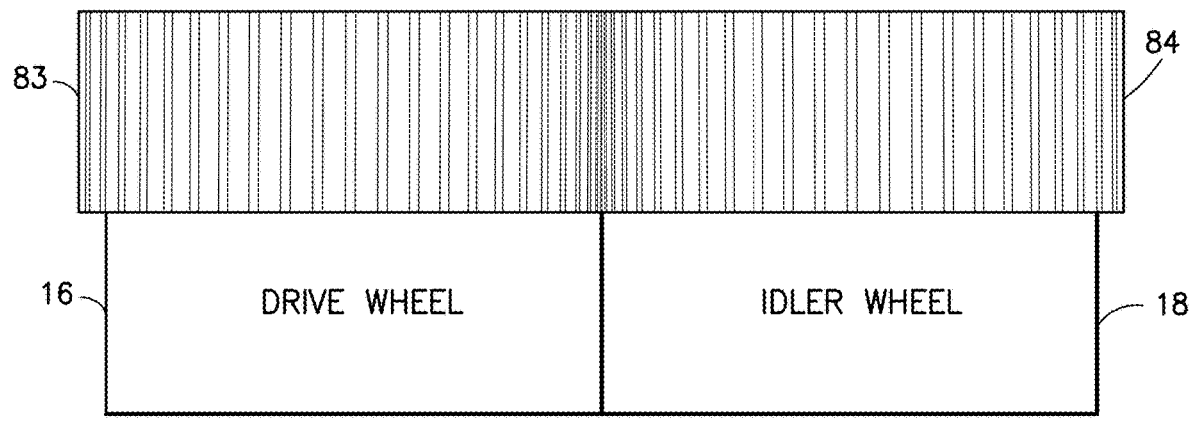
FIG. 10 is a diagram representing a side view of a nip formed by drive and idler wheels having meshed gears in accordance with an alternative embodiment.

FIG. 10 is a diagram representing a side view of a nip formed by drive wheel 16 and idler wheel 18 having meshed gears in accordance with an alternative embodiment. As depicted in FIG. 10, the drive wheel 16 is rigidly connected to a drive wheel gear 83, while the idler wheel 18 is rigidly connected to an idler wheel gear 84. The teeth of drive wheel gear 83 mesh with the teeth of idler wheel gear 84. The drive wheel 16 is in contact with the idler wheel 18. The interlocking gears ensure that the idler wheel 18 always rotates when the drive wheel 16 rotates.

For embodiments in which the drive wheel 16 and idler wheel 18 cannot be separated for placing a cable therebetween, various solutions would enable insertion of the cable end 10a into the nip between the drive wheel 16 and idler wheel 18. For example, if the motor 72 were constantly rotating the drive wheel 16 in the cable pushing direction, a human operator would be able to push the cable tip 10b into the nip between the rotating wheels.

In accordance with one embodiment, an overhead camera with a vision system detects the presence of the cable 10 on the pallet 64, with the cable tip 10b between the drive wheel 16 and idler wheel 18. The motor 72 is then turned on and the cable end 10a is pushed forward until the cable tip 10b interrupts the scanning light produced by the photoelectric sensor 28 (see FIG. 3B).

In accordance with another embodiment, a microswitch/sensor detects motion of the drive wheel 16 or idler wheel 18 as the cable end 10a is pushed through the nip. A cable present signal output by the microswitch/sensor triggers the motor 72 to begin rotating the drive wheel 16.

In accordance with a further embodiment, a proximity sensor is used to detect the presence of the cable conductors 6 and 8 in proximity to the drive wheel 16 and then trigger the motor 72 to begin rotating the drive wheel 16. The proximity sensor could be mounted to the pallet 64, which requires power at each workstation (similar to if the motor 72 were mounted to the pallet 64). Alternatively, the proximity sensor could be part of the cable tip positioning module 38.

A proximity sensor can detect metal targets approaching the sensor, without physical contact with the target. Proximity sensors are roughly classified into the following three types according to the operating principle: the high-frequency oscillation type using electromagnetic induction, the magnetic type using a magnet, and the capacitance type using the change in capacitance.

Figure 12:
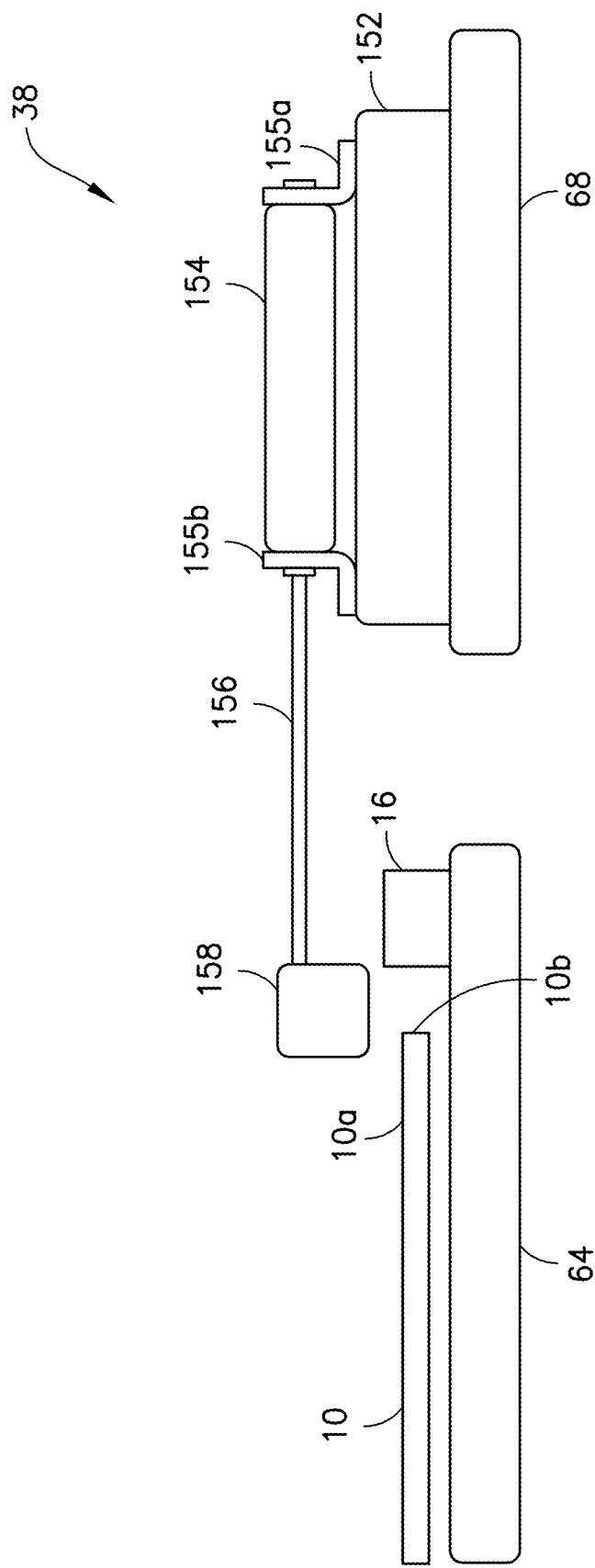
FIG. 12 is a diagram representing a side view of an apparatus including a proximity sensor for detecting the presence of a cable in proximity to a drive wheel.

FIG. 12 is a diagram representing a side view of an apparatus including a proximity sensor 158 for detecting the presence of a cable 10 in proximity to the drive wheel 16. In accordance with one proposed implementation, the proximity sensor 158 is a capacitive sensor configured to detect the proximity of an electrical conductor. The cable tip positioning module 38 includes a stationary plate 68, an actuator mounting plate 152 affixed to the stationary plate 68, and a linear actuator 154 affixed to actuator mounting plate 152 by means of mounting brackets 155a and 155b. The proximity sensor is mounted on the distal end of the piston rod 156 of the linear actuator 154. In response to the detection of the presence of a pallet 64 in front of the cable tip positioning module 38, the computer of the cable tip positioning module 38 is configured to actuate the linear actuator 154, causing the piston rod 156 to extend and move the proximity sensor 154 to a position overlying the entrance to the nip between the drive wheel 16 and idler wheel 18.

In response to receipt of a cable present signal from the proximity sensor 158, the computer of the cable tip positioning module 38 is configured to actuate a motor to cause the reelette 26 (see FIG. 3B) to rotate in a direction that advances the cable tip 10b toward the nip formed by the drive wheel 16 and idler wheel 18. In accordance with the embodiment depicted in FIGS. 13A-13C, the motor 72 which drives rotation of the drive wheel 16 also drives rotation of the reelette 26. Once the motor 72 is on, the cable tip 10b will be advanced into the nip and gripped by the rotating drive wheel 16 and idler wheel 18. The cable end 10a is then pushed forward until the cable tip 10b triggers the photoelectric sensor 28 (not shown in FIG. 12, but see FIG. 3B). In response to a cable tip present signal output by the photoelectric sensor 28, the computer of the cable tip positioning module 38 is configured to cause the motor 72 to cease rotating the wheels in the cable pushing direction and then rotate the wheels in the cable pulling direction, retracting the cable tip 10b to the preset cable tip position as previously described.

Figure 13A:
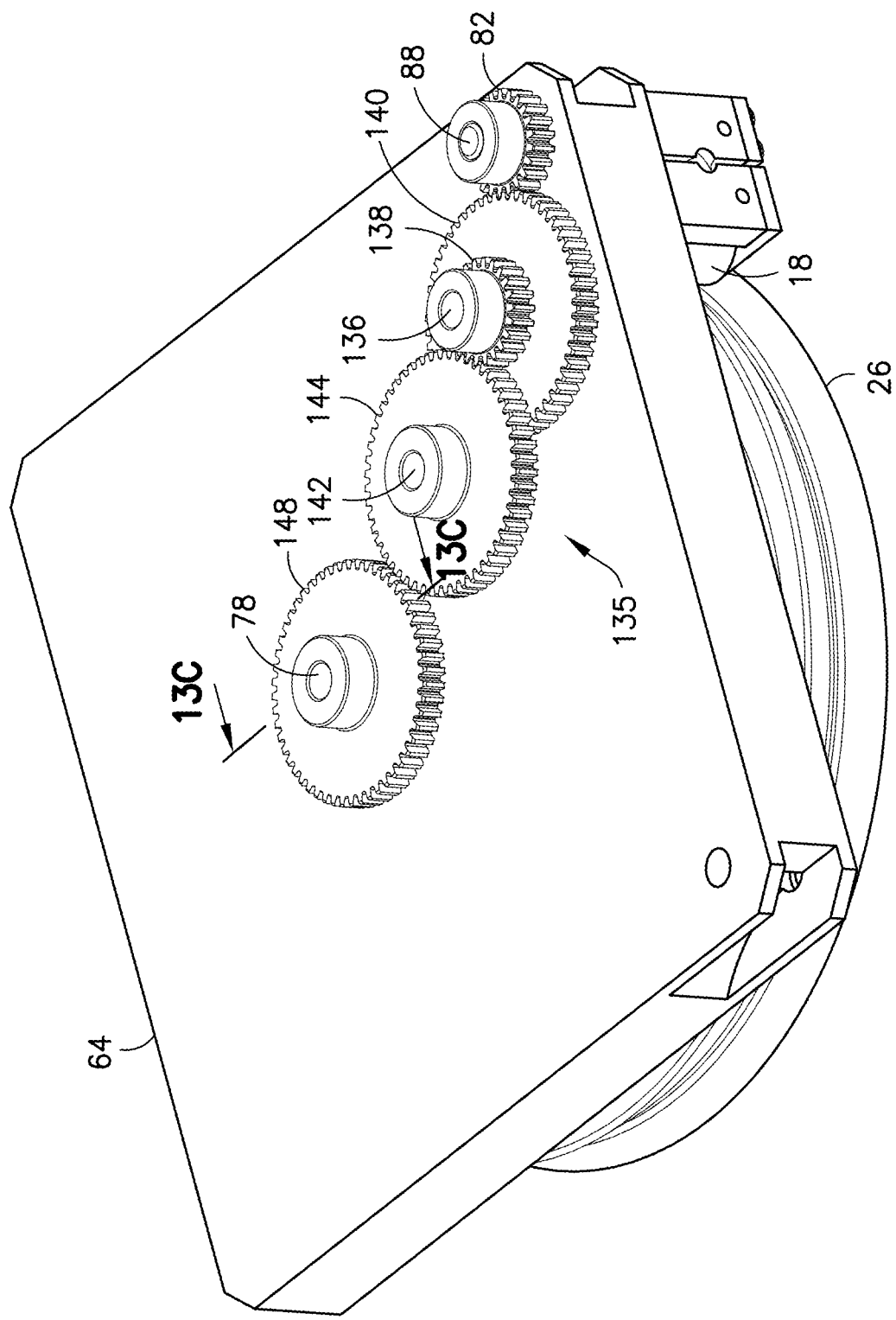
FIG. 13A is a diagram representing a view of the underside of an apparatus that includes a pallet equipped with a drivetrain for coupling the rotations of a cable-unwinding reelette and a cable-displacing drive wheel.
Figure 13B:
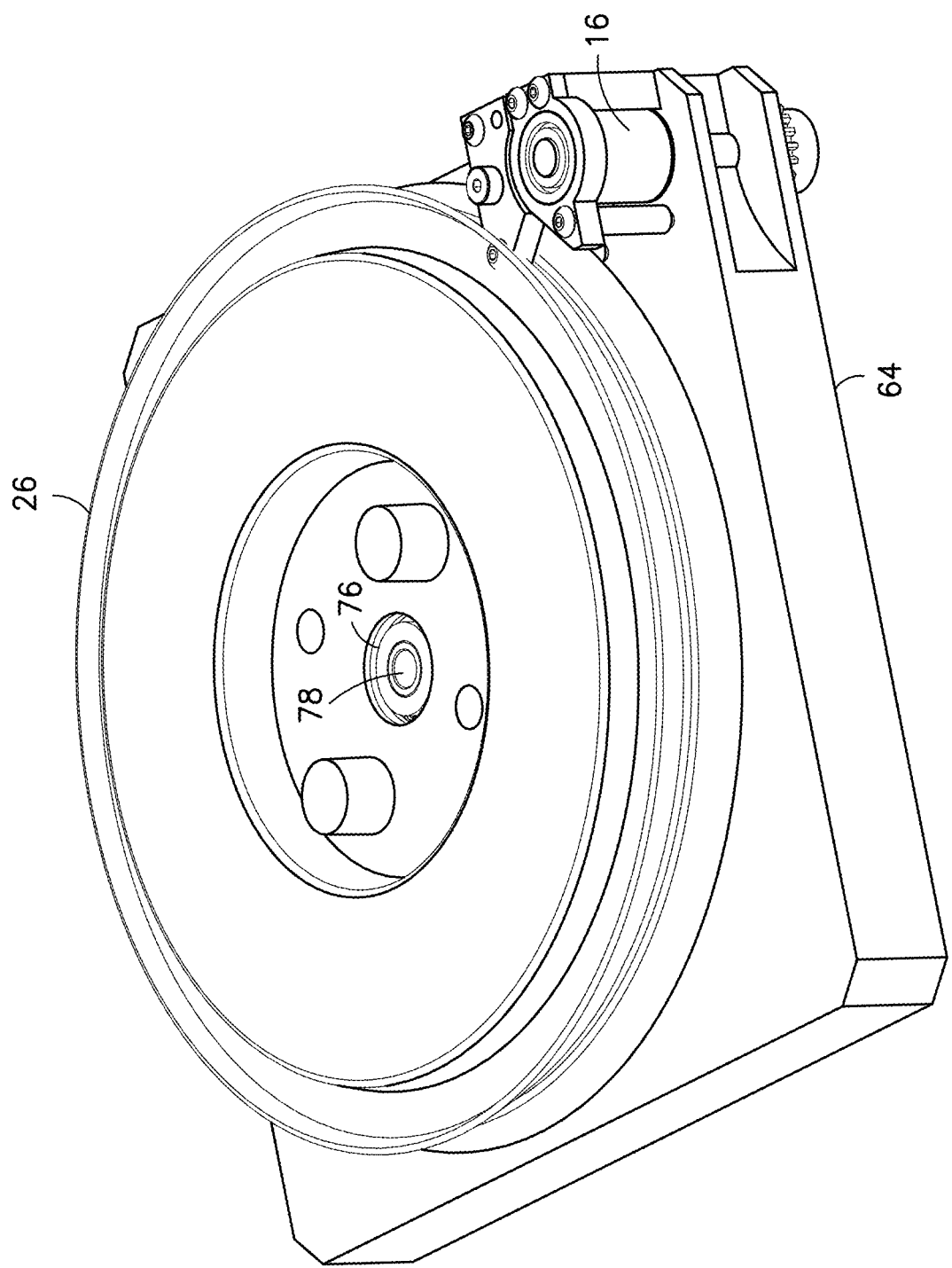
FIG. 13B is a diagram representing a view of the topside of the apparatus depicted in FIG. 13A.

FIGS. 13A and 13B are diagrams representing bottom side and topside views respectively of an apparatus that includes a pallet 64 equipped with a drivetrain 135 for causing the reelette 26 and drive wheel 16 to rotate synchronously. As seen in FIG. 13B, the reelette 26 has a center hub 76 which is rotatable when coupled to a reelette shaft 78. As seen in FIG. 13A, the reelette shaft 78 is effectively coupled to the drive wheel shaft 88 by the drive train 135.

In accordance with the proposed implementation depicted in FIG. 13A, the drive train 135 includes the following components: a drive wheel shaft gear 82 affixed to the drive wheel shaft 88; a gear 140 affixed to a shaft 136 and having teeth meshed with the teeth of the drive wheel shaft gear 82; a gear 138 affixed to the shaft 136; a gear 144 affixed to a shaft 142 and having teeth meshed with the teeth of the gear 138; and a reelette shaft gear 148 affixed to the reelette shaft 78 and having teeth meshed with the teeth of the gear 144. As previously disclosed, a motor 72 may be directly operatively coupled to the drive wheel shaft 88. In response to activation of motor 72, the drive wheel 16 and reelette 26 rotate synchronously. In accordance with an alternative embodiment, the motor could be directly operatively coupled to the reelette shaft 78, thereby indirectly coupling the motor to the drive wheel shaft 88 via the gear train 135.

Figure 13C:
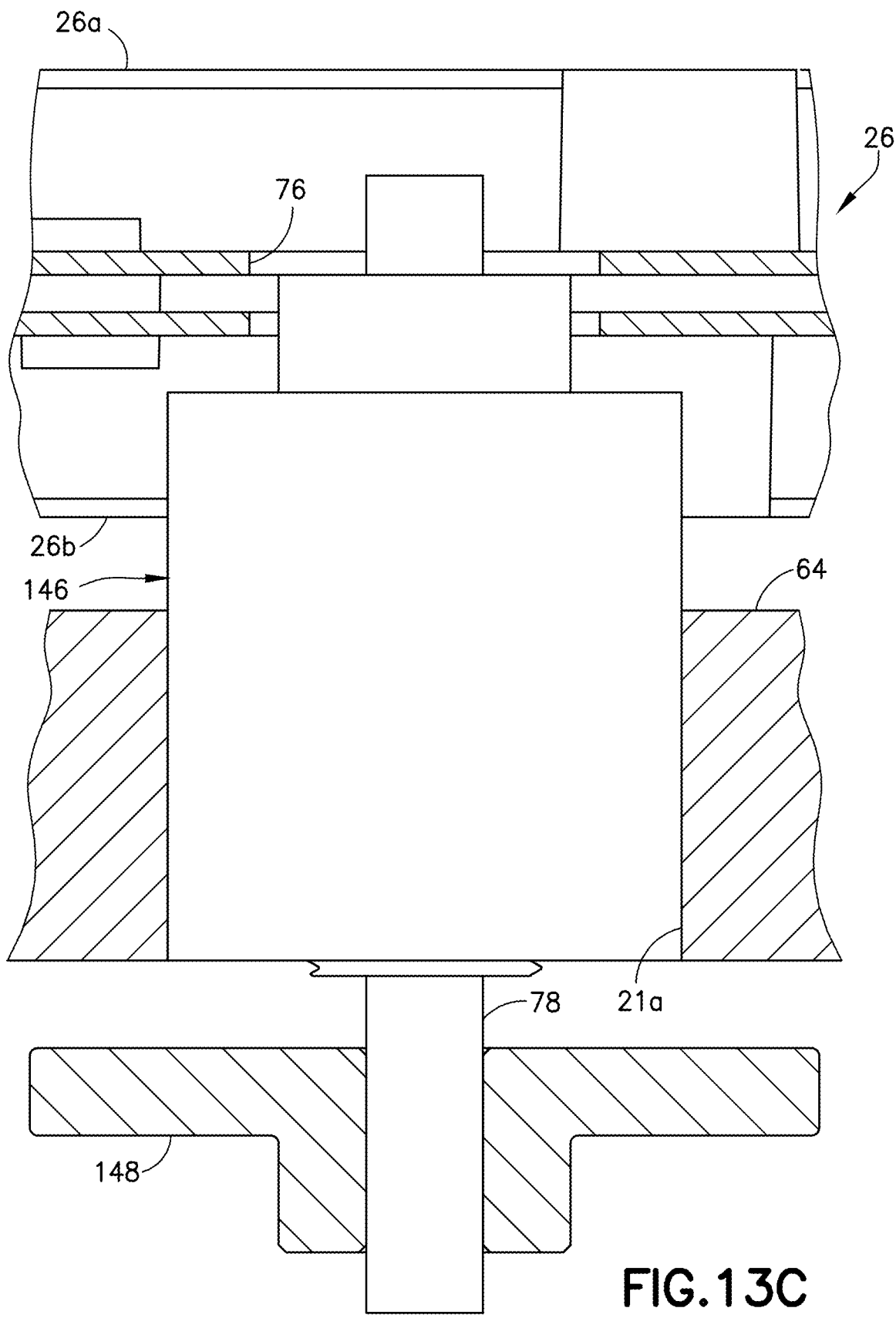
FIG. 13C is a diagram representing a sectional view of a portion of the apparatus depicted in FIGS. 13A and 13B, the location of the section plane being indicated by line 13C-13C in FIG. 13A.

FIG. 13C is a diagram representing a sectional view of a portion of the apparatus depicted in FIGS. 13A and 13B, the location of the section plane being indicated by line 13C-

13C in FIG. 13A. In this example construction, the reelette 26 includes a reelette upper side 26a and a reelette lower side 26b, which are permanently attached to each other. The cable 10 (not shown in FIG. 13C) must be wound within/on the reelette (similar to winding a cable on a spool). The reelette lower side 26b is affixed to an upper end of the reelette shaft 78; the reelette shaft gear 148 is affixed to a lower end of the reelette shaft 78. The reelette shaft 78 is rotatably coupled to the pallet 64 by means of a torque-limiting shaft coupling 146, which is installed in opening 21a in the pallet 64. In the event of excess torque, the torque-limiting shaft coupling 146 slips to protect the motor 72 and drivetrain 135, and then resumes driving when the load is reduced. The torque level can be adjusted manually without removing the torque-limiting shaft coupling 146 from the reelette shaft 78.

A similar set-up could be used without a reelette to turn a rotatable portion of the pallet 64 that supports the coil of cable 10. The surface of the rotatable portion of the pallet 64 that contacts the cable 10 would have to be made with a material that has a high coefficient of friction to ensure that the pallet 64 does not spin without also moving the cable 10 (i.e., to ensure that the cable 10 rotates and does not "slip" over the pallet surface).

In accordance with alternative embodiments, the reelette 26 is not rotated by a motor. For example, the cable end 10a may be automatically loaded into the nip between the drive wheel 16 and idler 18 using compressed air. This concept may be reduced to practice by adding fins on the upper surface of the reelette 26. When compressed air is directed onto the finned upper surface of the reelette 26, the force exerted by the flowing air on each fin causes the reelette to rotate in a cable unwinding direction, thereby advancing the cable tip 10b toward the nip.

FIG. 14A is a block diagram identifying components of a cable tip positioning module 38 in accordance with one embodiment. This cable tip positioning module 38 includes a computer 162a that is configured to control various actuators and motors by executing pre-programmed sequences of machine control commands, such as computer numerical control (CNC) commands. The cable tip positioning module 38 depicted in FIG. 14A further includes an actuator 114 having a piston rod 116, a motor 72 mounted to a distal end of the piston rod 116, an actuator 154 having a piston rod 156, and a proximity sensor 158 mounted to a distal end of the piston rod 156. The computer 162a receives sensor feedback concerning cable proximity from the proximity sensor 158. The cable tip positioning module 38 further includes additional sensors, such as a photoelectric sensor 28 used to detect a cable tip position and a pallet detector 160 used to detect a pallet position. The cable tip positioning module 38 further includes a rotation encoder 73 operatively coupled to the output shaft 74 of the motor 72. The rotation encoder 73 generates pulses which the computer 162a is configured to count for the purpose of determining the number of degrees of motor output shaft rotation, which angular measurement in turns represents a distance traveled by the cable tip 10b during that output shaft rotation. The computer 162a is further configured to control the actuators 114 and 156 in the ways previously described with reference to FIGS. 6 and 12 respectively. Also the computer 162a is configured to send commands to a motor controller 164a for controlling the motor 72 in accordance with the feedback from photoelectric sensor 28, rotation encoder 73, proximity sensor 158 and pallet detector 160.

Figure 15:
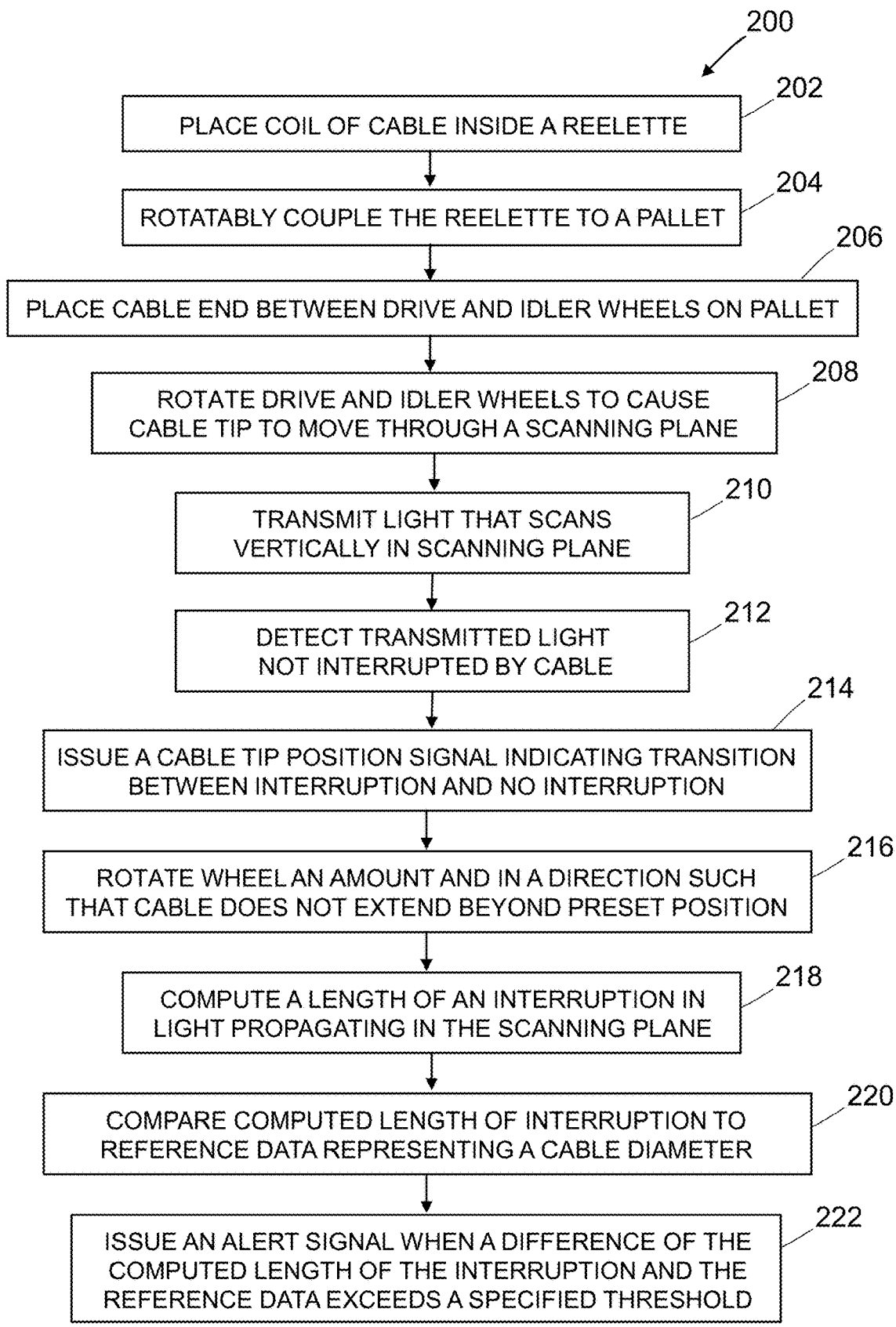
FIG. 15 is a flowchart identifying steps of a method for positioning a tip of a cable in accordance with one embodiment.

FIG. 15 is a flowchart identifying steps of a method 200 for positioning a tip of a cable in accordance with one embodiment. The method 200 starts with the placement of a coil of cable 10 inside a reelette 26 with a cable end 10a disposed outside the reelette 26 (step 202). Then the reelette 26 is rotatably couple to a pallet 64 that supports a drive wheel 16 and an idler wheel 18 that form a nip (step 204). The cable end 10a is then placed between the drive wheel 16 and an idler wheel 18 (step 206). Next the drive wheel 16 and idler wheel 18 are rotated in a direction that causes the cable tip 10b to move through a scanning plane 11 (step 208). As part of the scanning process, the method 200 includes the steps of transmitting light that scans vertically in the scanning plane 11 (step 210) and detecting transmitted light that has propagated in the scanning plane 11 and impinged on an array of light-detecting elements 24b (step 212). Detection of some of the transmitted light is interrupted when the cable 10 is intersected by the scanning plane 11. Next a cable tip position signal is issued (step 214). The cable tip position signal indicates that a transition between interruption and no interruption of transmitted light at the scanning plane 11 has occurred. In response to issuance of the cable tip position signal, the drive wheel 16 is rotated an amount and in a direction such that at the end of the rotation the cable 10 does not extend beyond the preset cable tip position (step 216). Optionally, the method 200 may further include the following steps: compute a length of an interruption in light propagating in the scanning plane 11 (step 218); comparing the computed length of the interruption to reference data representing a diameter of a cable 10 (step 220); and issuing an alert signal when a difference of the computed length of the interruption and the reference data exceeds a specified threshold.

FIG. 14B is a block diagram identifying some components of a cable processing workstation in accordance with one embodiment. As previously described, each cable processing workstation includes a funnel 22 and cable processing equipment 24 (not shown in FIG. 14B, but see FIG. 2C). The cable processing workstation further includes a computer 162b that is configured to control various actuators and motors by executing pre-programmed sequences of machine control commands, such as computer numerical control commands. The cable processing workstation depicted in FIG. 14B further includes a motor 72 and a rotation encoder 73 operatively coupled to the output shaft 74 of the motor 72. The rotation encoder 73 generates pulses which the computer 162b is configured to count for the purpose of determining the number of degrees of motor output shaft rotation, which angular measurement in turns represents a distance traveled by the cable tip 10b during that output shaft rotation. The computer 162b also receives sensor feedback from a photoelectric sensor 28 used to detect a cable tip position and a pallet detector 160 used to detect a pallet position. The computer 162b is configured to send commands to a motor controller 164b for controlling the motor 72 in accordance with feedback from photoelectric sensor 28, rotation encoder 73 and pallet detector 160.

Figure 16:
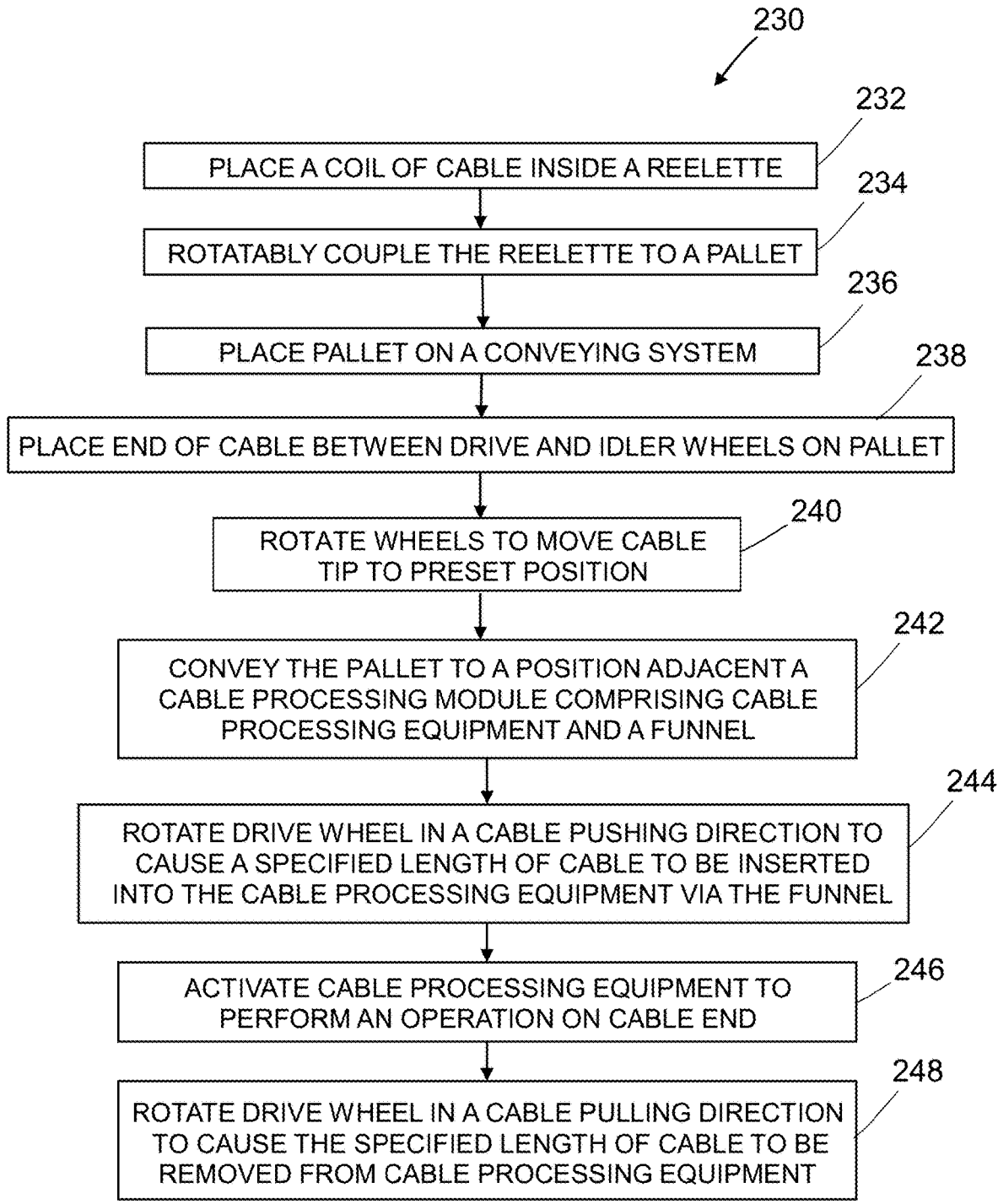
FIG. 16 is a flowchart identifying steps of a method for processing an end of a cable in accordance with one embodiment.

FIG. 16 is a flowchart identifying steps of a method 230 for processing an end of a cable 10 in accordance with one embodiment. A coil of cable 10 is placed inside a reelette 26 with a cable end 10a disposed outside the reelette 26 (step 232). Then the reelette 26 is rotatably coupled to a pallet 64 that supports drive wheel 16 and idler wheel 18 (step 234). Then the pallet 64 with reelette 26 coupled thereto are placed on a conveying system 60 (step 236). Thereafter the cable end 10a is placed between the drive wheel 16 and idler wheel 18 (step 238). The drive wheel 16 and idler wheel 18 then rotate to move the cable tip 10b to a preset cable tip position in front of the wheels (step 240). After the cable tip 10b has been properly positioned, the pallet 64 is conveyed to a position adjacent a cable processing module 30 at a workstation. The cable processing module 30 includes cable processing equipment 24 (see FIG. 2C) configured to perform an operation on the cable end 10a and a funnel 22 placed in front of the cable processing equipment 24 (step 142). When the pallet is properly positioned in front of the cable processing equipment 24, the drive wheel 16 is rotated in a cable pushing direction to cause a specified length of cable 10 to be inserted into the cable processing equipment 24 via the funnel 22 (step 144). The cable processing equipment 24 is then activated to perform the operation on the inserted cable end 10a (step 146). Upon completion of the operation, the drive wheel 16 and idler wheel are rotated in a cable pulling direction to cause the specified length of cable 10 to be removed from the cable processing equipment 24. In accordance with the embodiments disclosed herein, the operation performed by the cable processing equipment 24 may be any one following: cable tip positioning, laser scoring, jacket slug pulling, shield trimming, shield trim inspection, solder sleeve installation and inspection, and ground wire detection.

Referring again to FIG. 1, after the cable tip positioning module 38 has positioned the cable tip 10b at the preset cable tip position, the pallet 64 moves to the laser scoring module 40. The drive wheel 16 may be activated to insert a specified length of cable 10 into the laser scoring module 40. The cable end 10a may be inserted in stages to achieve the insertion of a specified length of length. For example, a first score line may be formed after a first specified length of the cable 10 has been inserted into the laser scoring module 40, and then a second score line may be formed after a second specified length of the cable 10 has been inserted into the laser scoring module 40.

The laser scoring module 40 includes a laser device (not shown in FIG. 1) that emits a laser beam of sufficient power for a sufficient duration to ablate insulation material of a type used to make the jacket 6 of the cable 10. Operation of the laser scoring module 40 is controlled by a computer (not shown in FIG. 1) in accordance with laser calibration data acquired during a laser device calibration procedure. More specifically, the laser calibration data establishes the amount of energy needed to ablate the jacket material to the penetration depth for similar insulation material.

FIG. 17 is a diagram representing a sectional view of a laser-scored portion of a shielded cable 10. The aforementioned laser device (not shown in FIG. 17) emits a laser beam 112. The laser scoring module 40 further includes rotatable clamps that enable laser energy to be projected onto the jacket 6 around the entire circumference of the jacket 6. The impinging laser beam 112 removes jacket material by ablation. The amount of jacket material ablated is sufficient to form a score line 3 having a penetration depth D. In accordance with one proposed implementation, the result is a score line 3 that extends circumferentially in an annular region of the cable 10 (not reaching the shield 4). The presence of the laser score line 3 prepares the jacket 2 for the removal of jacket slug 2a at the next workstation. As previously mentioned, additional score lines may be formed.

Figure 18A:
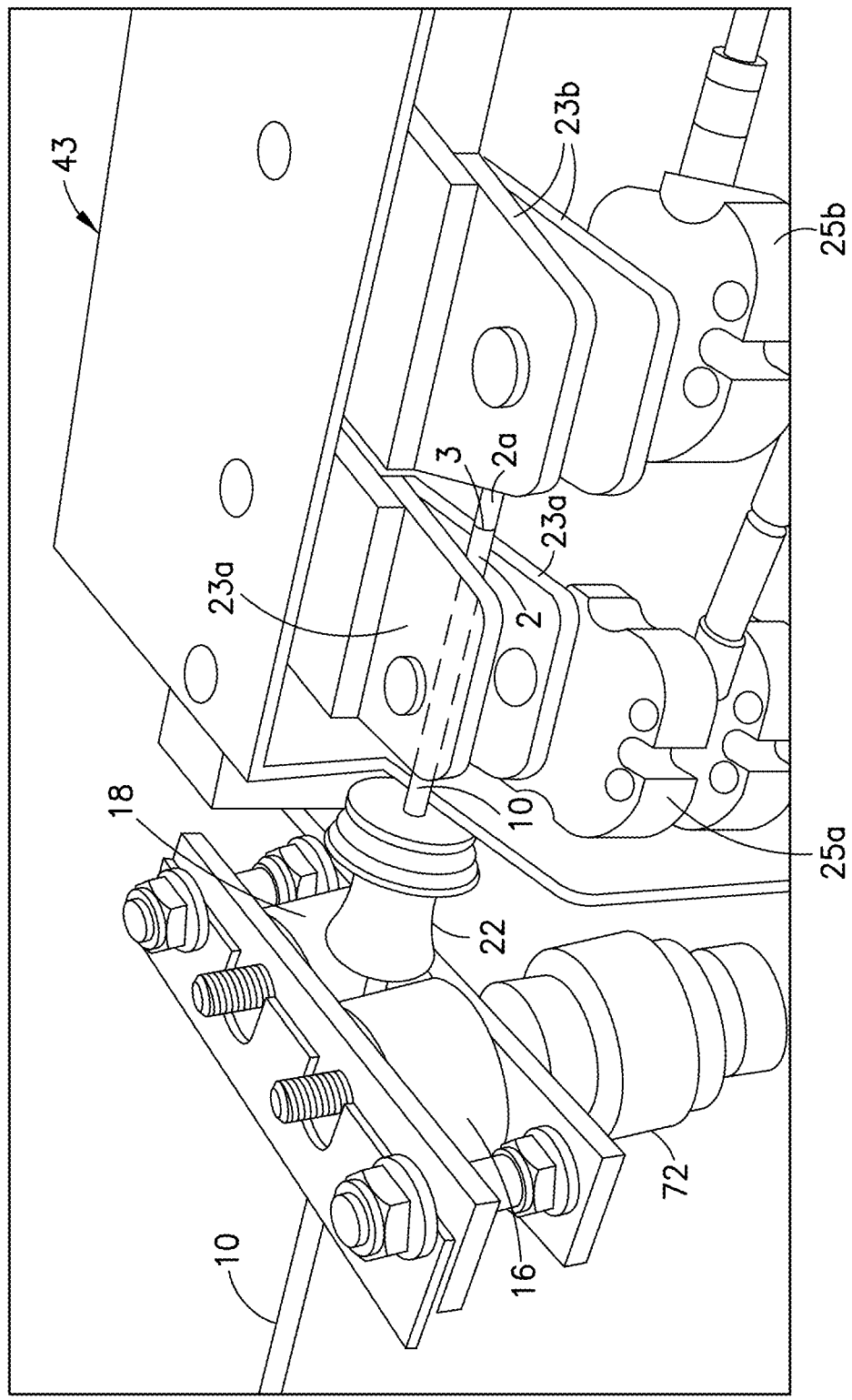

After the laser scoring module 40 has scored the jacket 2 of the cable 10, the pallet 64 moves to the workstation where the jacket slug pulling module 42 resides (see FIG. 1). As seen in FIG. 18A, the jacket slug pulling module 42 includes a funnel 22 and jacket slug pulling equipment 43. The jacket slug pulling equipment 43 includes a first clamp 23a, the lower part of clamp 23a being coupled to the piston rod of a first pneumatic cylinder 25a, and a second clamp 23b, the lower part of clamps 23b being coupled to the piston rod of a second pneumatic cylinder 25b. The first and second clamps 23a and 23b are closed when the piston rods are extended and open when the piston rods are retracted. The second pneumatic cylinder 25b and the second clamp 23b are mounted to a carriage (not shown in FIG. 18A) that is translatable along an axis that is generally parallel to the portion of the cable 10 being processed. More specifically, the second clamp 23b is translatable between the position of the second clamp 23b seen in FIG. 15A and the position of the second clamp 23b seen in FIG. 15C. Translation of the second pneumatic cylinder 25b and second clamp 23b may be actuated by a linear actuator of one of the types previously described.

The pneumatic cylinders of the jacket slug pulling equipment 43 operate under the control of a computer (e.g., a computer programmed to execute CNC commands) that is part of the jacket slug pulling module 42. That computer also controls the operation of motor 72 seen in FIGS. 15A-15D. More specifically, the computer of the jacket slug pulling module 42 is programmed to cause the apparatus depicted in FIGS. 18A-18D to perform the following operations in the following sequence: (a) activate the motor 72 to drive rotation of the drive wheel 16 in a cable pushing direction to cause cable end 10a to be inserted into the jacket slug pulling equipment 43; (b) activate the pneumatic cylinders and carriage translation motor of the jacket slug pulling equipment 43 to pull the jacket slug 2a off of the cable end 10a; and (c) activate the motor 72 to drive rotation of the drive wheel 16 in a cable pulling direction to cause the cable end 10a to be removed from the jacket slug pulling equipment 43.

Figure 18B:
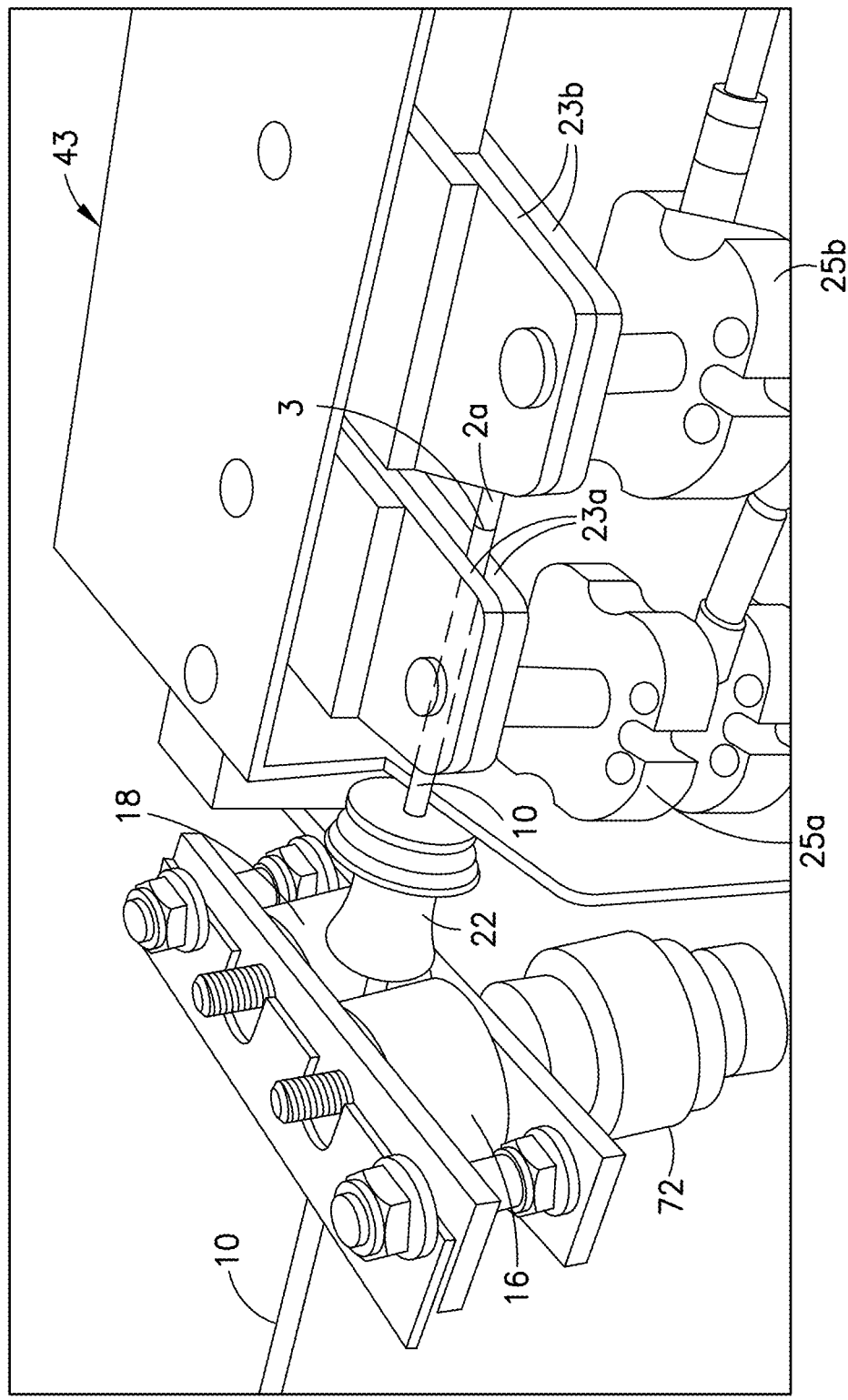
Figure 18D:
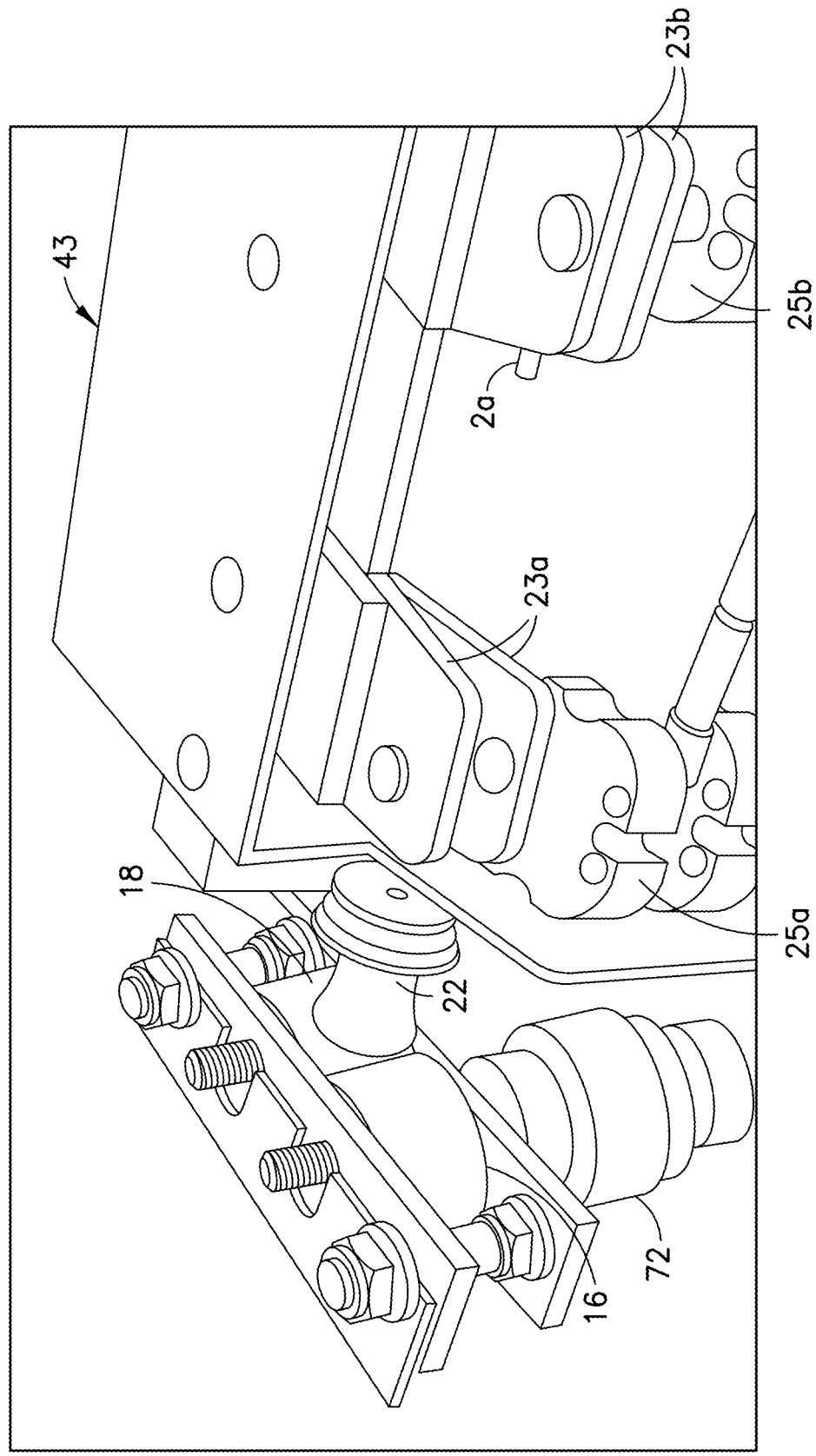

As seen in FIG. 18C, the jacket slug pulling equipment 43 removes the jacket slug 2a to reveal the shield 4 in the unjacketed portion of the cable 10. FIGS. 18A through 18D are respective views of a system for removing a portion of a jacket 2 (namely, the jacket slug 2a) from the end of a cable 10 at four stages in an automated jacket slug pulling operation. The first stage is when a portion of the cable 10 has been inserted through the funnel 22 and into a space between a pair of open clamps 23a and 23b (FIG. 18A). The second stage is when the clamps 23a and 23b have been closed and clamp the cable 10 (FIG. 18B). The third stage is after the second clamp 23b has been translated (rightward in FIG. 18C) to pull a jacket slug 2a off of the end of the cable 10 (FIG. 18C) while the first clamp 23a was not moved. The fourth stage is after the first clamp 23a has been opened and the cable 10 has been retracted from the jacket slug pulling equipment 43 (FIG. 18D).

After the jacket slug pulling module 42 has pulled off the jacket slug 2a of the cable 10, the pallet 64 moves to the shield trimming module 44 (see FIG. 1). The shield trimming module 44 trims off a portion of the exposed portion of the shield 4 to reveal respective portions of the wires 6 and 8 of the cable 10. FIGS. 19A through 19G are diagrams representing respective partially sectional views of a shield trimming apparatus 45 for trimming a portion of a shield 4 from the cable end 10a at seven stages in an automated shield trimming operation.

Figure 19A:
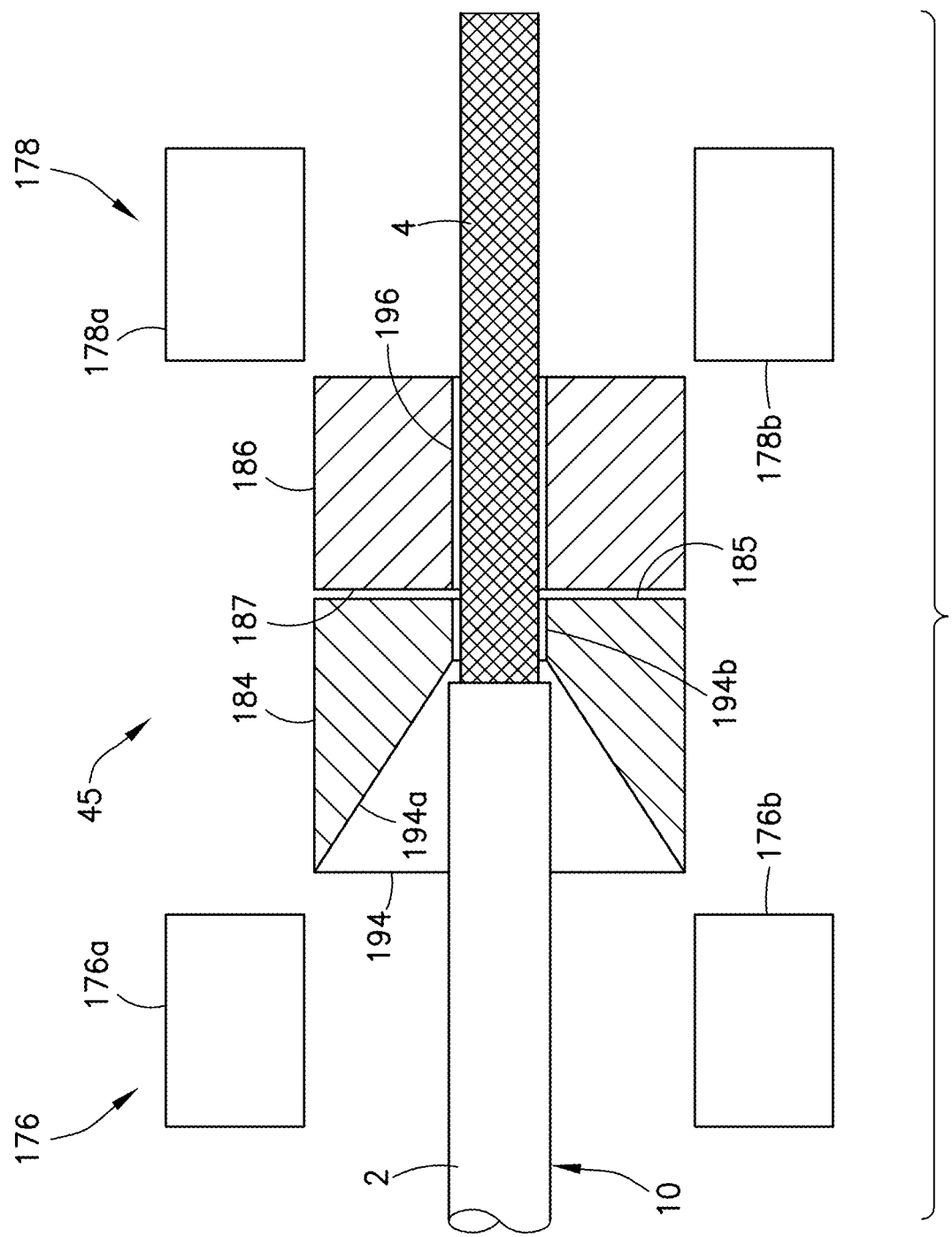
Figure 19B:
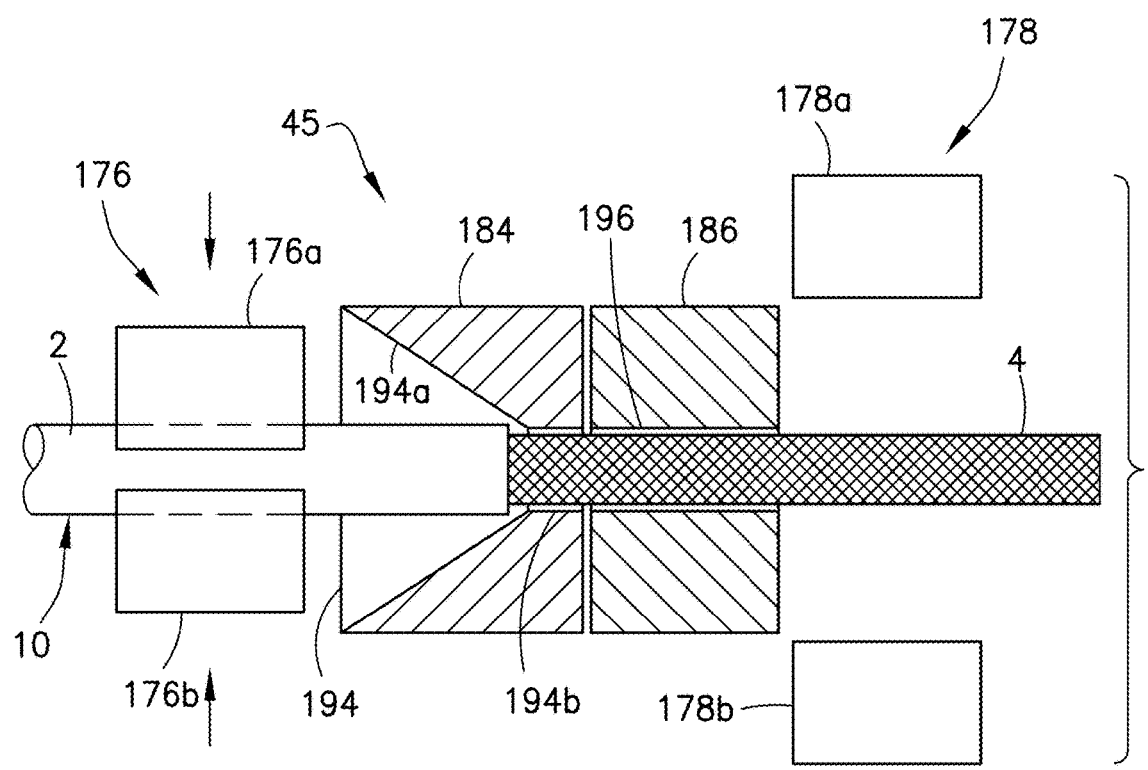
Figure 19C:
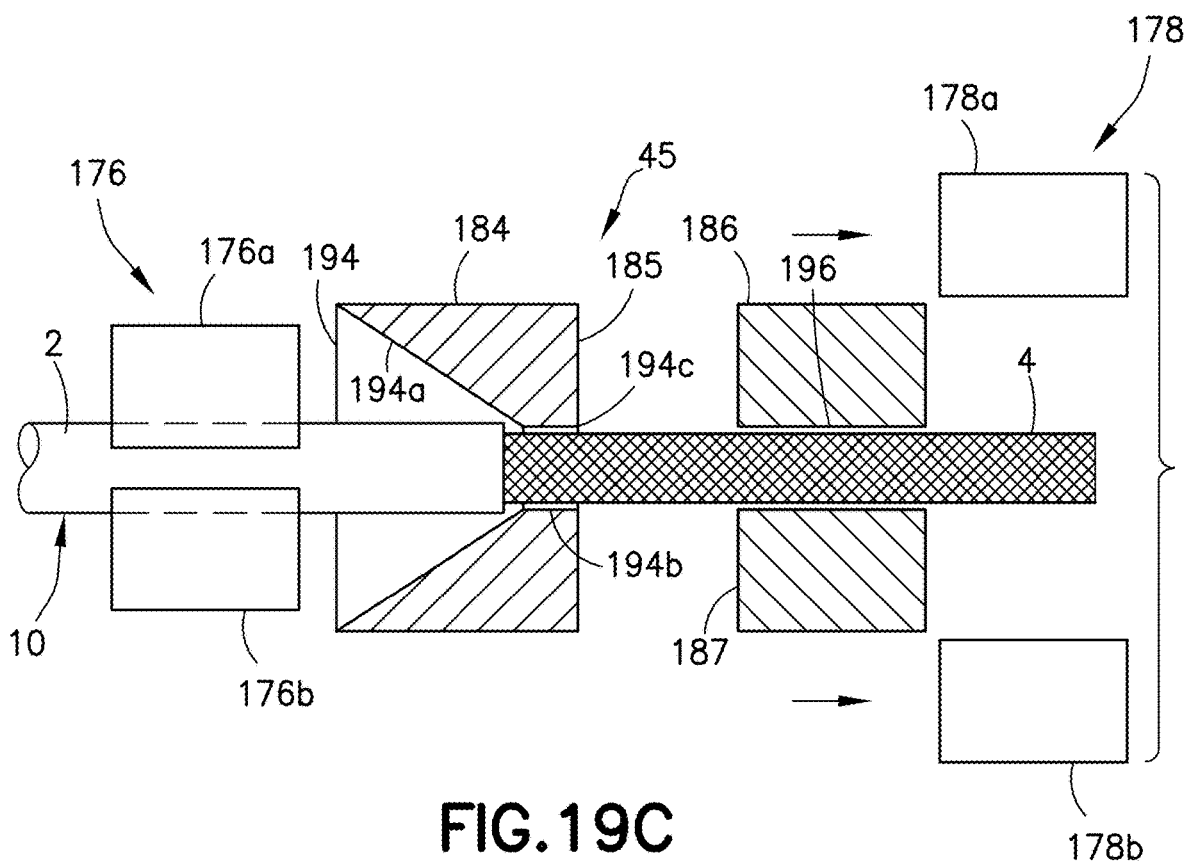

FIG. 19A is a partially sectional view of the shield trimming apparatus 45 in accordance with one embodiment. The shield trimming apparatus 45 includes a cable gripper 176, a first press die 184, a second press die 186 and a shield gripper 178. The dies are shown in section; the grippers are not. In accordance with one embodiment, the cable gripper 176 and first press die 184 are stationary; the second press die 186 and shield gripper 178 are translatable relative to the first press die 184 between the axial position shown in FIGS. 19A, 19B and 19E-19G and the axial position shown in FIGS. 19C and 19D. In accordance with another embodiment, the cable gripper 176 may be movable relative to the first press die 184 (particularly when the shield trimmer is used as manually-loaded benchtop equipment).

The first press die 184 has a cable entry hole system. Only one hole 194 is visible in FIGS. 19A-19G. In accordance with one proposed implementation, press die 184 is a solid metal plate that has been drilled through with at least one hole 194 for the cable 10 to pass through. The hole 194 includes a countersunk feature that acts as a guiding funnel during cable insertion. More specifically, the hole 194 includes a circular conical section 194a and a circular cylindrical section 194b that terminates at a hole edge 194c. The second press die 186 has a circular cylindrical hole 196 through which the unjacketed portion of the cable 10 is passed. The circular cylindrical hole 196 of the second press die 186 is aligned with the circular cylindrical section 194b of first press die 184.

The first press die 194 should be made of a material that produces a sharp edge along the edge of the circular cylindrical hole 196 and is hard enough to maintain hole features without excessive wearing along the hole edges. An example material is tool steel. Other examples include metals that have been heat treated, cold worked, or processed in some other way to increase the hardness of the metal (or change other properties associated with wear resistance). The second press die 186 may be made of a similar material.

Figure 19D:
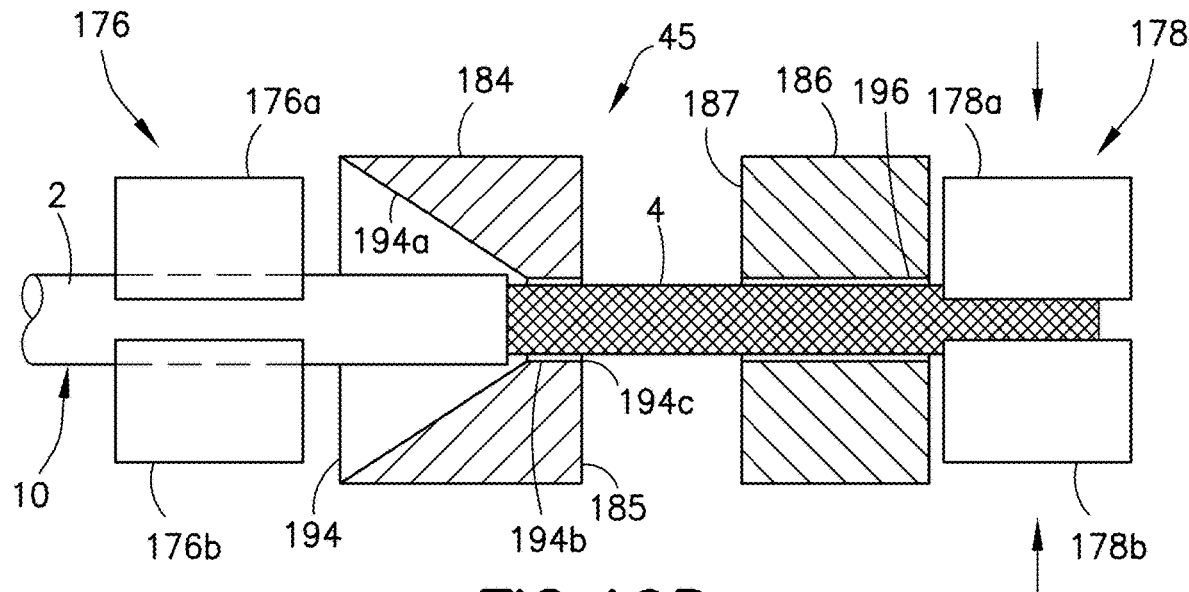
Figure 19E:
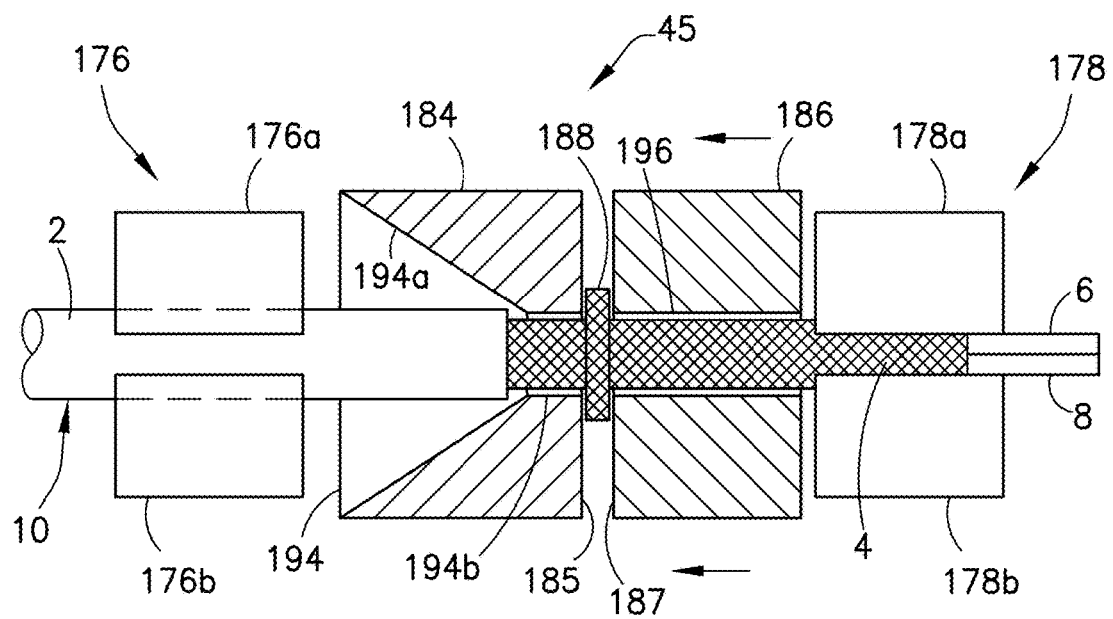
Figure 19F:
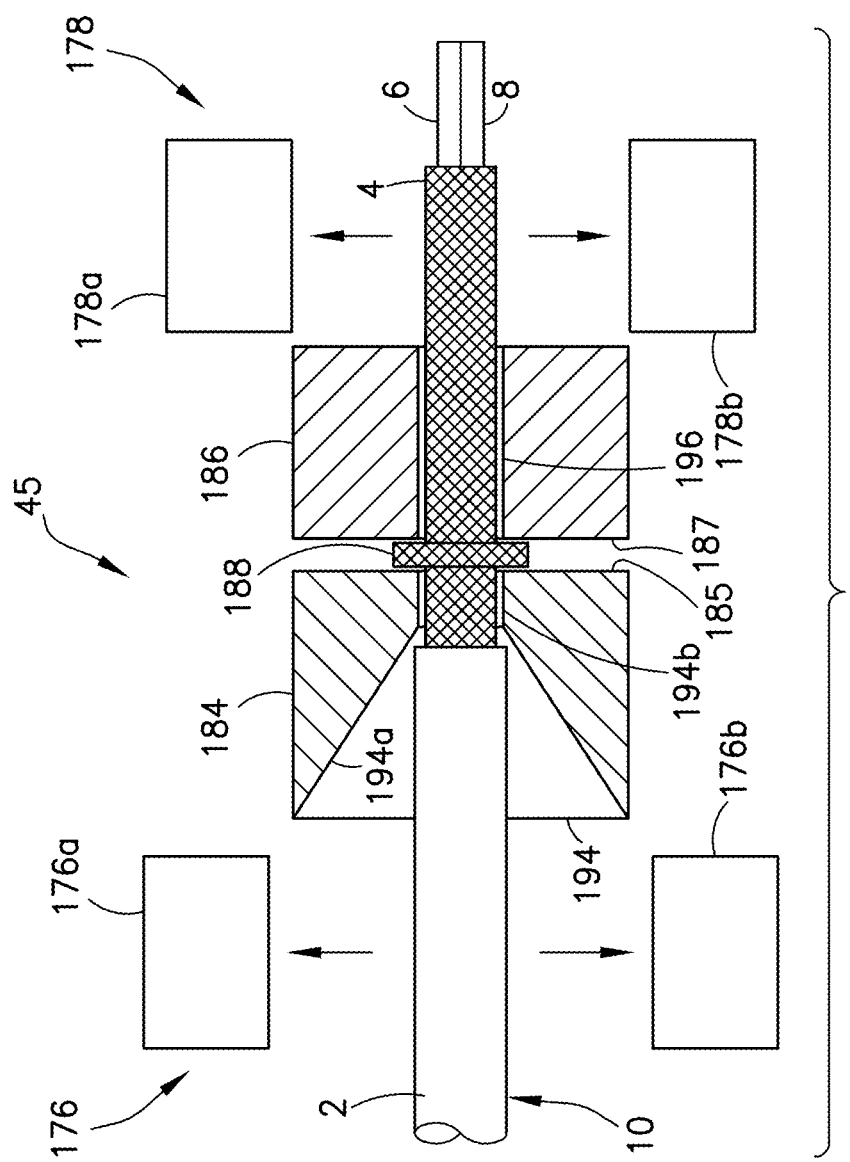

As seen in FIG. 19A, the cable gripper 176 includes a pair of cable gripper fingers 176a and 176b; the shield gripper 178 includes a pair of shield gripper fingers 178a and 178b. The cable gripper fingers 176a and 176b of the cable gripper 176 are translatable in opposite directions between respective open positions (as seen in FIGS. 19A, 19F and 19G) and respective closed positions (as seen in FIGS. 19B-19E). The shield gripper fingers 178a and 178b of the shield gripper 178 are translatable in opposite directions between respective open positions (as seen in FIGS. 19A-19C, 19F and 19G) and respective closed positions (as seen in FIGS. 19D and 19E). The cable gripper 176 is located on the front (entry) side of the shield trimming apparatus 45. When the cable gripper fingers 176a and 176b are closed, the cable gripper 176 maintains the position of the cable 10 during processing. The shield gripper 178 is located on the rear side of the shield trimming apparatus 45 and grips the exposed shield 4 of the cable 10.

The cable gripper 176 may be actuated to grip the cable 10 by respective double-acting pneumatic cylinders or electric motors with lead screws or other suitable means. Similarly, the shield gripper 176 may be actuated to grip the shield 4 by respective double-acting pneumatic cylinders or electric motors with lead screws or other suitable means. Preferably the grippers are pneumatically or servo actuated with force feedback. Suitable methods of force feedback include using modulated air pressure or a load cell/strain gauge.

Each of the cable gripper fingers 176a, 176b and shield gripper fingers 178a and 178b is lined with a compliant material that conforms around the profile of (and does not damage) the cable 10 in order to maximize the area of contact between the gripper fingers and the cable 10 when the grippers are closed. Cables processed may have many different cross-sectional profiles, depending on the number of wires within the cable, so it is important that the material be compliant enough to conform over different cable profiles while maintaining effective grip. Examples of such compliant material include silicone and rubber.

In the first stage depicted in FIG. 19A, the second press die 186 is pushed against the first press die 184 to eliminate any gap that may allow the cable to pass through both dies without misalignment or snagging of the exposed shielding at the entrance of the hole 196 of the second press die 186. Both the cable gripper 176 and the shield gripper 178 are open. A cable 10 having an unjacketed cable end with exposed shield 4 is inserted through both of the first and second press dies 184 and 186. In the second stage depicted in FIG. 19B, the cable gripper 176 is closed to hold the cable 10 in place. In the third stage depicted in FIG. 19C, the second press die 186 is moved away from the first press die 184. In the fourth stage of depicted in FIG. 19D, the shield gripper 178 is closed to grip the shield 4. In the fifth stage depicted in FIG. 19E, the second press die 186 and the shield gripper 178 are moved in unison toward the first press die 184. This causes a portion 188 of the shield 4 to bunch (hereinafter "shield bunch 188") between the first and second press dies 184 and 186 and become pinched between the press dies. The shield gripper 186 causes portions 4b and 4c of the exposed shield 4 to slide over the wires 6 and 8 and the second press die 186 constrains portion 4b of the sliding portion from displacing radially outward. In the sixth stage depicted in FIG. 19F, the cable and shield grippers 176 and 178 both open to release the cable 10 while the shield bunch 188 of shield 4 remains pinched between the first and second press dies 184 and 186. In the seventh stage depicted in FIG. 19G, the cable 10 is removed from the shield trimming apparatus 45. When the cable 10 starts to retract in the direction indicated by the arrow in FIG. 19G, the shield strands connecting the shield bunch 188 to an adjacent unbunched portion of the shield 4 are torn across the stress concentration points created by the hole edge 194c (best seen in FIGS. 19C and 19D) of the first press die 184, resulting in a uniformly trimmed shield.

In a fully automated system, the cable 10 may be removed from the shield trimming apparatus 45 by activating the drive wheel 16 (see, for example, FIG. 3) to rotate in a cable pulling direction. In the case of a benchtop version, the cable 10 may be removed manually by pulling the cable out to break shield strands or by having cable gripper 176 move away from hole 194 to move the cable 10 out enough to break the shield strands.

After the shield trimming module 44 has trimmed the shield 4 of the cable 10, the pallet 64 moves to the shield trim inspection module 46 (see FIG. 1). The shield trim inspection module 46 performs a quality check of the trimmed shield using a vision inspection system.

After the shield trim inspection module 46 has inspected the trimmed shield 4 of the cable 10, the pallet 64 moves to one of two solder sleeve installation modules 52 and 54 (see FIG. 1). The solder sleeve installation modules 52 and 54 are configured to install a solder sleeve 12 with a ground wire 14 onto the cable 10 using automated picking, placing and melting operations.

FIG. 20A is a diagram representing a side view of a typical solder sleeve 12 having a pre-installed ground wire 14. The solder sleeve 12 includes a sleeve 7 made of transparent, heat-shrinkable thermoplastic material. The internal diameter of the sleeve is greater than the outer diameter of the cable being processed. The solder sleeve 12 further includes a fluxed solder preform 9 adhered to the inside of the sleeve 7 at a central position and a pair of thermoplastic sealing rings 13a and 13b.

FIG. 20B is a diagram representing a side view of the solder sleeve 12 depicted in FIG. 20A when placed in a position overlying a portion of a cable 10 having a jacket 2 and an unjacketed portion where the shield 4 is exposed. The exposed shield 4 is surrounded by the fluxed solder preform 9, which when melted and then solidified will form an electrical connection between the shield 4 and the ground wire conductor strand 15. The sleeve 7 has not yet been melted.

FIG. 20C is a diagram representing a side view of the solder sleeve 12 depicted in FIG. 20A after the solder sleeve 12 has been melted onto the cable 10.

As disclosed above, the solder sleeve installation module 52 and 54 (see FIG. 1) are each configured to install a solder sleeve 12 onto the end of a cable 10. The cable processing equipment of a solder sleeve installation module may be used to install a solder sleeve 12 (e.g., of the type described with reference to FIG. 20A) or a dead end sleeve made of electrical insulation material only. Solder sleeves are melted and shrunk onto an end of a cable; a dead end sleeve is shrunk without melting onto an end of a cable. Solder sleeves and dead end sleeves are separated by part number and distributed onto different vibration tables. (Vibration tables could be replaced with tape-and-reels or cartridges.) If the solder sleeve is on a tape-and-reel or cartridge, the solder sleeve will be pushed out of the cavity (via pneumatic actuator, electric actuator, etc.) so that an end effector can grip it.

Figure 21:
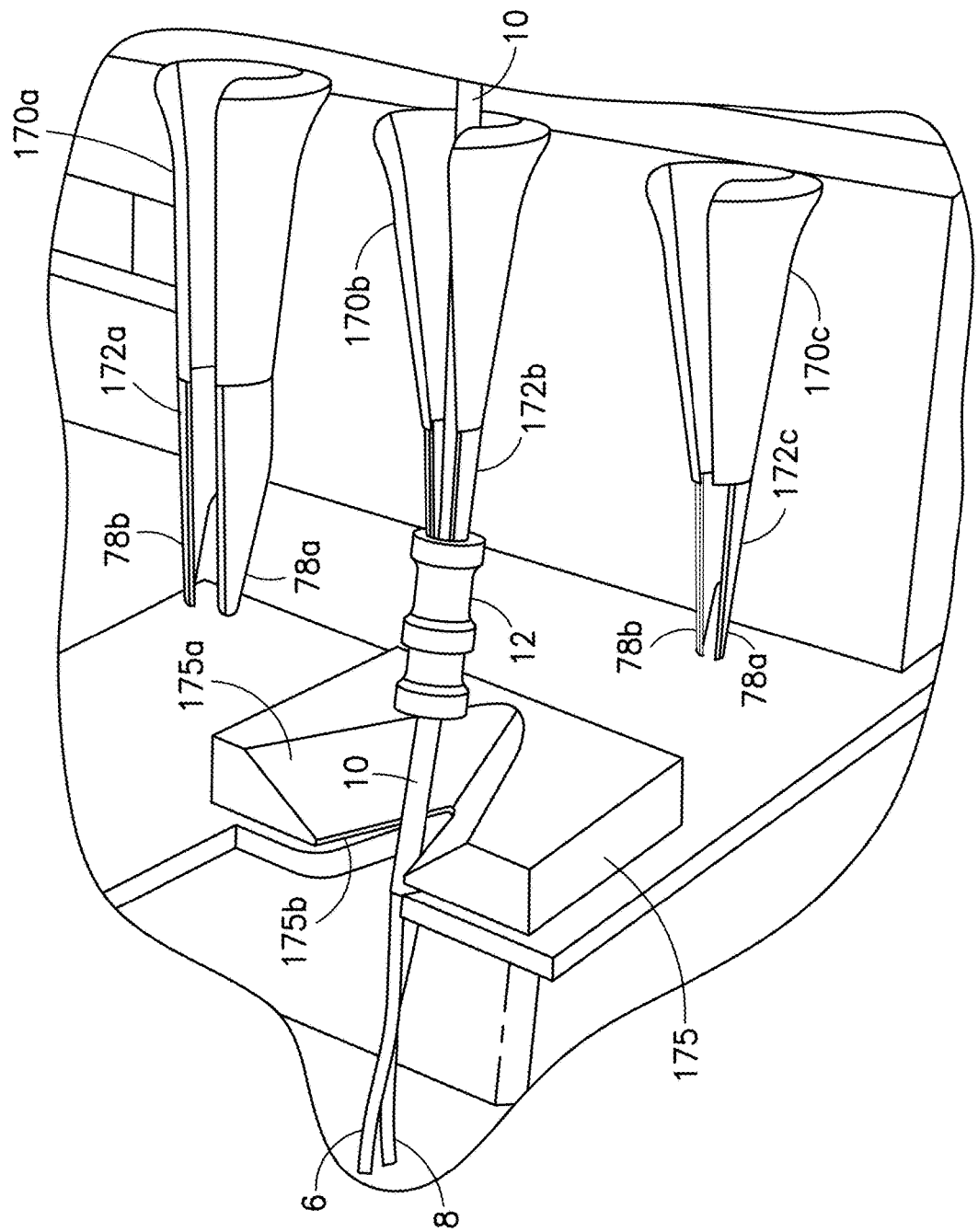
FIG. 21 is a diagram representing a view of an apparatus for placing a solder sleeve onto a portion of a cable having exposed shielding as part of an automated solder sleeve installation operation.
Figure 22:
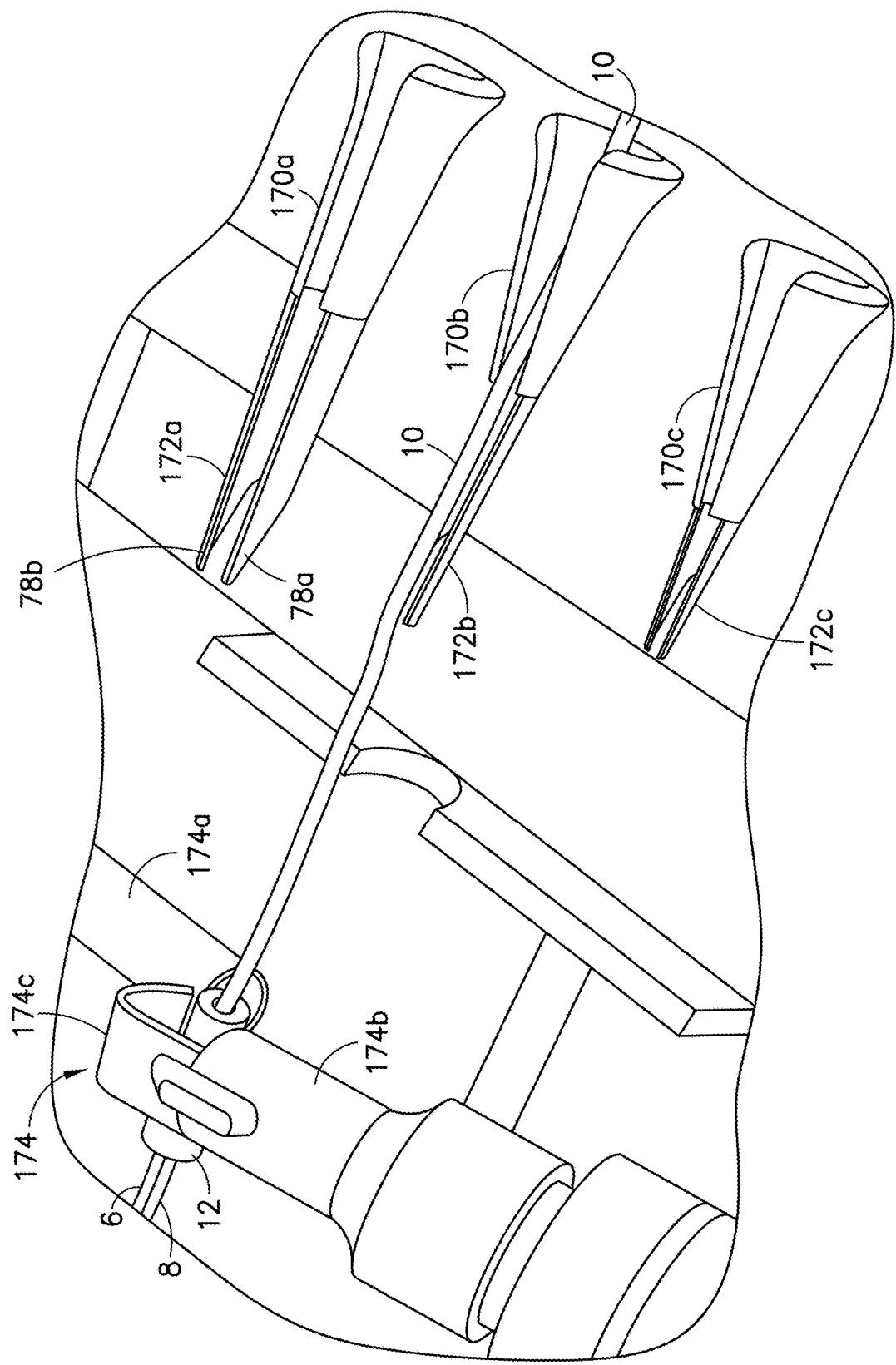
FIG. 22 is a diagram representing a view of an apparatus for melting a solder sleeve onto a portion of a cable having exposed shielding using hot air as part of an automated solder sleeve installation operation.

In accordance with the embodiment partly depicted in FIGS. 21 and 22, the components of the cable processing equipment of each of the solder sleeve installation modules 52 and 54 include: (a) a robotic end effector (not shown in the drawings, but well known in the art) configured to pick up and position a solder sleeve 12; (b) a funnel system that includes multiple open-top funnels 170*a*-170*c* (shown in FIG. 21) for guiding a cable 10 through the solder sleeve 12; (c) a heating tool 174 (shown in FIG. 22) that melts the solder sleeve 12 onto the cable 10; and a cable lift mechanism in the form of a lever arm (not shown in the drawings) that lifts the cable with installed solder sleeve out of the open-top funnel. In the embodiment depicted in FIG. 21, the heating tool 174 is a hot air heating tool that is actuated over the cable 10 and solder sleeve 12 once they are positioned for processing. This melts the solder sleeve 12 onto the cable. Alternative heating tools may be employed, such as an infrared heating tool. The heating process may be integrated with a method for performing an active dimensional analysis to monitor solder sleeves during melting. This involves the use of laser measurement devices configured to record diameter data at specific points on the fused cable and solder sleeve in order to determine when the solder sleeve has been fully melted.

At the start of a solder sleeve installation procedure, the aforementioned robotic end effector is controlled to move to whichever one of a plurality of vibration tables has the correct sleeve to be installed on the cable 10. The robotic end effector picks up a solder sleeve and carries it to the apparatus depicted in FIGS. 21 and 22. The robotic end effector (not shown in FIGS. 21 and 22) has a pair of gripper fingers designed to grip a particular type of solder sleeve. The robotic end effector may be integrated onto a robotic arm or gantry with a vision system. Pick and place vision systems are commercially available off the shelf and could be adapted to grip a particular solder sleeve 12.

In accordance with the embodiment partly depicted in FIG. 21, the funnel system includes multiple open-top funnels 170*a*-170*c* for guiding a cable through a solder sleeve. The open tops 76*a*-76*c* of the open-top funnels 170*a*-170*c* enable removal of the cable from the funnel after a solder sleeve has been installed. The open-top funnels 170*a*-170*c* are mounted on a sliding plate 176 that is capable of sliding side to side to place a correct open-top funnel (e.g., open-top funnel 170*b* in the scenario depicted in FIG. 21) in front of a notch 175*b* of a cable guide block 175. The cable guide block further includes a guide surface 175*a* for guiding the end of the cable 10 into the notch 175*b* during cable insertion.

The funnel system further includes multiple funnel extensions 172*a*-172*c*. The plastic open-top funnels 170*a*-170*c* are effectively extended by attaching respective funnel extensions 172*a*-172*c*. Each of the funnel extensions 172*a*-172*c* may terminate in a pair of prongs 78*a* and 78*b*. The prongs 78*a* and 78*b* are sized and configured to fit within the inner diameter of the applicable solder sleeve. When a solder sleeve 12 is placed on a pair of prongs 78*a* and 78*b*, the prongs 78*a* and 78*b* extend through at least most of the solder sleeve 12 and taper down along the length of the prong to facilitate easy placement of the solder sleeve 12 over the prongs 78*a* and 78*b*. Preferably the prongs 78*a* and 78*b* are made of a material having a low coefficient of friction (e.g., metal) so that the cable 10 may easily slide along the interior surface of the prong. Also the prongs 78*a* and 78*b* are thin enough that the prongs do not adversely impact the cable's ability to fit through the solder sleeve 12. The prongs 78*a* and 78*b* preferably have smooth interior surfaces devoid of rough patches or sharp edges that might damage the shield 4 and/or cable 10.

FIG. 21 depicts one state during the solder sleeve installation process wherein the solder sleeve 12 has already been placed around the funnel extension 172*b* by an end effector and the cable has already been fed through the funnel 170*b* and solder sleeve 12. As seen in FIG. 21, the solder sleeve 12 is seated on the funnel extension 172*b* and does not contact the open-top funnel 170*b*. The funnel extension 172*b* closes off a large portion of the internal surface of the solder sleeve 12, and provides a smooth surface for the cable 10 to slide along as it is fed through the open-top funnel 170*b* and the solder sleeve 12.

More specifically, the solder sleeve installation process in accordance with one embodiment includes the following steps which are performed before the state of the apparatus depicted in FIG. 21 is attained, The aforementioned end effector (not shown in the drawings) picks up a solder sleeve 12 from a vibration table (or other sleeve supply mechanism), places it over the end of the funnel extension 172*b*, and then remains stationary while the cable 10 is being fed through the solder sleeve 12 by the cable positioning mechanism 19. The end effector is equipped with a plastic cover plate which closes off the open top of the funnel to prevent the cable 10 from escaping the open-top funnel 170*b* as it is fed through the solder sleeve 12.

The system controller (not shown in FIG. 21, but see system controller 100 in FIG. 27) may either calculates how far the cable positioning mechanism 19 (see FIG. 3B) should drive the cable 10 into the module based on cable strip length information or uses a known pre-set value. The cable shield 4 is stopped at a repeatable position for processing. Thereafter an end effector (not shown in FIG. 21) moves the solder sleeve 12 to the repeatable position seen in FIG. 22 for processing. These repeatable positions are such that the solder sleeve 12 is centered over the exposed area of the trimmed shield 4 of the cable 10. In one embodiment, the end effector 108 then releases the solder sleeve 12 and moves out of the way (back to the origin position) prior to the start of the solder sleeve melt process. In another embodiment, the end effector 108 remains holding the sleeve 12 during the heating process.

FIG. 22 shows one embodiment of an apparatus for melting a solder sleeve 12 onto a portion of a cable 10 having exposed shielding using hot air as part of an automated solder sleeve installation operation. The system controller 100 sends commands to a robotic apparatus that places the components of the heating tool 174 in the positions seen in FIG. 14. In this example, the heating tool 174 includes two hot air guns 174a and 174b placed on opposite sides of the solder sleeve 12 and a curved-tip nozzle 174c attached to the outlet of the hot air gun 174a. The curved-tip nozzle 174c projects from the hot air gun 174a and overhangs the solder sleeve 12. In addition, the hot air gun 174b may have a flat-tip nozzle attached that is roughly the length of the solder sleeve. The hot air gun 174b moves laterally from the right of the solder sleeve 12 into position. The hot air gun 174a rotates down over the solder sleeve 12. The hot air guns 174a and 174b may be moved into heating position by activation of respective linear actuators (not shown). Other embodiments may use a single hot air gun, or more than two.

During the heating stage, the two hot air guns 174a and 174b apply heat to the solder sleeve 12. The curved-tip nozzle 174c "reflects" the generated hot air and causes it to flow around the solder sleeve 12. The heating tool 174 generates sufficient heat in the heating zone that the solder ring 9 of the solder sleeve 12 melts onto the cable 10. Using two hot air guns improves the even application of heat to all sides of the solder sleeve 12, as well as enables an increase in the speed of the overall melting process. At no point should the hot air guns make physical contact with the solder sleeve 12 or cable 10 due to the possibility of charring or damaging the jacket 2 of the cable 10.

In accordance with alternative embodiments, other types of heating devices, such as infrared heaters, may be employed in the solder sleeve melting process. An infrared heater or heat lamp is a body with a higher temperature which transfers energy to a body with a lower temperature through electromagnetic radiation. Depending on the temperature of the emitting body, the wavelength of the peak of the infrared radiation ranges from 780 nm to 1 mm. No contact or medium between the two bodies is needed for the energy transfer.

Once the solder sleeve 12 has been melted onto the cable 10, the cable 10 may be popped up and out of the open-top funnel 172b (e.g., by a lever arm that lifts the cable 10 upward) and then retracted back toward the pallet 64 by the cable positioning mechanism 19 (e.g., drive wheel 16 and idler wheel 18).

An alternative funnel system design may use a "split funnel" consisting of two separable funnel halves. The funnel halves may be closed as the cable is fed into the system and later opened in order to remove the cable. If the funnels are split, they may remain closed until the solder sleeve installation.

The above-described funnel system designs could be used at other modules within the fully automated system (in conjunction with an automated feed method, such as drive wheels). However, until a solder sleeve is installed onto the cable, the funnels do not need to be split or have an opening.

Figure 23:
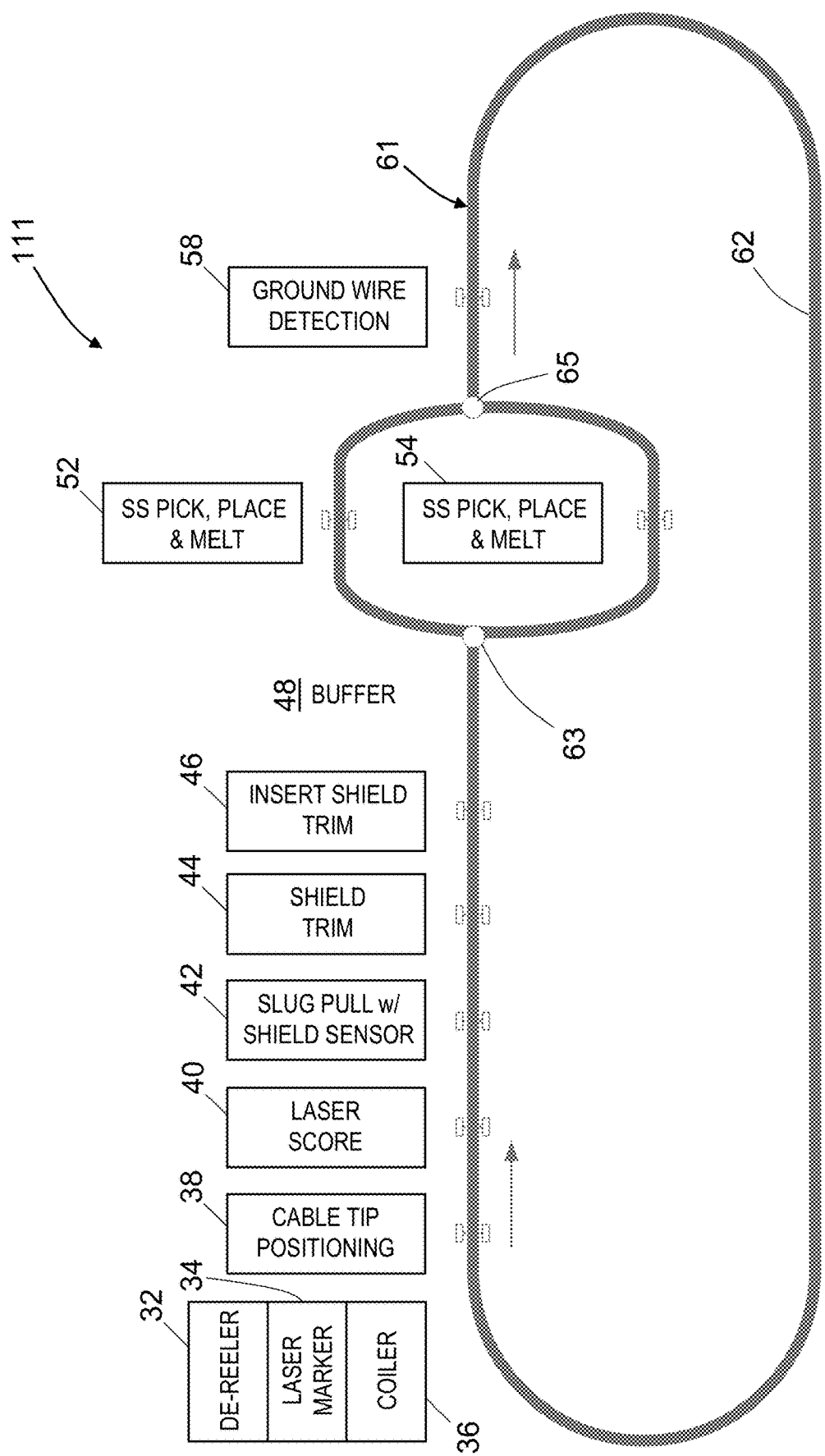
FIG. 23 is a diagram representing and identifying components of an automated system for performing respective operations on an end of a cable at a plurality of cable processing modules in accordance with an alternative embodiment.

FIG. 23 is a diagram representing and identifying components of an automated system 111 for performing respective operations on an end of a cable 10 (not shown in FIG. 23, but see cables 10 in FIGS. 24A-24E) at a plurality of cable processing modules in accordance with an alternative embodiment. This concept utilizes a conveyor system 61 with locating modules. The conveyor system 61 further includes a diverter module 63 and a merge module 65 to allow concurrent processing at both solder sleeve installation modules 52 and 54 in order to achieve lower cycle times.

Figure 24A:
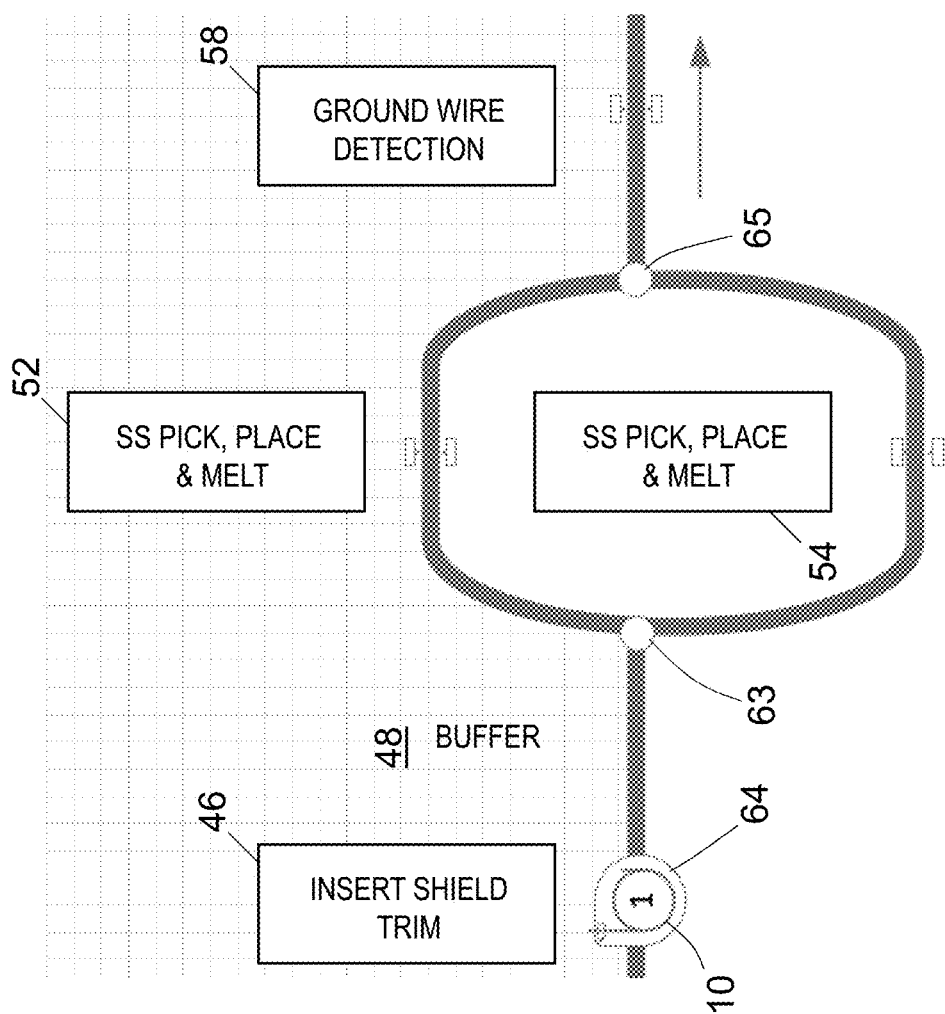
FIGS. 24A through 24E are diagrams representing plan views of a portion of the automated system depicted in FIG. 23, showing the positions of various pallets (referred to individually as Pallet #1, Pallet #2, etc.) at successive intervals of time.

FIGS. 24A through 24E are diagrams representing plan views of a portion of the automated system 111 depicted in FIG. 23, showing the positions of various pallets 64 (referred to individually as Pallet #1, Pallet #2, etc.) at successive intervals of time. FIG. 24A shows Pallet #1 in position to be processed at the shield trim inspection module 46.

Figure 24B:
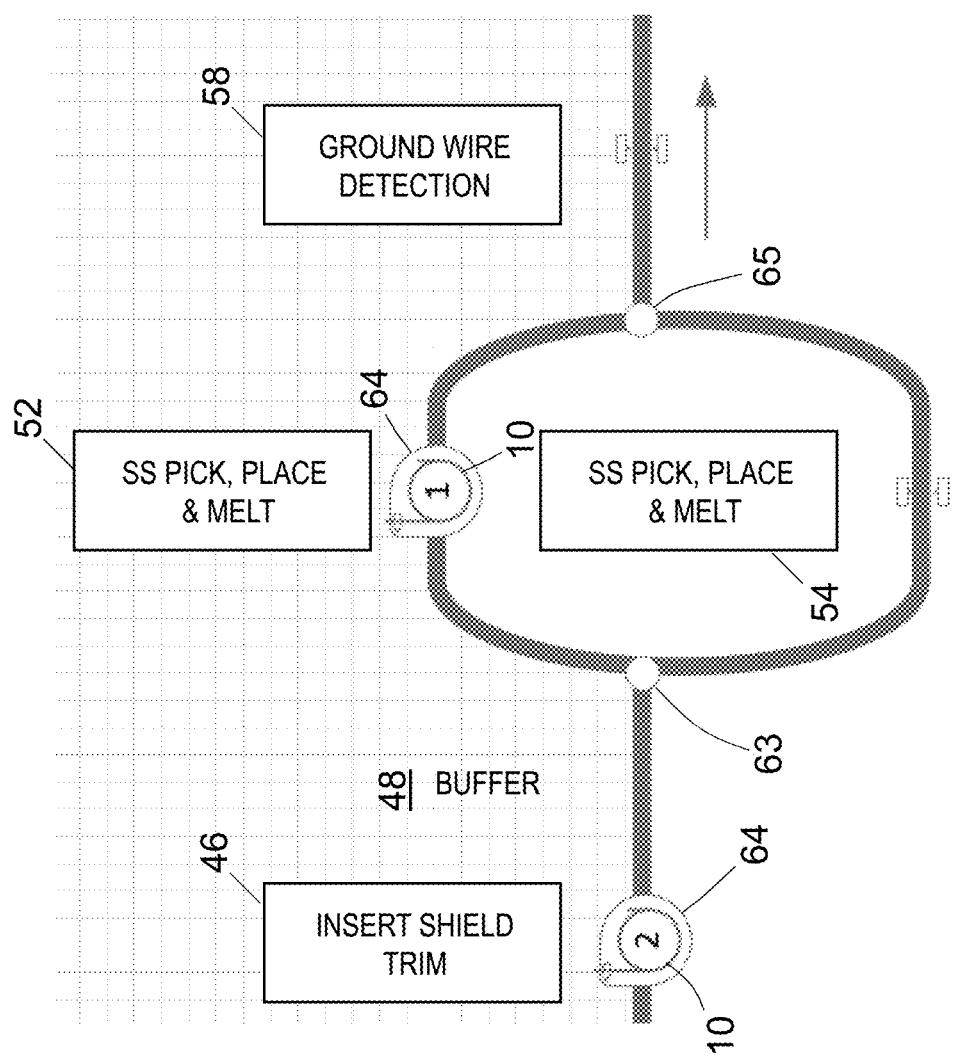

FIG. 24B shows that Pallet #1 has advanced to the solder sleeve installation module 52, where a solder sleeve will be installed, while Pallet #2 has advanced to the shield trim inspection module 46. When the shield trim inspection of the cable 10 on Pallet #2 is completed, Pallet #2 will be released.

Figure 24C:
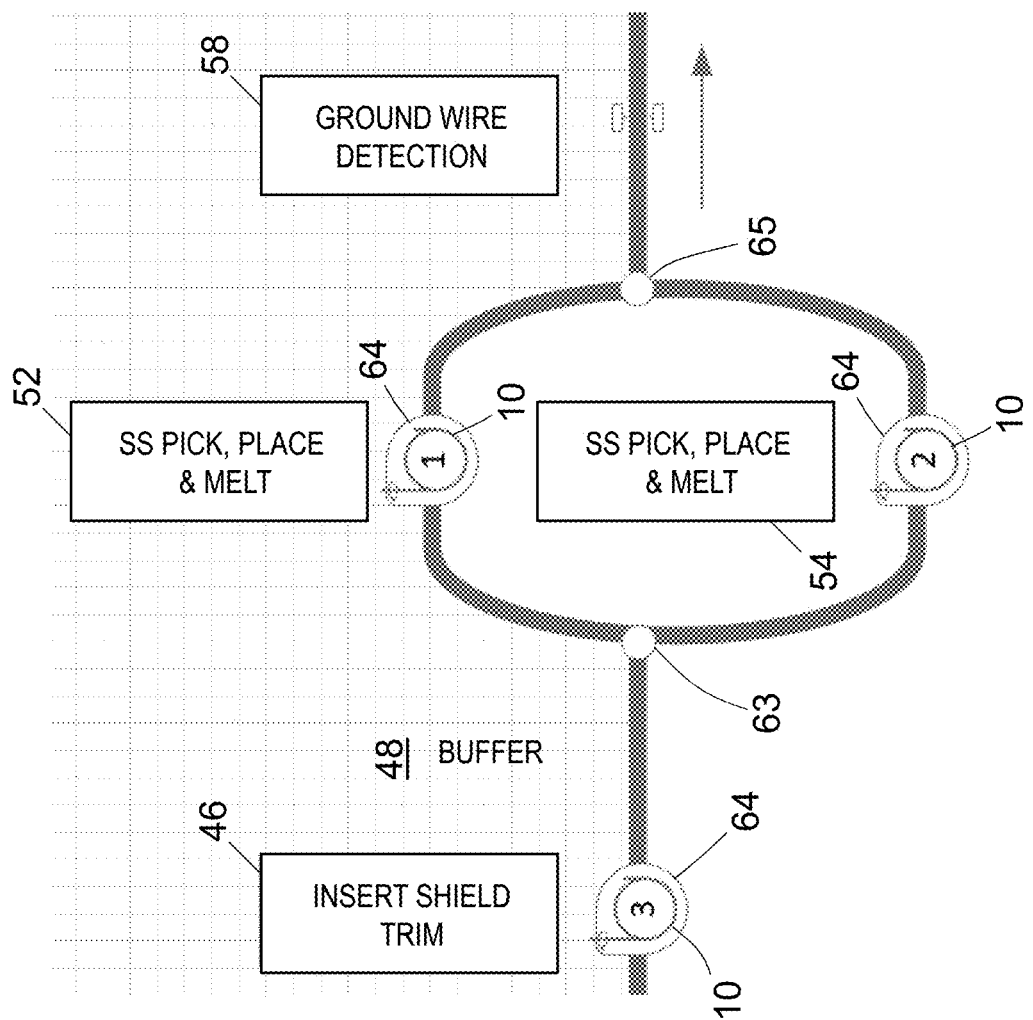

FIG. 24C shows that Pallet #2 has advanced to the solder sleeve installation module 54, where a solder sleeve will be installed, while Pallet #3 has advanced to the shield trim inspection module 46. At the time of this advancement, the solder sleeve installation process for Pallet #1 may be about halfway to completion. When the shield trim inspection of the cable 10 on Pallet #3 is completed, Pallet #3 will be released.

Figure 24D:
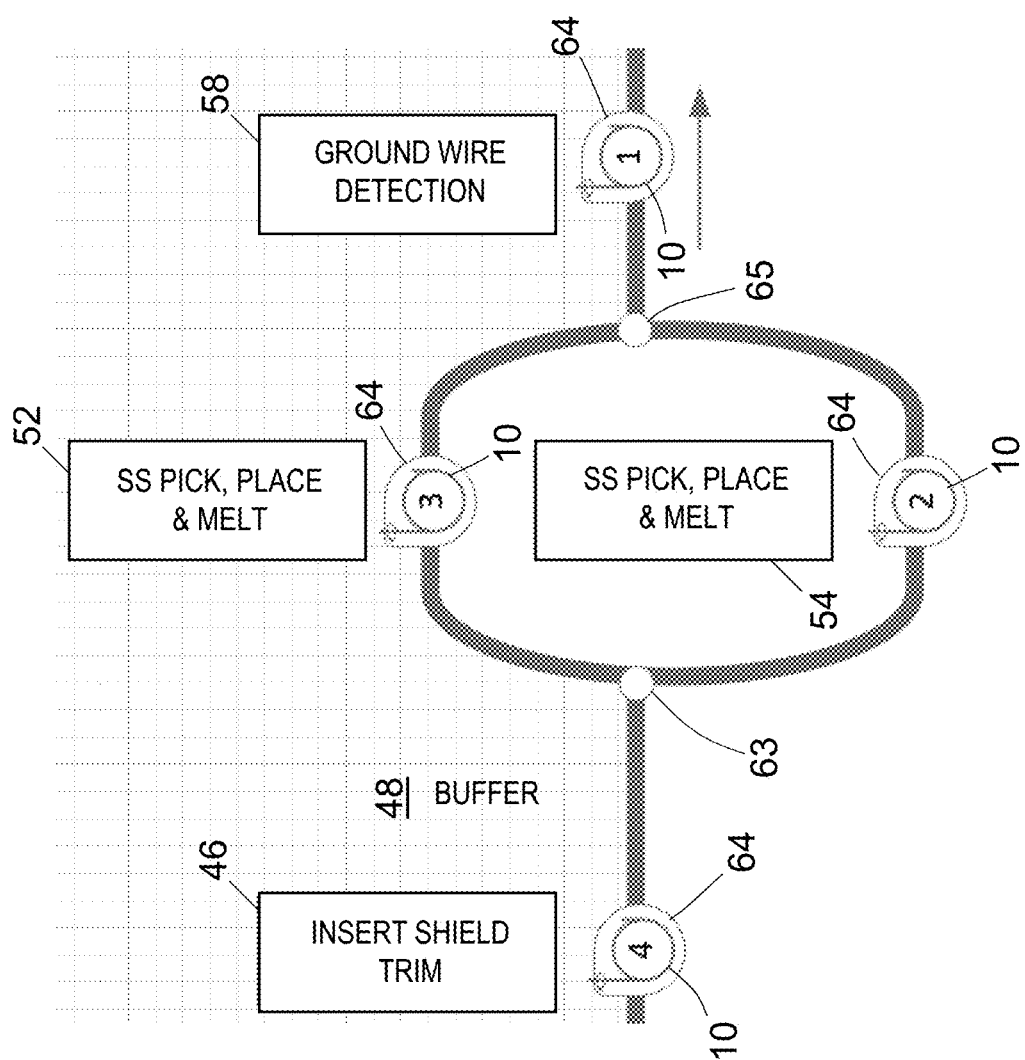

Upon completion of the solder sleeve installation process for the coil 10 on Pallet #1, Pallet #1 is advanced to the ground wire detection module 58, as seen in FIG. 24D. FIG. 24D also shows that Pallet #4 has advanced to the shield trim inspection module 46. At the same time, Pallet #3 is advanced to solder sleeve installation module 52, which is now available due to the departure of Pallet #1. At the time of this advancement, the solder sleeve installation process for Pallet #2 may be about halfway to completion. When the shield trim inspection of the cable 10 on Pallet #4 is completed, Pallet #4 will be released.

Figure 24E:
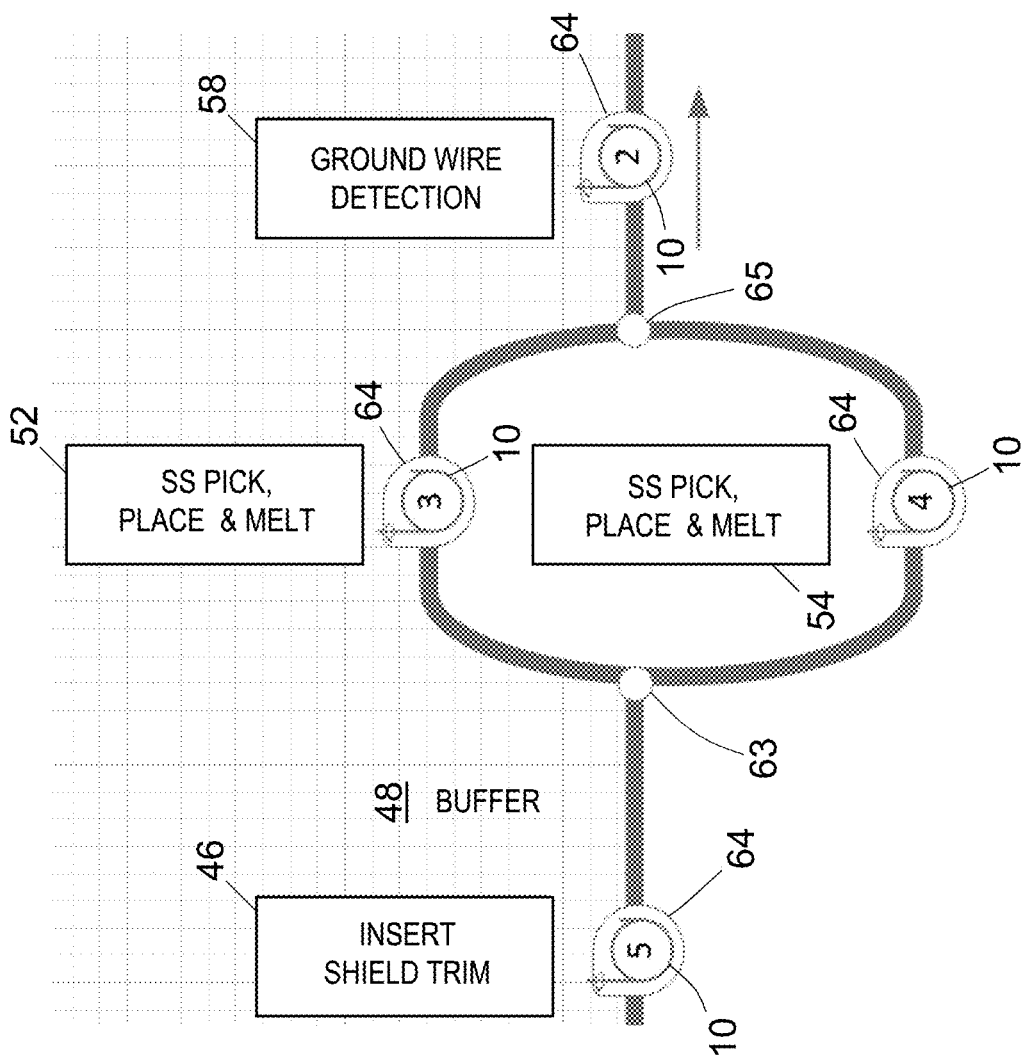

Upon completion of the solder sleeve installation process for the coil 10 on Pallet #2, Pallet #2 is advanced to the ground wire detection module 58 to replace Pallet #1, as seen in FIG. 24E. FIG. 24E also shows that Pallet #5 has advanced to the shield trim inspection module 46. At the same time, Pallet #4 is advanced to solder sleeve installation module 54, which is now available due to the departure of Pallet #2. At the time of this advancement, the solder sleeve installation process for Pallet #3 may be about halfway to completion. When the shield trim inspection of the cable 10 on Pallet #5 is completed, Pallet #4 will be released.

The foregoing cycle continues for all future pallets 64. Each advancing pallet 64 is diverted by the diverter module 63 to either solder sleeve installation module 52 or solder sleeve installation module 54. The pallets advancing alternatingly from the solder sleeve installation modules 52 and 54 are then merged onto the conveyor track 62 by the merge module 65.

The system 111 depicted in FIG. 23 may be modified to include more than two solder sleeve installation modules. For example, if the system had three solder sleeve installation modules between the diverter module 63 and the merge module 65, solder sleeves could be concurrently installed on three cables 10 in a staggered time sequence.

The cable positioning mechanism 19 (e.g., drive wheel 16 and idler wheel 18) disclosed herein may be controlled either manually or in an automated fashion. In accordance with the automated approach, a program that controls the apparatus could be loaded with common strip length values (strip length influences how far the cable 10 needs to be pushed into a cable processing equipment 30). An operator could indicate the strip length for that cable and hit a "go" button to initiate the motor 72. Rather than manually selecting a strip length value, the controlling program could be connected to a barcode scanner which reads in the strip length value on a barcode attached to the cable 10. In a fully automated system, the system controller 150 (see FIG. 27) would read in the strip lengths for each cable as they are loaded into the system. The system controller 150 would send this data to each cable positioning mechanism 19. For any of the above automated methods, the rotational speed of the motor may be selected manually by an operator or programmed to be a set speed depending on the cable type.

Figure 25:
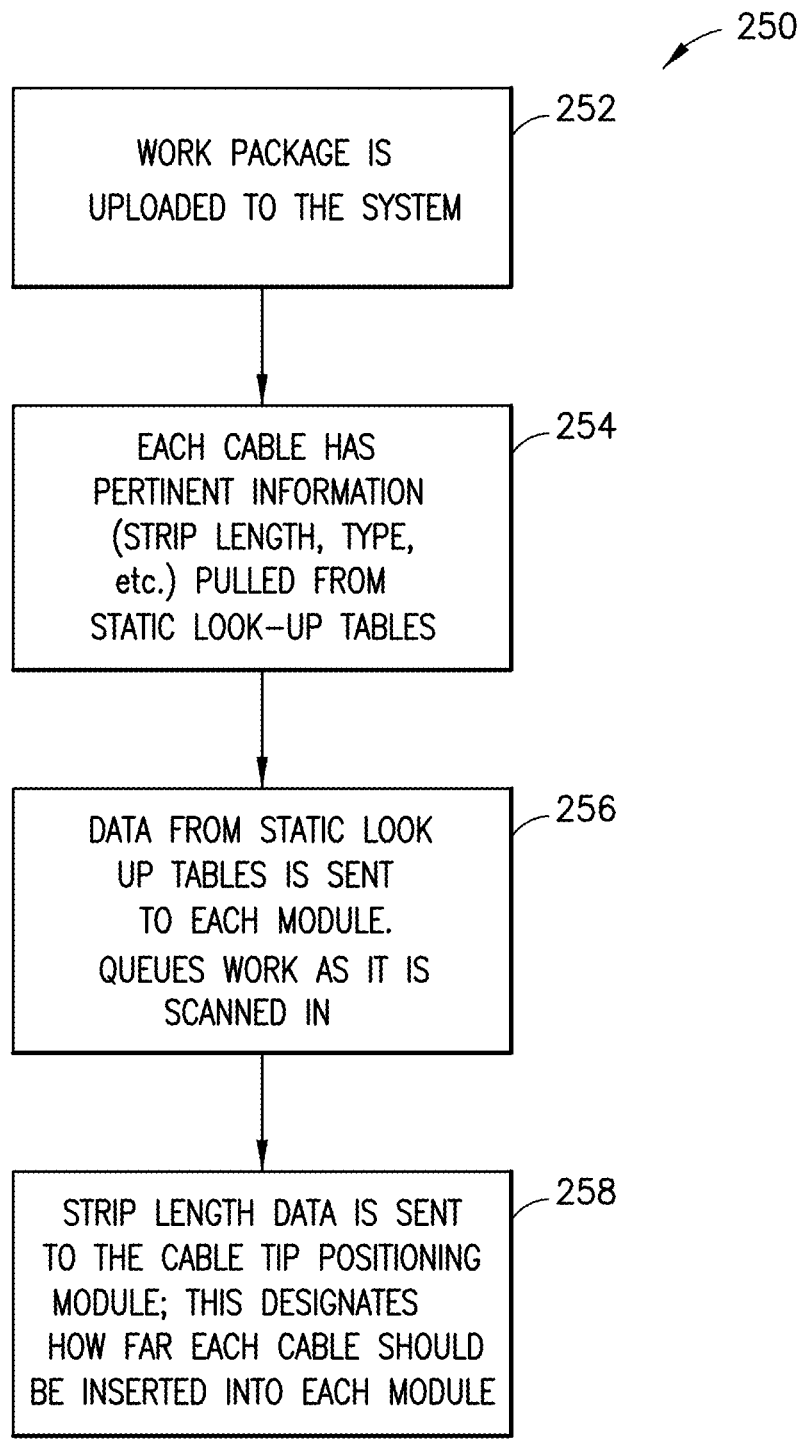
FIG. 25 is a flowchart identifying steps of a method for configuring a cable positioning mechanism to feed a specified length of cable into cable processing equipment based on a cable type and a desired strip length.

FIG. 25 is a flowchart identifying steps of a method 250 for configuring a cable positioning mechanism 19 to feed a specified length of cable into cable processing equipment 24 based on a cable type and a desired strip length. First a work package is uploaded to the system (step 252). Then pertinent information (strip length, cable type, etc.) for each cable is pulled from static look-up tables (step 254). Data retrieved from the static look-up tables is sent to each cable processing module 30 by the system controller (step 256). Queues work as the data is scanned in. The strip length data sent to the computer of the cable processing module 30 is used to control the operation of the cable positioning mechanism 19 presently docked at that module (step 258).

The cable positioning mechanism 19 may be attached to the pallet 64 or installed at the cable processing module 30. This enables a fully automated system to feed and transport cables 10 for processing within the system. The cable positioning mechanism 19, when suitably controlled based on sensor feedback, is capable of efficiently positioning the cable in a repeatable location for processing within semi- and/or fully automated equipment. This ensures repeatable quality of the end product, particularly in a fully automated system. Correct positioning of the cable is important when using cable processing equipment in order to ensure that the cable is processed at the correct location. Failure to do so can cause problems downstream at installation if the cable is functionally too long or too short due to incorrect processing, and may result in delays and their associated costs.

In accordance with an alternative embodiment, the cable positioning mechanism 19 may be controlled either manually. Pushbuttons may be used to rotate the motor shaft either clockwise or counterclockwise to control the direction in which the drive wheel 16 rotates. While this is likely the easiest/least complex solution, it is not desired, as it relies on operator skill to know when to stop the motor 72 to position the cable 10. The motor speed may be manually selected using a push button or other method of setting the motor speed.

Figure 26:
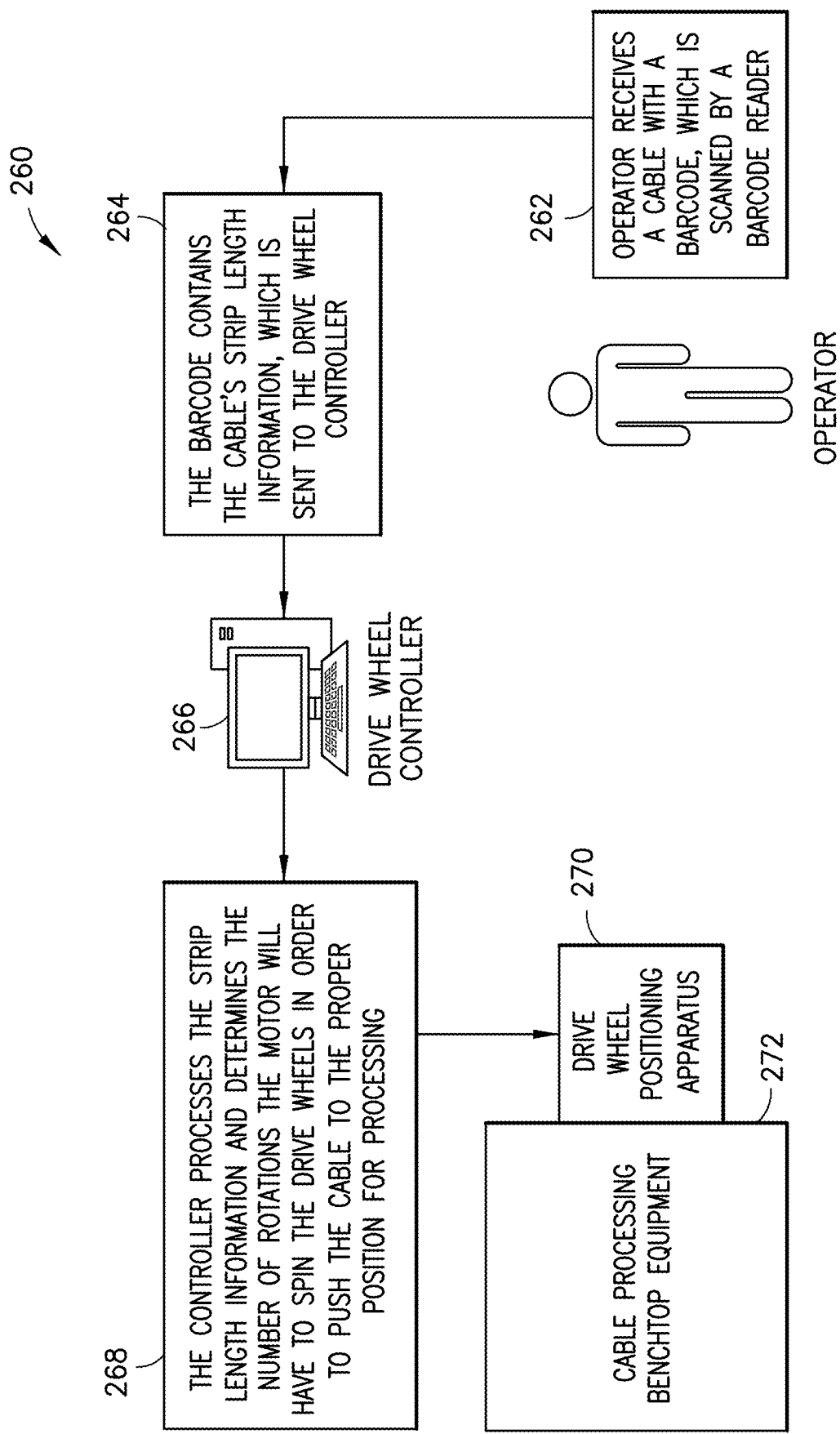
FIG. 26 is a flowchart identifying steps of a method for configuring a cable positioning mechanism to feed a specified length of cable into benchtop cable processing equipment based on a cable type and a desired strip length.

FIG. 26 is a flowchart identifying steps of a method 260 for configuring a drive wheel positioning apparatus 270 to feed a specified length of cable 10 into benchtop cable processing equipment 272 based on a cable type and a desired strip length. The drive wheel positioning apparatus 270 may be mounted to the front of the benchtop wire processing equipment 272 to feed cables in and out of the equipment. This would eliminate the need for operators to manually change the cable positioning settings on the equipment (e.g., internal backstops).

The method 260 for configuring a drive wheel positioning apparatus 270 includes the following steps. First, the operator receives a cable with a barcode, which is canned by a barcode reader (step 262). The barcode contains the cable's strip length information, which information is sent to a drive wheel controller 266 (step 264). The drive wheel controller 266 processes the strip length information and determines the number of rotations of the drive wheel 16 that are needed in order to push the cable tip 10b to the proper position for processing (step 268). The drive wheel controller 266 then controls the motor 72 of the drive wheel positioning apparatus 270 to achieve the specified number of rotations.

Figure 27:
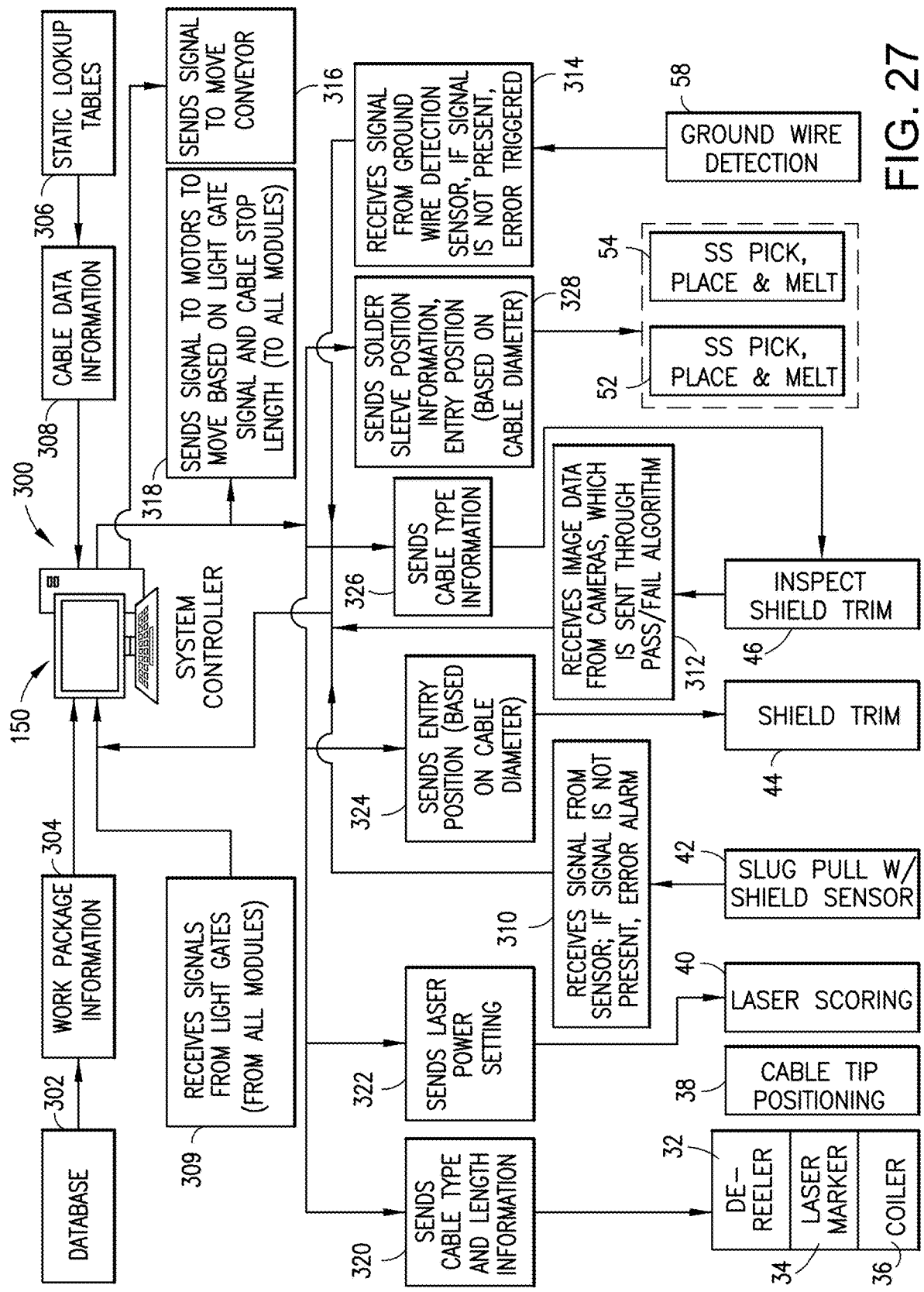
FIG. 27 is a flowchart identifying steps of a method for controlling a system having a plurality of workstations for performing a sequence of operations for installing a solder sleeve on an end of a cable in accordance with one embodiment.

The systems depicted in FIGS. 1 and 23 may be operated under the control of a system controller 150 (shown in FIG. 27). FIG. 27 is a flowchart identifying steps of a method 300 for controlling a system having a plurality of workstations for performing a sequence of operations for installing a solder sleeve 12 on an end of a cable 10 in accordance with one embodiment. The system controller 150 receives work packages and information 304 from a database 302 and also receives cable information 308 from static look-up tables 306. The system controller 150 parses the data and uses the information to run the system. Cables in a work package are organized by airplane effectivity, bundle number, wire type, and then group code.

The system controller 150 sends signals for controlling movements of the various components of the cable delivery system 60 (step 316). The system controller 150 also receives signals representing the states of the light gates from all modules (step 309). The system controller 150 also calculates how far the cable positioning mechanism 19 should drive the cable 10 into each module based on cable strip length information. The cable strip length is used to calculate the length of the cable that needs to be driven into each module such that the cable is processed at the correct location. The system controller 150 sends control signals to the various motor controllers (or computer in command of the motor controller) to cause the motors to move based on signals received from the various light gates and the cable strip length (step 318).

Still referring to FIG. 27, cables are sent one at a time to the de-reeler module 32 to be cut and loaded onto the system. The system controller 150 sends cable type and length information to the de-reeler module 32 (step 320). The de-reeler module 32 de-reels a continuous length of cable of the specified type and then cuts the cable to the specified length. For each length of cable 10, the laser marker 34 laser marks the outer jacket 2 of the cable 10 with pertinent information (bundle number, wire number, gauge).

In addition, the system controller 150 uses cable insulation information to select the appropriate laser setting and send it to the laser scoring module 40 (step 322). The system controller 150 also uses the cable type information to determine the correct type of solder sleeve or dead end sleeve and then sending commands to the solder sleeve installation modules 52 and 54 specifying which open-top funnel should be used (based on cable diameter) and where the solder sleeve 12 should be positioned after its removal from the prong (step 328). The same signals specifying which funnel should be used are sent to the shield trimming module 44 (step 324). In addition, the system controller sends cable type information to the shield trim inspection module 46 (step 326). Such cable information may include the specified threshold to be used when determining whether the trimmed shield of the cable is acceptable or not (e.g., by comparing the percentage of a particular pixel color in a particular zone of the cable to such threshold).

The system controller 150 is also configured to monitor the system for errors. For example, the system controller 150 receives signals from the shield sensor in the jacket slug pulling module 42 (step 310). If the signal is not present, the system controller 150 issues an error alarm. Also, the system controller 150 receives image data from cameras at the shield trim inspection module 46, which image data is processed using a pass/fail algorithm (step 312). In addition, the system controller 150 receives signals from the ground wire detection module 58 (step 314). If the signal is not present, the system controller 150 generates an error message.

The systems, methods and apparatus disclosed above may be employed in an aircraft manufacturing or maintenance method. During production, component and subassembly manufacturing and system integration of the aircraft takes place. While in service by a customer, the aircraft is scheduled for routine maintenance (which may also include modification, reconfiguration, refurbishment, and so on).

The cable processing methods disclosed herein may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

The aircraft may include an airframe (comprising, e.g., a fuselage, frames, stiffeners, wing boxes, etc.) with a plurality of systems and an interior. Examples of high-level systems include one or more of the following: a propulsion system, an electrical system, a hydraulic system, and an environmental control system. Any number of other systems having cables may be included. Although an aerospace example is shown, the principles disclosed herein may be applied to other industries, such as the automotive industry.

Apparatus and methods embodied herein may be employed during any one or more of the stages of production or maintenance. For example, cable components or subassemblies may be fabricated and/or assembled during the production process or during maintenance. Also, one or more apparatus embodiments, method embodiments, or a combination thereof may be utilized during the production stages to substantially expedite assembly of or reduce the cost of an aircraft. Similarly, one or more of apparatus embodiments, method embodiments, or a combination thereof may be utilized while the aircraft in service, for example and without limitation, during maintenance or retrofitting operations.

While systems, methods and apparatus for processing shielded cable have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The embodiments disclosed above use one or more computer systems. As used in the claims, the term "computer system" comprises a single processing or computing device or multiple processing or computing devices that communicate via wireline or wireless connections. Such processing or computing devices typically include one or more of the following: a processor, a controller, a central processing unit, a microcontroller, a reduced instruction set computer processor, an application-specific integrated circuit, a programmable logic circuit, a field-programmable gated array, a digital signal processor, and/or any other circuit or processing device capable of executing the functions described herein. The above examples are exemplary only, and thus are not intended to limit in any way the definition and/or meaning of the term "computer system".

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A system for processing an end of a cable, the system comprising:
    a cable delivery system;
    a plurality of cable processing modules situated at respective workstations accessible to the cable delivery system;
    a pair of wheels operable to push the cable into one of the cable processing modules when the cable is in a nip between the wheels;
    an apparatus configured to hold the wheels;
    a motor having an output shaft operatively coupled to drive rotation of the wheels; and
    a rotation encoder configured to output pulses representing incremental angular rotations of the output shaft of the motor,
    wherein each cable processing module of the plurality of cable processing modules comprises:
    respective cable processing equipment configured to perform a respective operation on the end of the cable;
    a respective funnel affixed to the respective cable processing equipment in a location facing the pair of wheels; and
    a respective photoelectric sensor positioned and configured to issue a cable tip position signal indicating that interruption of transmitted light in a scanning plane in front of the funnel has started, and
    a computer system configured to perform the following operations when the cable arrives at each of the workstations in sequence:
    activate the motor to drive rotation of the wheels in the cable pushing direction to cause the end of the cable to be inserted into the cable processing equipment of the cable processing module which the apparatus configured to hold the wheels is adjacent to;
    start a count of pulses output by the rotation encoder in response to the cable tip position signal;
    de-activate the motor in response to the count reaching a specified value corresponding to a specific target length of cable inserted in the cable processing equipment;
    activate the cable processing equipment in which the end of the cable is inserted to perform the respective operation on the inserted end of the cable; and
    activate the motor to drive rotation of the wheels in a cable pulling direction to cause the end of the cable to be removed from the cable processing equipment.

2. The system as recited in claim 1, wherein one of the plurality of cable processing modules comprises a shield trimming module configured to automatically trim an exposed portion of a shield of the cable in an area where the portion of the jacket was removed.

3. The system as recited in claim 2, wherein another of the plurality of cable processing modules comprises a sleeve installation module situated downstream from the shield trimming module and configured to automatically place and then shrink a sleeve on a portion of the cable that includes an untrimmed exposed portion of the shield.

4. The system as recited in claim 1, wherein the cable processing equipment of one of the cable processing modules is configured to automatically form a circumferential laser score line in a jacket of a cable.

5. The system as recited in claim 1, wherein the cable processing equipment of one of the cable processing modules is configured to automatically pull a portion of a jacket off of the end of the cable, the portion of the jacket pulled off having a tip formed by the laser score line, thereby exposing a portion of a shield of the cable.

6. The system as recited in claim 1, wherein the cable processing equipment of one of the cable processing modules is configured to automatically trim a portion of an exposed portion of a shield of the cable.

7. The system as recited in claim 1, wherein the cable processing equipment of one of the cable processing modules is configured to automatically install a solder sleeve on a portion of the cable, and wherein the solder sleeve surrounds a portion of an exposed portion of a shield.

8. The system as recited in claim 1, wherein the photoelectric sensor comprises a scanning light beam transmitter and an array of light-detecting elements.

9. The system as recited in claim 8, wherein the computer system is further configured to perform the following operations:
compute a length of an interruption in light received by the array of light-detecting elements from the scanning light beam transmitter;
compare the computed length of the interruption to reference data representing a diameter of a cable; and
issue an alert signal when a difference of the computed length of the interruption and the reference data exceeds a specified threshold.

10. A system for processing an end of a cable, the system comprising:
a cable delivery system;
a plurality of cable processing modules situated at respective workstations accessible to the cable delivery system;
a pair of wheels operable to push the cable into one of the cable processing modules when the cable is in a nip between the wheels;
an apparatus configured to hold the wheels; and
a motor operatively coupled to drive rotation of the wheels,
wherein each cable processing module of the plurality of cable processing modules comprises:
respective cable processing equipment configured to perform a respective operation on the end of the cable; and
a computer system configured to perform the following operations when the cable arrives at each of the workstations in sequence:
activate the motor to drive rotation of the wheels in the cable pushing direction to cause the end of the cable to be inserted into the cable processing equipment of the cable processing module which the apparatus configured to hold the wheels is adjacent to;
activate the cable processing equipment in which the end of the cable is inserted to perform the respective operation on the inserted end of the cable; and
activate the motor to drive rotation of the wheels in a cable pulling direction to cause the end of the cable to be removed from the cable processing equipment,
wherein the plurality of cable processing modules comprise the following cable processing modules arranged along the cable delivery system in sequence as recited:
first cable processing equipment configured to automatically form a circumferential laser score line in a jacket of a cable;
second cable processing equipment configured to automatically pull a portion of the jacket off of the end of the cable, the portion of the jacket pulled off having a tip formed by the laser score line, thereby exposing a portion of a shield of the cable;
third cable processing equipment configured to automatically trim a portion of the exposed portion of the shield of the cable; and
fourth cable processing equipment configured to automatically install a solder sleeve on a portion of the cable, wherein the solder sleeve surrounds a portion of the exposed portion of the shield remaining after trimming.

11. A system for processing an end of a cable, the system comprising:
a cable delivery system;
a cable processing module situated at a workstation accessible to the cable delivery system;
a pallet supported by the cable delivery system;
a drive wheel rotatably coupled to the pallet;
a motor operatively coupled for driving rotation of the drive wheel; and
an idler wheel rotatably coupled to the pallet and forming a nip with the drive wheel,
wherein the cable processing module comprises:
cable processing equipment configured to perform an operation on the end of the cable; and
a computer system configured to perform the following operations:
activate the motor to drive rotation of the drive wheel in a cable pushing direction to cause the end of the cable to be inserted into the cable processing equipment;
activate the cable processing equipment to perform the operation on the end of the cable; and
activate the motor to drive rotation of the drive wheel in a cable pulling direction to cause the end of the cable to be removed from the cable processing equipment,
the system further comprising a rotation encoder configured to output pulses representing the incremental angular rotations of an output shaft of the motor, wherein the cable processing module further comprises:
a funnel affixed to the cable processing equipment in a location facing the drive wheel and idler wheel; and
a photoelectric sensor positioned and configured to issue a cable tip position signal indicating that interruption of transmitted light in a scanning plane in front of the funnel has started, and
wherein the computer system is further configured to start a count of pulses output by the rotation encoder in response to the cable tip position signal and then de-activate the motor in response to the count reaching a specified value corresponding to a specific target length of cable inserted in the cable processing equipment.

12. The system as recited in claim 11, wherein the photoelectric sensor comprises a scanning light beam transmitter and an array of light-detecting elements, and the computer system is further configured to perform the following operations:
compute a length of an interruption in light received by the array of light-detecting elements from the scanning light beam transmitter;
compare the computed length of the interruption to reference data representing a diameter of a cable; and
issue an alert signal when a difference of the computed length of the interruption and the reference data exceeds a specified threshold.

13. The system as recited in claim 11, wherein the cable processing equipment of one of the cable processing modules is configured to automatically form a circumferential laser score line in a jacket of a cable.

14. The system as recited in claim 11, wherein the cable processing equipment of one of the cable processing modules is configured to automatically pull a portion of a jacket off of the end of the cable, the portion of the jacket pulled off having a tip formed by the laser score line, thereby exposing a portion of a shield of the cable.

15. The system as recited in claim 11, wherein the cable processing equipment of one of the cable processing modules is configured to automatically trim a portion of an exposed portion of a shield of the cable.

16. The system as recited in claim 11, wherein the cable processing equipment of one of the cable processing modules is configured to automatically install a solder sleeve on a portion of the cable, and wherein the solder sleeve surrounds a portion of an exposed portion of a shield.

17. A system for processing an end of a cable, the system comprising:
a cable delivery system;
a cable processing module situated at a workstation accessible to the cable delivery system and comprising cable processing equipment configured to perform an operation on the end of the cable, a funnel affixed to the cable processing equipment in a location facing a pair of wheels, and a photoelectric sensor positioned and configured to issue a cable tip position signal indicating that interruption of transmitted light in a scanning plane in front of the funnel has started;
the pair of wheels operable to push the cable into the funnel when the cable is in a nip between the wheels;
an apparatus configured to hold the wheels;
a motor having an output shaft operatively coupled to drive rotation of the wheels;
a rotation encoder configured to output pulses representing incremental angular rotations of the output shaft of the motor; and
a computer system configured to perform the following operations when the cable arrives at each of the workstations in sequence:
activate the motor to drive rotation of the wheels in the cable pushing direction to cause the end of the cable to be inserted into the cable processing equipment of the cable processing module which the apparatus configured to hold the wheels is adjacent to;
start a count of pulses output by the rotation encoder in response to the cable tip position signal;
de-activate the motor in response to the count reaching a specified value corresponding to a specific target length of cable inserted in the cable processing equipment;
activate the cable processing equipment in which the end of the cable is inserted to perform the respective operation on the inserted end of the cable; and
activate the motor to drive rotation of the wheels in a cable pulling direction to cause the end of the cable to be removed from the cable processing equipment.

18. The system as recited in claim 17, wherein the photoelectric sensor comprises a scanning light beam transmitter and an array of light-detecting elements.

19. The system as recited in claim 18, wherein the computer system is further configured to perform the following operations:
compute a length of an interruption in light received by the array of light-detecting elements from the scanning light beam transmitter;
compare the computed length of the interruption to reference data representing a diameter of a cable; and
issue an alert signal when a difference of the computed length of the interruption and the reference data exceeds a specified threshold.

20. The system as recited in claim 17, wherein the cable processing module comprises a shield trimming module configured to automatically trim an exposed portion of a shield of the cable in an area where the portion of the jacket was removed.

* * * * *